(12) United States Patent
Ogura et al.

(10) Patent No.: US 11,396,227 B2
(45) Date of Patent: Jul. 26, 2022

(54) COOLING APPARATUS OF VEHICLE DRIVING SYSTEM

(71) Applicant: TOYOTA JIDOSHA KABUSHIKI KAISHA, Aichi (JP)

(72) Inventors: Yoichi Ogura, Shizuoka-ken (JP); Kunihiko Hayashi, Odawara (JP); Masatoshi Yano, Hadano (JP); Yuji Miyoshi, Susono (JP); Takuya Hirai, Susono (JP); Tomohiro Shinagawa, Shizuoka-ken (JP); Ryo Michikawauchi, Numazu (JP); Hidefumi Aikawa, Shizuoka-ken (JP); Yu Ofune, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/361,210

(22) Filed: Mar. 22, 2019

(65) Prior Publication Data
US 2019/0329644 A1    Oct. 31, 2019

(30) Foreign Application Priority Data

Apr. 25, 2018 (JP) .............................. JP2018-083656

(51) Int. Cl.
*B60K 1/00* (2006.01)
*B60K 11/02* (2006.01)
*B60K 6/22* (2007.10)

(52) U.S. Cl.
CPC ............... *B60K 11/02* (2013.01); *B60K 1/00* (2013.01); *B60K 6/22* (2013.01);
(Continued)

(58) Field of Classification Search
CPC . B60K 11/02; B60K 1/00; B60K 6/22; B60K 2001/006; F01P 2050/22; B60Y 2200/92; B60Y 2306/05; B60H 1/00278
See application file for complete search history.

(56) References Cited

U.S. PATENT DOCUMENTS 9,597,951 B2    3/2017   Alm et al.
9,604,627 B2    3/2017   Yamanaka et al.
(Continued)

FOREIGN PATENT DOCUMENTS

EP          2891569 A1      7/2015
JP    2006321389 A   * 11/2006   .............. B60L 50/16
(Continued)

*Primary Examiner* — Harry E Arant
(74) *Attorney, Agent, or Firm* — Hauptman Ham, LLP

(57) ABSTRACT

A cooling apparatus of a vehicle driving system for driving a vehicle according to the invention activates a heat pump to cool a hybrid system by cooling medium and flows an engine cooling water in an engine water circulation passage through a condenser to cool the cooling medium by the engine cooling water at the condenser when an engine water circulation condition is satisfied. The engine water circulation condition is a condition that a heat pump activation condition is satisfied, and an engine cooling condition is not satisfied. The heat pump activation condition is a condition that a process of cooling the hybrid system by the cooling medium of the heat pump is requested. The engine cooling condition is a condition that a process of cooling an internal combustion engine by the engine cooling water is requested.

19 Claims, 43 Drawing Sheets

(52) U.S. Cl.
   CPC ..... *B60K 2001/006* (2013.01); *B60Y 2200/92* (2013.01); *B60Y 2306/05* (2013.01); *F01P 2050/22* (2013.01)

(56) References Cited

U.S. PATENT DOCUMENTS

| | | | |
|---|---|---|---|
| 2010/0281901 A1* | 11/2010 | Kawase | F25B 25/005 62/238.7 |
| 2013/0226380 A1 | 8/2013 | Ando et al. | |
| 2014/0033761 A1* | 2/2014 | Kawakami | F25B 13/00 62/498 |
| 2014/0202178 A1* | 7/2014 | Trumbower | B60L 50/16 62/62 |
| 2014/0332179 A1* | 11/2014 | Vandike | F28D 7/103 165/42 |
| 2015/0251518 A1 | 9/2015 | Nemesh | |
| 2016/0031291 A1* | 2/2016 | Enomoto | B60K 11/02 62/179 |
| 2016/0101666 A1 | 4/2016 | Sugimura et al. | |
| 2016/0230644 A1* | 8/2016 | Dudar | F01P 11/16 |
| 2016/0318499 A1* | 11/2016 | Yamanaka | B60H 1/00899 |
| 2017/0021698 A1 | 1/2017 | Hatakeyama et al. | |
| 2017/0096930 A1 | 4/2017 | Murai et al. | |
| 2018/0006347 A1* | 1/2018 | Porras | H01M 10/633 |
| 2019/0315194 A1* | 10/2019 | Kim | B60H 1/00735 |

FOREIGN PATENT DOCUMENTS

| | | |
|---|---|---|
| JP | 2006321389 A | 11/2006 |
| JP | 2013-177026 A | 9/2013 |
| JP | 2014-234094 A | 12/2014 |
| JP | 2015186989 A | 10/2015 |

\* cited by examiner

COOLING APPARATUS OF VEHICLE DRIVING SYSTEM

RELATED APPLICATIONS

The present application claims priority to Japanese Patent Application No. 2018-083656 filed Apr. 25, 2018, the disclosure of which is hereby incorporated by reference herein in its entirety.

BACKGROUND

Field

The invention relates to a cooling apparatus of a vehicle driving system.

Description of the related art

There is known a hybrid vehicle driven by a vehicle driving system including an internal combustion engine and a motor. The vehicle driving system of the hybrid vehicle comprises a battery for storing electric power to be supplied to the motor. The hybrid vehicle comprises a cooling apparatus including water circulation passages, through which cooling water flows for cooling the internal combustion engine, the motor, and the battery, thereby preventing temperatures of the internal combustion engine, the motor, and the battery from increasing excessively.

In general, a temperature of a hybrid system including the motor and the battery should be maintained at a temperature lower than the temperature of the internal combustion engine. Accordingly, the cooling apparatus of the hybrid vehicle comprises a water circulation passage, through which the cooling water flows for cooling the hybrid system in addition to a water circulation passage, through which the cooling water flows for cooling the internal combustion engine.

Hereinafter, the temperature of the hybrid system will be referred to as "the hybrid system temperature", the temperature of the internal combustion engine will be referred to as "the engine temperature", the water circulation passage, in which the cooling water flows for cooling the hybrid system will be referred to as "the hybrid system water circulation passage", and the water circulation passage, in which the cooling water flows for cooling the internal combustion engine will be referred to as "the engine water circulation passage".

There is also known a cooling apparatus including a heat pump as means for cooling the cooling water flowing through the hybrid system water circulation system (for example, see JP 2014-234094 A as to the heat pump for cooling the cooling water).

A radiator for cooling the cooling water is provided in the engine water circulation passage, and a radiator for cooling the cooling water is provided in the hybrid system water circulation passage. These radiators are generally provided at a front area of an engine compartment provided at a front portion of the vehicle. Hereinafter, the radiator provided in the engine water circulation passage will be referred to as "the engine radiator", and the radiator provided in the hybrid system water circulation passage will be referred to as "the hybrid system radiator".

The heat pump includes an outside air heat exchanger for discharging heat of cooling medium to the outside air. Similar to the engine radiator and the hybrid system radiator, the outside air heat exchanger is provided at the front area of the engine compartment.

The engine compartment is spatially limited. When the engine radiator, the hybrid system radiator, and the outside air heat exchanger are provided at the front are of the engine compartment, sizes of the engine radiator, the hybrid system radiator, and the outside air heat exchanger should be small.

When the sizes of the engine radiator, the hybrid radiator, and the outside air heat exchanger are small, abilities of the engine radiator and the hybrid system radiator for cooling the cooling water and an ability of the outside air heat exchanger for cooling the cooling medium are low.

Accordingly, even when the heat pump is employed as the means for cooling the cooling water flowing through the hybrid system water circulation passage for increasing an ability of the cooling apparatus to cool the cooling water, a degree of increasing of the ability of the cooling apparatus to cool the cooling water, may be relatively small.

SUMMARY

The invention has been made for solving above-mentioned problems. An object of the invention is to provide a cooling apparatus of the vehicle driving system configured to cool the cooling water for cooling the hybrid system and having an increased ability to cool the cooling water.

A cooling apparatus of a vehicle driving system (200) for driving a vehicle (100) according to the invention comprises an engine water circulation passage (20), an engine radiator (13), a hybrid system water circulation passage (50), a hybrid system radiator, and a heat pump (70).

Cooling water flows in the engine water circulation passage (20) as engine cooling water for cooling an internal combustion engine (110) of the vehicle driving system (200). The engine radiator (13) is configured to cool the engine cooling water by outside air. The cooling water flows in the hybrid system water circulation passage (50) as hybrid system cooling water for cooling a hybrid system including at least one of a battery (120) and a motor (111, 112) of the vehicle driving system (200). The hybrid system radiator (43) is configured to cool the hybrid system cooling water by the outside air. The heat pump (70) is configured to cool the hybrid system by cooling medium, the heat pump (70) including a condenser (73) for exchanging heat between the cooling medium and the engine cooling water.

The cooling apparatus according to the invention further comprises an electronic control unit (90). The electronic control unit (90) is configured to flow the engine cooling water in the engine water circulation passage (20) through the engine radiator (13) to cool the internal combustion engine (110) by the engine cooling water (see processes of steps 1140 and 1150 in FIG. 11) when an engine cooling condition is satisfied, the engine cooling condition being a condition that a process of cooling the internal combustion engine (110) by the engine cooling water is requested (see a determination "Yes" at a step 1110 in FIG. 11).

The electronic control unit (90) is further configured to activate the heat pump (70) to cool the hybrid system by the cooling medium (see a process of a step 1340 in FIG. 13) when a heat pump activation condition is satisfied, the heat pump activation condition being a condition that a process of cooling the hybrid system by the cooling medium of the heat pump (70) is requested (see a determination "Yes" at a step 1330 in FIG. 13).

The electronic control unit (90) is further configured to activate the heat pump (70) to cool the hybrid system by the cooling medium and flow the engine cooling water in the engine water circulation passage through the condenser (73) to cool the cooling medium by the engine cooling water at the condenser (73) (see processes of steps 1240, 1250, 1270, and 1280 in FIG. 12 and the process of the step 1340 in FIG. 13) when an engine water circulation condition is satisfied, the engine water circulation condition being a condition that the heat pump activation condition is satisfied, and the engine cooling condition is not satisfied (see the determination "Yes" at the step 1110 in FIG. 11, a determination "Yes" at a step 1170 in FIG. 11, a determination "Yes" at a step 1210 in FIG. 12, and the determination "Yes" at the step 1340 in FIG. 13).

According to the invention, when the engine water circulation condition is satisfied, the heat of the cooling medium absorbing from the hybrid system, is discharged to the engine cooling water at the condenser. Therefore, the cooling medium is cooled by the engine cooling water at the condenser. When the engine water circulation condition is satisfied, the process of cooling the internal combustion engine is not requested. Thus, a temperature of the internal combustion engine is relatively low. Therefore, the heat of the engine cooling water discharged from the cooling medium, is discharged to the internal combustion engine while the engine cooling water flows through the engine water circulation passage. When the heat of the engine cooling water is discharged to the internal combustion engine, a temperature of the engine cooling water decreases. The engine cooling water having a decreased temperature flows through the condenser and thus, the cooling medium is cooled by the engine cooling water at the condenser continuously.

When the heat of the cooling medium is discharged to the internal combustion engine via the engine cooling water, the cooling medium can be cooled if the heat pump has no outside air heat exchanger. In addition, when the heat pump has no outside air heat exchanger, the larger engine radiator and the larger hybrid system radiator can be provided in the engine compartment and thus, the higher abilities of the engine radiator and the hybrid radiator to cool the cooling water, can be accomplished. According to the invention, the cooling ability of the cooling apparatus may be increased.

On the other hand, when the heat pump is provided with an outside air heat exchanger, the cooling medium is cooled by the outside air heat exchanger and the internal combustion engine. Thus, the ability of the heat pump to cool the cooling medium is increased. According to the invention, the cooling ability of the cooling apparatus may be increased further.

According to an aspect of the invention, the engine water circulation condition may include a condition relating to a temperature of the cooling medium flowing into the condenser (73).

According to another aspect of the invention, the electronic control unit (90) may be further configured to stop flowing the engine cooling water in the engine water circulation passage (20) (see a process of a step 1290 in FIG. 12) when a temperature of the engine cooling water flowing into the condenser (73) is equal to or higher than the temperature of the cooling medium flowing into the condenser (73) even while the engine water circulation condition is satisfied (see a determination "No" at a step 1210 in FIG. 12).

When the temperature of the engine cooling water flowing into the condenser is higher than or equal to a temperature of the cooling medium flowing into the condenser while the engine water circulation condition is satisfied, the heat of the cooling medium may not be discharged to the engine cooling water even by flowing the engine cooling water in the engine water circulation passage through the condenser. If the heat of the cooling medium is not discharged to the engine cooling water, the cooling medium is not cooled. When the cooling medium is not cooled by the engine cooling water at the condenser, a flow of the engine cooling water in the engine water circulation passage is needless. Therefore, the needless flow of the engine cooling water may be prevented by stopping flowing the engine cooling water in the engine water circulation passage when the temperature of the engine cooling water flowing into the condenser is equal to or higher than the temperature of the cooling medium flowing into the condenser.

According to further another aspect of the invention, the engine water circulation condition may include a condition that the temperature of the cooling medium flowing into the condenser (73) is higher than a predetermined cooling medium temperature.

When the temperature of the cooling medium flowing into the condenser is high, the cooling medium is desirably cooled by the engine cooling water at the condenser to improve the ability of the heat pump to cool the hybrid system. According to this aspect, the engine water circulation condition includes the condition that the temperature of the cooling medium flowing into the condenser is higher than the predetermined cooling medium temperature. Therefore, when the temperature of the cooling medium flowing into the condenser is higher than the predetermined cooling medium temperature, the engine cooling water is forced to flow in the engine water circulation passage through the condenser. Thereby, the cooling medium is cooled by the engine cooling water at the condenser.

According to further another aspect of the invention, the engine water circulation condition may include a condition that a temperature of the internal combustion engine (110) is lower than an engine warmed temperature.

When the temperature of the internal combustion engine is higher than or equal to the engine warmed temperature, the internal combustion engine operates under a desired state, for example, that an amount of emission included in an exhaust gas discharged from the internal combustion engine is small. According to this aspect of the invention, the engine water circulation condition includes the condition that the temperature of the internal combustion engine is lower than the engine warmed temperature. Therefore, when the temperature of the internal combustion engine is lower than the engine warmed temperature while the engine water circulation condition is satisfied, the engine cooling water is forced to flow in the engine water circulation passage. Thereby, the heat of the engine cooling water absorbing from the cooling medium of the heat pump is likely to transfer to the internal combustion engine. Thus, the temperature of the internal combustion engine increases. Therefore, the temperature of the internal combustion engine is relatively high when the internal combustion engine starts operating later. Thus, the internal combustion engine can operate under the desired state when the internal combustion engine starts operating later.

According to further another aspect of the invention, the heat pump activation condition may include a condition that a temperature of the hybrid system cooling water, which is cooled by the hybrid system radiator (43) without the heat pump (70), is equal to or higher than a predetermined water temperature.

When the temperature of the hybrid system cooling water is high, the hybrid system cooling water may be insufficiently cooled only by the hybrid system radiator and as a result, the hybrid system may be insufficiently cooled. According to this aspect of the invention, the heat pump activation condition includes the condition that the temperature of the hybrid system cooling water, which is cooled by the hybrid system radiator without the heat pump, is equal to or higher than the predetermined water temperature. Therefore, when the temperature of the hybrid system cooling water, which is cooled by the hybrid system radiator without the heat pump, is equal to or higher than the predetermined water temperature, the hybrid system is cooled by the heat pump. In general, the ability of the heat pump to cool the hybrid system is larger than the ability of the hybrid system radiator to cool the hybrid system. Thus, according to this aspect of the invention, the hybrid system may be sufficiently cooled even when the hybrid system cooling water may be insufficiently cooled by the hybrid system radiator.

According to further another aspect of the invention, the heat pump (70) may include an evaporator (71a) for exchanging heat between the cooling medium and the hybrid system cooling water (see FIG. 2). In this case, the electronic control unit (90) may be further configured to activate the heat pump (70) to cool the hybrid system cooling water by the cooling medium at the evaporator (71a) and flow the hybrid system cooling water in the hybrid water circulation passage (50) to cool the hybrid system by the hybrid system cooling water when the engine water circulation condition is satisfied.

The hybrid system cooling water flows in the hybrid system water circulation passage for cooling the hybrid system. According to this aspect of the invention, the heat pump cools the hybrid system cooling water at the evaporator. Thus, the conventional hybrid system water circulation passage can be used.

According to further another aspect of the invention, the heat pump (70) may be configured to cool the hybrid system directly by the cooling medium (see FIG. 23). When the heat pump is configured to cool the hybrid system cooling water by the cooling medium, the evaporator needs to be provided in the heat pump. According to this aspect of the invention, the heat pump is configured to cool the hybrid system by the cooling medium directly. Thus, a design of the heat pump can be simplified.

According to further another aspect of the invention, the heat pump (70) may include an outside air heat exchanger (72) for exchanging the heat between the cooling medium and the outside air (see FIG. 2).

In this case, the cooling medium may be cooled by the engine cooling water and the outside air at the condenser and the outside air heat exchanger, respectively when the engine circulation water condition is satisfied. Thus, the ability of cooling the cooling medium is increased, compared to when the cooling medium is cooled only by the outside air heat exchanger.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Figure 1:
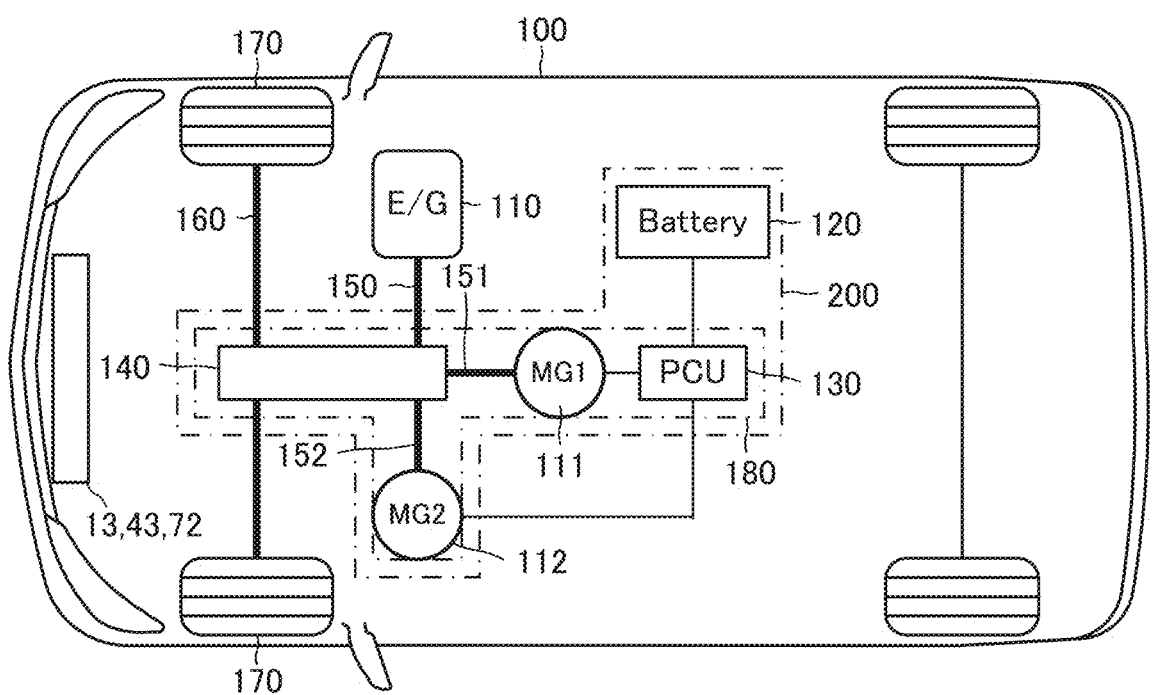
FIG. 1 is a view for showing a vehicle, to which a cooling apparatus of a vehicle driving system according to an embodiment of the invention is applied.

Below, a cooling apparatus of a vehicle driving system according to an embodiment of the invention will be described with reference to the drawings. The cooling apparatus according to the embodiment is applied to a vehicle 100 shown in FIG. 1. An internal combustion engine 110, a rechargeable battery 120, and a hybrid device 180 are mounted on the vehicle 100 as a vehicle driving system 200 for supplying driving force to the vehicle 100 to drive the vehicle 100. Hereinafter, the cooling apparatus according to the embodiment will be referred to as "the embodiment apparatus".

The hybrid device 180 includes a first motor generator 111, a second motor generator 112, a power control unit 130, a power distribution mechanism 140, etc. The power control unit 130 includes an inverter 131 (see FIG. 2), a boost converter, a DC/DC converter, etc. Hereinafter, the power control unit 130 will be referred to as "the PCU 130".

The vehicle 100 is a so-called hybrid vehicle which is driven by power output from the engine 110, the first motor generator 111, and the second motor generator 112. The vehicle 100, to which the embodiment apparatus is applied, may be a so-called plug-in hybrid vehicle in which the battery 120 can be charged by an outside electric power source.

The power distribution mechanism 140 is, for example, a planetary gear mechanism. The power distribution mechanism 140 distributes a torque input to the power distribution mechanism 140 from the engine 110 via an output shaft 150 into a torque for rotating an output shaft of the power distribution mechanism 140 and a torque for driving the first motor generator 111 as an electric generator at a predetermined distribution proportion (i.e., with a predetermined distribution property).

The power distribution mechanism 140 transmits the torque input to the power distribution mechanism 140 from the engine 110 via the output shaft 150 and a torque input to the power distribution mechanism 140 from the second motor generator 112 to right and left driving wheels 170 via a wheel drive shaft 160. The power distribution mechanism 140 is known, for example, in JP 2013-77026 A, etc.

The first and second motor generators 111 and 112 are permanent magnet synchronous motors, respectively. The first and second motor generators 111 and 112 are electrically connected to the battery 120 via the inverter 131 of the PCU 130.

The first motor generator 111 is operatively connected to the power distribution mechanism 140 via an input/output shaft 151. The first motor generator 111 is mainly used as an electric generator. When the first motor generator 111 is used as the electric generator, a rotation shaft of the first motor generator 111 is rotated by external forces such as a moving energy of the vehicle 100 and the torque output from the engine 110, thereby generating electric power. The generated electric power is charged in the battery 120 via the inverter 131 of the PCU 130. The first motor generator 111 is also used as an electric motor. When the first motor generator 111 is used as the electric motor, the first motor generator 111 is driven by the electric power supplied thereto from the battery 120 via the inverter 131 of the PCU 130.

The second motor generator 112 is operatively connected to the power distribution mechanism 140 via an input/output shaft 152. The second motor generator 112 is mainly used as an electric motor. When the second motor generator 112 is used as the electric motor, the second motor generator 112 is driven by the electric power supplied thereto from the battery 120 via the inverter 131 of the PCU 130. The second motor generator 112 is also used as an electric generator. When the second motor generator 112 is used as the electric generator, a rotation shaft of the second motor generator 112 is rotated by the external forces such as the moving energy of the vehicle 100 and the torque output from the engine 110, thereby generating the electric power. The generated electric power is charged in the battery 120 via the inverter 131 of the PCU 130.

Figure 2:
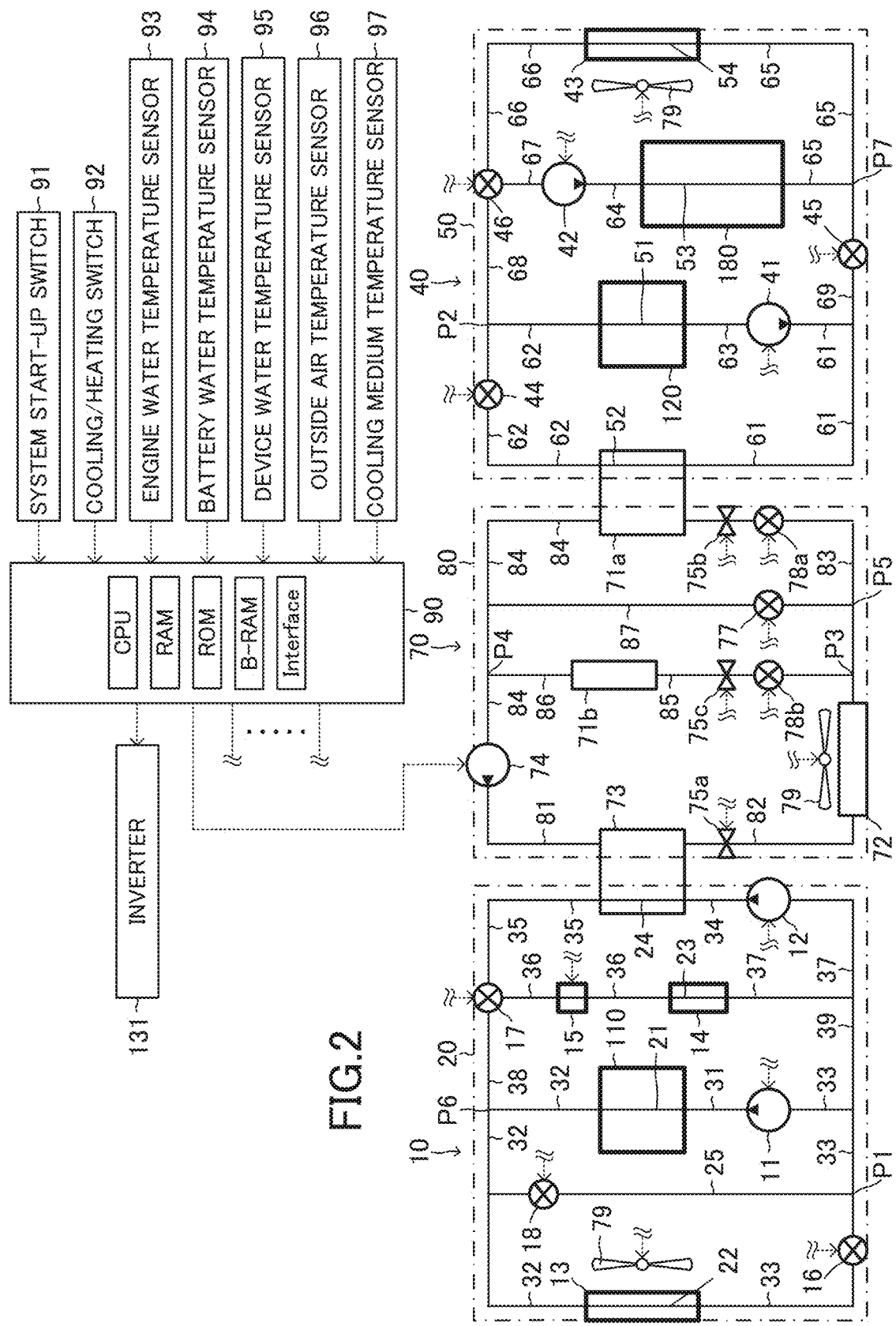
FIG. 2 is a view for showing the cooling apparatus according to the embodiment.

As shown in FIG. 2, the inverter 131 is electrically connected to an ECU 90. The ECU 90 is an electronic control unit or an electronic control circuit including as a main component a microcomputer including a CPU, a ROM, a RAM, an interface, etc. The CPU realizes various functions described later by executing instructions or routines stored in a memory, i.e., the ROM.

An activation of the inverter 131 is controlled by the ECU 90. The ECU 90 controls activations of the first and second motor generators 111 and 112 by controlling the activation of the inverter 131.

The embodiment apparatus includes an engine system temperature control apparatus 10, a hybrid system temperature control apparatus 40, a heat pump 70, and a heat exchanging fan 79.

<Engine System Temperature Control Apparatus>

The engine system temperature control apparatus 10 includes an engine pump 11, a heating pump 12, an engine radiator 13, a heater core 14, an electric heater 15, an engine water passage shut-off valve 16, an engine flow rate control valve 17, an engine bypass valve 18, and an engine water circulation passage 20.

Below, the embodiment apparatus will be described, using the cooling water as liquid which flows in the engine water circulation passage 20 and a hybrid system water circulation passage 50 described later. The liquid which flows in the engine water circulation passage 20 and the hybrid system water circulation passage 50 may be liquid capable of exchanging heat, that is, heat exchanging liquid.

Figure 3A:
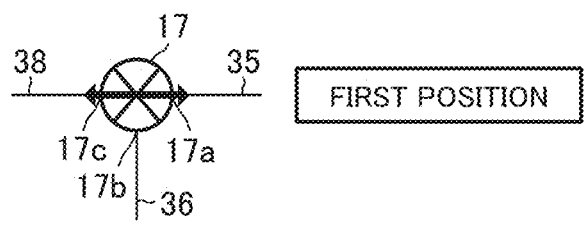
FIG. 3A is a view for showing flow of cooling water when an engine flow rate control valve of the cooling apparatus according to the embodiment is set at a first position.

As shown in FIG. 3A, the engine flow rate control valve 17 includes a first engine port 17a, a second engine port 17b, and a third engine port 17c.

As shown in FIG. 2, the engine water circulation passage 20 is formed by an engine internal water passage 21, an engine radiator water passage 22, a core water passage 23, a condenser water passage 24, an engine bypass water passage 25, a first to ninth engine water passages 31 to 39, an internal water passage (not shown) of the engine pump 11, an internal water passage (not shown) of the heating pump 12, and an internal water passage (not shown) of the engine flow rate control valve 17.

The engine internal water passage 21 is a passage for the cooling water and is formed in the engine 110. The engine radiator water passage 22 is a passage for the cooling water and is formed in the engine radiator 13. The core water passage 23 is a passage for the cooling water and is formed in the heater core 14. The condenser water passage 24 is a passage for the cooling water and is formed in a condenser 73 of the heat pump 70 described later in detail.

The first engine water passage 31 is a passage for the cooling water and fluidically connects a cooling water discharging opening of the engine pump 11 to the engine internal water passage 21. The second engine water passage 32 is a passage for the cooling water and fluidically connects an outlet of the engine internal water passage 21 to an inlet of the engine radiator water passage 22. The third engine water passage 33 is a passage for the cooling water and fluidically connects an outlet of the engine radiator water passage 22 to a cooling water suctioning opening of the engine pump 11. The fourth engine water passage 34 is a passage for the cooling water and fluidically connects a cooling water discharging opening of the heating pump 12 to an end of the condenser water passage 24.

The engine bypass water passage 25 is a passage for the cooling water and fluidically connects the second engine water passage 32 to the third engine water passage 33.

The fifth engine water passage 35 is a passage for the cooling water and fluidically connects the other end of the condenser water passage 24 to the first engine port 17a of the engine flow rate control valve 17. The sixth engine water passage 36 is a passage for the cooling water and fluidically connects the second engine port 17b of the engine flow rate control valve 17 to an inlet of the core water passage 23. The seventh engine water passage 37 is a passage for the cooling water and fluidically connects an outlet of the core water passage 23 to a cooling water suctioning opening of the heating pump 12. The eighth engine water passage 38 is a passage for the cooling water. An end of the eighth engine water passage 38 is fluidically connected to the second engine water passage 32. The other end of the eighth engine water passage 38 is fluidically connected to the third engine port 17c of the engine flow rate control valve 17. The ninth engine water passage 39 is a passage for the cooling water. An end of the ninth engine water passage 39 is fluidically connected to the seventh engine water passage 37. The other end of the ninth engine water passage 39 is fluidically connected to the third engine water passage 33 between the engine pump 11 and a portion P1 of the third engine water passage 33. The engine bypass water passage 25 is fluidically connected to the portion P1 of the third engine water passage 33. Hereinafter, the portion P1 will be referred to as "the connection portion P1".

The engine water passage shut-off valve 16 is provided in the third engine water passage 33 between the outlet of the engine radiator water passage 22 and the connection portion P1. The engine water passage shut-off valve 16 is electrically connected to the ECU 90. A setting position of the engine water passage shut-off valve 16 is controlled by the ECU 90. When the engine water passage shut-off valve 16 is set at an open position, the cooling water can flow through the engine water passage shut-off valve 16. On the other hand, when the engine water passage shut-off valve 16 is set at a closed position, the cooling water cannot flow through the engine water passage shut-off valve 16.

The engine bypass valve 18 is provided in the engine bypass water passage 25. The engine bypass valve 18 is electrically connected to the ECU 90. A setting position of the engine bypass valve 18 is controlled by the ECU 90. When the engine bypass valve 18 is set at an open position, the cooling water can flow through the engine bypass valve 18. On the other hand, when the engine bypass valve 18 is set at a closed position, the cooling water cannot flow through the engine bypass valve 18.

Figure 3B:
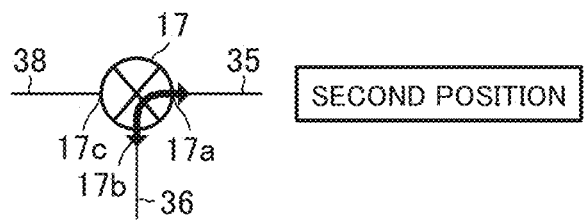
FIG. 3B is a view for showing the flow of the cooling water when the engine flow rate control valve is set at a second position.
Figure 3C:
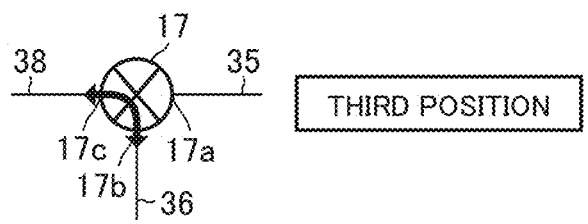
FIG. 3C is a view for showing the flow of the cooling water when the engine flow rate control valve is set at a third position.
Figure 3D:
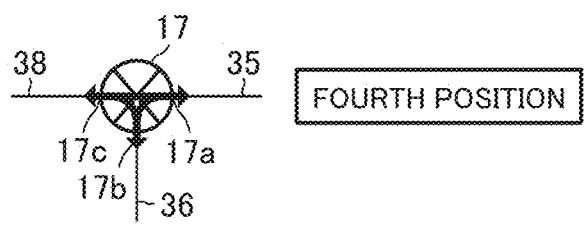
FIG. 3D is a view for showing the flow of the cooling water when the engine flow rate control valve is set at a fourth position.

The engine flow rate control valve 17 is electrically connected to the ECU 90. A setting position of the engine flow rate control valve 17 is controlled by the ECU 90. When the engine flow rate control valve 17 is set at a first position, the engine flow rate control valve 17 fluidically connects the fifth and eighth engine water passages 35 and 38 to each other as shown in FIG. 3A. When the engine flow rate control valve 17 is set at a second position, the engine flow rate control valve 17 fluidically connects the fifth and sixth engine water passages 35 and 36 to each other as shown in FIG. 3B. When the engine flow rate control valve 17 is set at a third position, the engine flow rate control valve 17 fluidically connects the eighth and sixth engine water passages 38 and 36 to each other as shown in FIG. 3C. When the engine flow rate control valve 17 is set at a fourth position, the engine flow rate control valve 17 fluidically connects the eighth and sixth engine water passages 38 and 36 to each other, connects the fifth and sixth engine water passages 35 and 36 to each other, and connects the fifth and eighth engine water passages 35 and 38 to each other as shown in FIG. 3D. When the engine flow rate control valve 17 is set at a closed position, the cooling water cannot flow through the engine flow rate control valve 17.

As shown in FIG. 2, the electric heater 15 is provided in the sixth engine water passage 36. The electric heater 15 is electrically connected to the ECU 90. An activation of the electric heater 15 is controlled by the ECU 90. The ECU 90 sets the engine flow rate control valve 17 at the first position and activates the electric heater 15 and the heating pump 12 when a process of heating the heater core 14 is requested, and the heater core 14 cannot be heated by heat of the engine 110. Also, the ECU 90 sets the engine flow rate control valve 17 at the first position and activates the electric heater 15 and the heating pump 12 when the process of heating the heater core 14 is requested, and the heater core 14 cannot be heated by the heat pump 70. In these cases, the heater core 14 is heated by the cooling water heated by the electric heater 15.

The engine pump 11 is electrically connected to the ECU 90. An activation of the engine pump 11 is controlled by the ECU 90. The heating pump 12 is electrically connected to the ECU 90. An activation of the heating pump 12 is controlled by the ECU 90.

The heat exchanging fan 79 is provided near the engine radiator 13, a hybrid system radiator 43, and an outside air heat exchanger 72 to supply the outside air to the engine radiator 13, the hybrid system radiator 43, and the outside air heat exchanger 72. The heat exchanging fan 79 is electrically connected to the ECU 90. An activation of the heat exchanging fan 79 is controlled by the ECU 90. In the drawings, the heat exchanging fan 79 is shown near the engine radiator 13, the hybrid system radiator 43, and the outside air heat exchanger 72, respectively.

<Hybrid System Temperature Control Apparatus>

The hybrid system temperature control apparatus 40 includes a battery pump 41, a device pump 42, the hybrid system radiator 43, a first hybrid system water passage shut-off valve 44, a second hybrid system water passage shut-off valve 45, a hybrid system flow rate control valve 46, and the hybrid system water circulation passage 50.

Figure 4A:
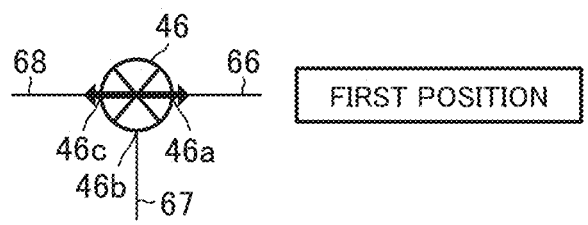
FIG. 4A is a view for showing the flow of the cooling water when a hybrid device flow rate control valve of the cooling apparatus according to the embodiment is set at a first position.

As shown in FIG. 4A, the hybrid system flow rate control valve 46 includes a first hybrid system port 46a, a second hybrid system port 46b, and a third hybrid system port 46c.

As shown in FIG. 2, the hybrid system water circulation passage 50 is formed by a battery water passage 51, an evaporator water passage 52, a device water passage 53, a hybrid system radiator water passage 54, first to ninth hybrid system water passages 61 to 69, an internal water passage (not shown) of the battery pump 41, an internal water passage (not shown) of the device pump 42, and an internal water passage (not shown) of the hybrid system flow rate control valve 46.

The battery water passage 51 is a passage for the cooling water and is formed in the battery 120. The evaporator water passage 52 is a passage for the cooling water and is formed in a first evaporator 71a of the heat pump 70. The device water passage 53 is a passage for the cooling water and is formed in the hybrid device 180. The hybrid system radiator water passage 54 is a passage for the cooling water and is formed in the hybrid system radiator 43.

The first hybrid system water passage 61 is a passage for the cooling water and fluidically connects a cooling water discharging opening of the battery pump 41 to an inlet of the evaporator water passage 52. The second hybrid system water passage 62 is a passage for the cooling water and fluidically connects an outlet of the evaporator water passage 52 to an inlet of the battery water passage 51. The third hybrid system water passage 63 is a passage for the cooling water and fluidically connects an outlet of the battery water passage 51 to a cooling water suctioning opening of the battery pump 41. The fourth hybrid system water passage 64 is a passage for the cooling water and fluidically connects a cooling water discharging opening of the device pump 42 to an inlet of the device water passage 53. The fifth hybrid system water passage 65 is a passage for the cooling water and fluidically connects an outlet of the device water passage 53 to an inlet of the hybrid system radiator water passage 54.

The sixth hybrid system water passage 66 is a passage for the cooling water and fluidically connects an outlet of the hybrid system radiator water passage 54 to the first hybrid system port 46a of the hybrid system flow rate control valve 46. The seventh hybrid system water passage 67 is a passage for the cooling water and fluidically connects the second hybrid system port 46b of the hybrid system flow rate control valve 46 to a cooling water suctioning opening of the device pump 42. The eighth hybrid system water passage 68 is a passage for the cooling water. An end of the eighth hybrid system water passage 68 is fluidically connected to the second hybrid system water passage 62. The other end of the eighth hybrid system water passage 68 is fluidically connected to the third hybrid system port 46c of the hybrid system flow rate control valve 46. The ninth hybrid system water passage 69 is a passage for the cooling water. An end of the ninth hybrid system water passage 69 is fluidically connected to the fifth hybrid system water passage 65. The other end of the ninth hybrid system water passage 69 is fluidically connected to the first hybrid system water passage 61.

The first hybrid system water passage shut-off valve 44 is provided in the second hybrid system water passage 62 between the outlet of the evaporator water passage 52 and a portion P2 of the second hybrid system water passage 62. The eighth hybrid system water passage 68 is fluidically connected to the portion P2 of the second hybrid system water passage 62. The first hybrid system water passage shut-off valve 44 is electrically connected to the ECU 90. A setting position of the first hybrid system water passage shut-off valve 44 is controlled by the ECU 90. When the first hybrid system water passage shut-off valve 44 is set at an open position, the cooling water can flow through the first hybrid system water passage shut-off valve 44. On the other hand, when the first hybrid system water passage shut-off valve 44 is set at a closed position, the cooling water cannot flow through the first hybrid system water passage shut-off valve 44.

The second hybrid system water passage shut-off valve 45 is provided in the ninth hybrid system water passage 69. The second hybrid system water passage shut-off valve 45 is electrically connected to the ECU 90. A setting position of the second hybrid system water passage shut-off valve 45 is controlled by the ECU 90. When the second hybrid system water passage shut-off valve 45 is set at an open position, the cooling water can flow through the second hybrid system water passage shut-off valve 45. On the other hand, when the second hybrid system water passage shut-off valve 45 is set at a closed position, the cooling water cannot flow through the second hybrid system water passage shut-off valve 45.

Figure 4B:
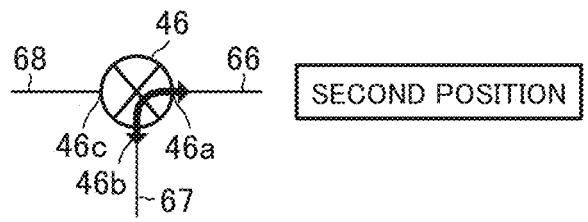
FIG. 4B is a view for showing the flow of the cooling water when the hybrid device flow rate control valve is set at a second position.
Figure 4C:
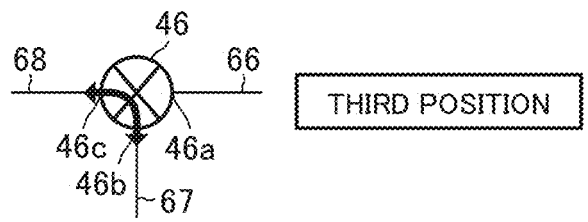
FIG. 4C is a view for showing the flow of the cooling water when the hybrid device flow rate control valve is set at a third position.
Figure 4D:
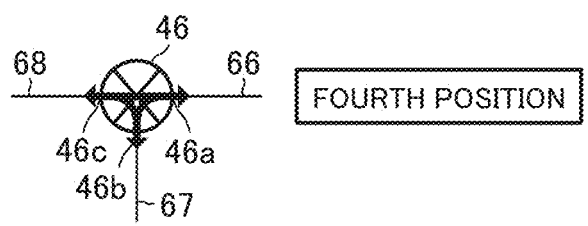
FIG. 4D is a view for showing the flow of the cooling water when the hybrid device flow rate control valve is set at a fourth position.

The hybrid system flow rate control valve 46 is electrically connected to the ECU 90. A setting position of the hybrid system flow rate control valve 46 is controlled by the ECU 90. When the hybrid system flow rate control valve 46 is set at a first position, the hybrid system flow rate control valve 46 fluidically connects the sixth and eighth hybrid system water passages 66 and 68 to each other as shown in FIG. 4A. When the hybrid system flow rate control valve 46 is set at a second position, the hybrid system flow rate control valve 46 fluidically connects the sixth and seventh hybrid system water passages 66 and 67 to each other as shown in FIG. 4B. When the hybrid system flow rate control valve 46 is set at a third position, the hybrid system flow rate control valve 46 fluidically connects the eighth and seventh hybrid system water passages 68 and 67 to each other as shown in FIG. 4C. When the hybrid system flow rate control valve 46 is set at a fourth position, the hybrid system flow rate control valve 46 fluidically connects the eighth and seventh hybrid system water passages 68 and 67 to each other, connects the sixth and seventh hybrid system water passages 66 and 67 to each other, and connects the sixth and eighth hybrid system water passages 66 and 68 to each other as shown in FIG. 4D. When the hybrid system flow rate control valve 46 is set at a closed position, the cooling water cannot flow through the hybrid system flow rate control valve 46.

As shown in FIG. 2, the battery pump 41 is electrically connected to the ECU 90. An activation of the battery pump 41 is controlled by the ECU 90. The device pump 42 is electrically connected to the ECU 90. An activation of the device pump 42 is controlled by the ECU 90.

<Heat Pump>

The heat pump 70 includes the first evaporator 71a, a second evaporator 71b, the outside air heat exchanger 72, the condenser 73, a compressor 74, a first expansion valve 75a, a second expansion valve 75b, a third expansion valve 75c, a heat pump bypass valve 77, a first cooling medium passage shut-off valve 78a, a second cooling medium passage shut-off valve 78b, and a cooling medium circulation passage 80.

The cooling medium circulation passage 80 is formed by an internal passage (not shown) of the first evaporator 71a, an internal passage (not shown) of the second evaporator 71b, an internal passage (not shown) of the outside air heat exchanger 72, an internal passage (not shown) of the condenser 73, first to sixth cooling medium passages 81 to 86, and a bypass passage 87.

The first cooling medium passage 81 is a passage for cooling medium and fluidically connects a cooling medium discharging opening of the compressor 74 to a cooling medium inlet of the condenser 73. The second cooling medium passage 82 is a passage for the cooling medium and fluidically connects a cooling medium outlet of the condenser 73 to a cooling medium inlet of the outside air heat exchanger 72. The third cooling medium passage 83 is a passage for the cooling medium and fluidically connects a cooling medium outlet of the outside air heat exchanger 72 to a cooling medium inlet of the first evaporator 71a. The fourth cooling medium passage 84 is a passage for the cooling medium and fluidically connects a cooling medium inlet of the first evaporator 71a to a cooling medium suctioning opening of the compressor 74. The fifth cooling medium passage 85 is a passage for the cooling medium and fluidically connects the third cooling medium passage 83 to a cooling medium inlet of the second evaporator 71b. The sixth cooling medium passage 86 is a passage for the cooling medium and fluidically connects a cooling medium outlet of the second evaporator 71b to the fourth cooling medium passage 84. The bypass passage 87 is a passage for the cooling medium and fluidically connects a portion P5 of the third cooling medium passage 83 to a portion of the fourth cooling medium passage 84 which is between the cooling medium outlet of the first evaporator 71a and a portion P4 of the fourth cooling medium passage 84. The bypass passage 87 is fluidically connected to the portion P5 of the third cooling medium passage 83. The portion P5 is between the cooling medium inlet of the first evaporator 71a and a portion P3 of the third cooling medium passage 83. Hereinafter, the portion P5 will be referred to as "the connection portion P5". The fifth cooling medium passage 85 is fluidically connected to the portion P3 of the third cooling medium passage 83. Hereinafter, the portion P3 will be referred to as "the connection portion P3". The sixth cooling medium passage 86 is fluidically connected to the portion P4 of the fourth cooling medium passage 84. Hereinafter, the portion P4 will be referred to as "the connection portion P4".

The first expansion valve 75a is provided in the second cooling medium passage 82. The first expansion valve 75a is electrically connected to the ECU 90. An activation of the first expansion valve 75a is controlled by the ECU 90. When the first expansion valve 75a is set at a decompression position, a pressure of the cooling medium decreases while the cooling medium flows through the first expansion valve 75a. As a result, the cooling medium is likely to evaporate. On the other hand, when the first expansion valve 75a is set at a non-decompression position, the pressure of the cooling medium does not change even when the cooling medium flows through the first expansion valve 75a.

The second expansion valve 75*b* is provided in the third cooling medium passage 83 between the cooling medium inlet of the first evaporator 71*a* and the connection portion P5. The second expansion valve 75*b* is electrically connected to the ECU 90. An activation of the second expansion valve 75*b* is controlled by the ECU 90. When the second expansion valve 75*b* is set at a decompression position, the pressure of the cooling medium decreases while the cooling medium flows through the second expansion valve 75*b*. As a result, the cooling medium is likely to evaporate. On the other hand, when the second expansion valve 75*b* is set at a non-decompression position, the pressure of the cooling medium does not change even when the cooling medium flows through the second expansion valve 75*b*.

The third expansion valve 75*c* is provided in the fifth cooling medium passage 85. The third expansion valve 75*c* is electrically connected to the ECU 90. An activation of the third expansion valve 75*c* is controlled by the ECU 90. When the third expansion valve 75*c* is set at a decompression position, the pressure of the cooling medium decreases while the cooling medium flows through the third expansion valve 75*c*. As a result, the cooling medium is likely to evaporate. On the other hand, when the third expansion valve 75*c* is set at a non-decompression position, the pressure of the cooling medium does not change even when the cooling medium flows through the third expansion valve 75*c*.

The first cooling medium passage shut-off valve 78*a* is provided in the third cooling medium passage 83 between the second expansion valve 75*b* and the connection portion P5. The first cooling medium passage shut-off valve 78*a* is electrically connected to the ECU 90. An activation of the first cooling medium passage shut-off valve 78*a* is controlled by the ECU 90. When the first cooling medium passage shut-off valve 78*a* is set at an open position, the cooling medium can flow through the first cooling medium passage shut-off valve 78*a*. On the other hand, when the first cooling medium passage shut-off valve 78*a* is set at a closed position, the cooling medium cannot flow through the first cooling medium passage shut-off valve 78*a*.

The second cooling medium passage shut-off valve 78*b* is provided in the fifth cooling medium passage 85 between the third expansion valve 75*c* and the connection portion P3. The second cooling medium passage shut-off valve 78*b* is electrically connected to the ECU 90. An activation of the first cooling medium passage shut-off valve 78*a* is controlled by the ECU 90. When the second cooling medium passage shut-off valve 78*b* is set at an open position, the cooling medium can flow through the second cooling medium passage shut-off valve 78*b*. On the other hand, when the second cooling medium passage shut-off valve 78*b* is set at a closed position, the cooling medium cannot flow through the second cooling medium passage shut-off valve 78*b*.

The heat pump bypass valve 77 is provided in the bypass passage 87. The heat pump bypass valve 77 is electrically connected to the ECU 90. A setting position of the heat pump bypass valve 77 is controlled by the ECU 90. When the heat pump bypass valve 77 is set at an open position, the cooling medium can flow through the heat pump bypass valve 77. On the other hand, when the heat pump bypass valve 77 is set at a closed position, the cooling medium cannot flow through the heat pump bypass valve 77.

The compressor 74 is electrically connected to the ECU 90. An activation of the compressor 74 is controlled by the ECU 90.

<System Start-Up Switch>

A system start-up switch 91 is a switch which is operated by a driver of the vehicle 100. The system start-up switch 91 is electrically connected to the ECU 90. When the system start-up switch 91 is set at an ON position by the driver, the ECU 90 enters into a ready state to operate the engine 110 and/or activate the first motor generator 111 and/or the second motor generator 112, depending on output power PDreq requested to be supplied to the driving wheels 170 via the wheel drive shaft 160. On the other hand, when the system start-up switch 91 is set at an OFF position by the driver, the ECU 90 stops operating the engine 110 and activating the first and second motor generators 111 and 112.

<Heating/Cooling Switch>

A cooling/heating switch 92 is a switch which is operated by the driver of the vehicle 100. The cooling/heating switch 92 is electrically connected to the ECU 90. When the cooling/heating switch 92 is set at a cooling position by the driver while the system start-up switch 91 is set at the ON position, the ECU 90 determines that a process of cooling an interior of the vehicle 100 is requested. On the other hand, when the cooling/heating switch 92 is set at a heating position by the driver while the system start-up switch 91 is set at the ON position, the ECU 90 determines that a process of heating the interior of the vehicle 100 is requested. When the cooling/heating switch 92 is set at an OFF position by the driver while the system start-up switch 91 is set at the ON position, the ECU 90 determines that the processes of cooling and heating the interior of the vehicle 100 are not requested. In addition, when the system start-up switch 91 is set at the OFF position while the cooling/heating switch 92 is set at the cooling or heating position, the ECU 90 determines that the processes of cooling and heating the interior of the vehicle 100 are not requested.

When the process of cooling the interior of the vehicle 100 is requested by the driver of the vehicle 100, the embodiment apparatus activates a fan (not shown) provided near the second evaporator 71*b*, thereby, supplying the outside air to the second evaporator 71*b* to supply the air cooled by the second evaporator 71*b* to the interior of the vehicle 100. Thereby, the interior of the vehicle 100 is cooled.

When the process of heating the interior of the vehicle 100 is requested by the driver of the vehicle 100, the embodiment apparatus activates a fan (not shown) provided near the heater core 14, thereby, supplying the outside air to the heater core 14 to supply the air heated by the cooling water flowing through the core water passage 23 to the interior of the vehicle 100. Thereby, the interior of the vehicle 100 is heated.

<Sensors>

An engine water temperature sensor 93 is provided at the second engine water passage 32 between the outlet of the engine internal water passage 21 and a portion P6 of the second engine water passage 32. The eighth engine water passage 38 is fluidically connected to the portion P6 of the second engine water passage 32. The engine water temperature sensor 93 is electrically connected to the ECU 90. The engine water temperature sensor 93 detects a temperature of the cooling water flowing out of the engine internal water passage 21 and outputs a signal representing the detected temperature to the ECU 90. The ECU 90 acquires the temperature of the cooling water flowing out of the engine internal water passage 21 as an engine water temperature TWeng on the basis of the signal output from the engine water temperature sensor 93.

A battery water temperature sensor 94 is provided at the third hybrid system water passage 63. The battery water temperature sensor 94 is electrically connected to the ECU 90. The battery water temperature sensor 94 detects a temperature of the cooling water flowing out of the battery water passage 51 and outputs a signal representing the detected temperature to the ECU 90. The ECU 90 acquires the temperature of the cooling water flowing out of the battery water passage 51 as a battery water temperature TWbat on the basis of the signal output from the battery water temperature sensor 94.

A device water temperature sensor 95 is provided at the fifth hybrid system water passage 65 between the outlet of the device water passage 53 and a portion P7 of the fifth hybrid system water passage 65. The ninth hybrid system water passage 69 is fluidically connected to the portion P7 of the fifth hybrid system water passage 65. The device water temperature sensor 95 is electrically connected to the ECU 90. The device water temperature sensor 95 detects a temperature of the cooling water flowing out of the device water passage 53 and outputs a signal representing the detected temperature to the ECU 90. The ECU 90 acquires the temperature of the cooling water flowing out of the device water passage 53 as a device water temperature TWdev on the basis of the signal output from the device water temperature sensor 95.

An outside air temperature sensor 96 is provided at a position of the vehicle 100 where the outside air temperature sensor 96 can detect a temperature of the outside air without being subject to heat generated by the engine 110, the first motor generator 111, the second motor generator 112, etc. The outside air temperature sensor 96 is electrically connected to the ECU 90. The outside air temperature sensor 96 detects the temperature of the outside air and outputs a signal representing the detected temperature to the ECU 90. The ECU 90 acquires the temperature of the outside air as an outside air temperature Tair on the basis of the signal output from the outside air temperature sensor 96.

A cooling medium temperature sensor 97 is provided at the first cooling medium passage 81 The cooling medium temperature sensor 97 is electrically connected to the ECU 90. The cooling medium temperature sensor 97 detects a temperature of the cooling medium discharged from the compressor 74 and outputs a signal representing the detected temperature to the ECU 90. The ECU 90 acquires the temperature of the cooling medium as a cooling medium temperature TC on the basis of the signal output from the cooling medium temperature sensor 97.

<Summary of Operation of Embodiment Apparatus>

Next, a summary of an operation of the embodiment apparatus will be described.

<Operation of Engine, Etc.>

The embodiment apparatus calculates the requested driving output power PDreq to be supplied to the driving wheels 170 via the wheel drive shaft 160 as is known in the art. The embodiment apparatus calculates power to be output from the engine 110 to the power distribution mechanism 140, power to be output from the first motor generator 111 to the power distribution mechanism 140, and power to be output from the second motor generator 112 to the power distribution mechanism 140 on the basis of the requested driving output power PDreq as a target engine output power PEtgt, a target first motor generator output power PM1tgt, and a target second motor generator output power PM2tgt.

The embodiment apparatus controls an operation of the engine 110 to cause the engine 110 to output power corresponding to the target engine output power PEtgt to the power distribution mechanism 140 and controls an activation of the inverter 131 to cause the first and second motor generators 111 and 112 to output powers corresponding to the target first and second motor generator output powers PM1tgt and PM2tgt, respectively.

<Activations of Hybrid System Temperature Control Apparatus and Heat Pump>

When the electric power is supplied to the first motor generator 111 or the second motor generator 112 from the battery 120, the battery 120 generates heat. The battery 120 supplies the electric power efficiently when a temperature Tbat of the battery 120 is maintained within a predetermined battery temperature range WTbat higher than zero degree Celsius. Accordingly, the embodiment apparatus determines that a process of cooling the battery 120 is requested when the battery 120 supplies the electric power, and the battery water temperature TWbat is equal to or higher than a battery warmed water temperature TWbat_dan. In this embodiment, the battery warmed water temperature TWbat_dan corresponds to the battery water temperature TWbat when the temperature Tbat of the battery 120 corresponds to a lower limit temperature Tbat_lower of the predetermined battery temperature range WTbat. The battery warmed water temperature TWbat_dan may he previously set on the basis of a result of an experiment, etc. Hereinafter, the temperature Tbat will be referred to as "the battery temperature Tbat".

Similarly, when the hybrid device 180 operates, the hybrid device 180 generates heat. The hybrid device 180 operates optimally when a temperature Tdev of the hybrid device 180 is maintained within a predetermined device temperature range WTdev higher than zero degree Celsius. Accordingly, the embodiment apparatus determines that a process of cooling the hybrid device 180 is requested when the hybrid device 180 operates, and the device water temperature TWdev is equal to and higher than a device warmed water temperature TWdev_dan. In this embodiment, the device warmed water temperature TWdev_dan corresponds to the device water temperature TWdev when the temperature Tdev of the hybrid device 180 corresponds to a lower limit temperature Tdev_lower of the predetermined device temperature range WTdev. The device warmed water temperature TWdev dan may be previously set on the basis of the result of the experiment, etc. Hereinafter, the temperature Tdev of the hybrid device 180 will be referred to as "the device temperature Tdev".

When the outside air temperature Tair is high, an ability of the hybrid system radiator 43 to cool the cooling water is low. Therefore, when the outside air temperature Tair is high, and the cooling water supplied to the battery water passage 51 and the device water passage 53 is cooled only by the hybrid system radiator 43, the battery and device temperatures Tbat and Tdev may not be maintained within the predetermined battery and device temperature ranges WTbat and WTdev, respectively. Hereinafter, the cooling water supplied to the battery water passage 51 will be referred to as "the battery cooling water", and the cooling water supplied to the device water passage 53 will be referred to as "the device cooling water".

Further, the ability of the hybrid system radiator 43 to cool the cooling water is limited. When a sum of the powers output from the first and second motor generators 111 and 112 is large, an amount of the heat generated by the hybrid device 180 is large. Therefore, when the sum of the powers output from the first and second motor generators 111 and 112 is large, and the battery cooling water and the device cooling water are cooled only by the hybrid system radiator 43, the battery and device temperatures Tbat and Tdev may not be maintained within the predetermined battery and device temperature ranges WTbat and WTdev, respectively.

Hereinafter, the sum of the powers output from the first and second motor generators 111 and 112 will be referred to "the motor output power PMtotal".

Similarly, when the battery temperature Tbat (in particular, temperatures of cells of the battery 120) is high, and the battery cooling water and the device cooling water are cooled only by the hybrid system radiator 43, the battery and device temperatures Tbat and Tdev may not be maintained within the predetermined battery and device temperature ranges WTbat and WTdev, respectively.

Similarly, when a sum of an amount of the heat generated by the first motor generator 111 and an amount of the heat generated by the second motor generator 112 is large, and the battery cooling water and the device cooling water are cooled only by the hybrid system radiator 43, the battery and device temperatures Tbat and Tdev may not be maintained within the predetermined battery and device temperature ranges WTbat and WTdev, respectively. Hereinafter, the sum of the amount of the heat generated by the first motor generator 111 and the amount of the heat generated by the second motor generator 112 will be referred to as "the motor heat generation amount HM".

Therefore, when the outside air temperature Tair is high or when the motor output power PMtotal is large or when the battery temperature Tbat is high, or when the motor heat generation amount HM is large, it is preferred that the battery cooling water is cooled by the heat pump 70, and the device cooling water is cooled by the hybrid system radiator 43.

Accordingly, the embodiment apparatus determines whether a heat pump activation condition is satisfied when the processes of cooing the battery 120 and the hybrid device 180 are requested. The heat pump activation condition is satisfied when at least one of four request conditions CHP1 to CHP4 described below is satisfied.

(1) The request condition CHP1 is satisfied when the outside air temperature Tair is higher than a predetermined temperature Tair_th.

(2) The request condition CHP2 is satisfied when the motor output power PMtotal is larger than a water-cooling upper limit power PMupper. The embodiment apparatus uses a sum of the target first and second motor generator output powers PM1*tgt* and PM2*tgt* as the motor output power PMtotal.

(3) The request condition CHP3 is satisfied when the battery water temperature TWbat is higher than a water-cooling upper limit water temperature TWbat_upper. In this embodiment, the battery water temperature TWbat is used as a parameter representing the battery temperature Tbat, in particular, the temperatures of the cells of the battery 120.

(4) The request condition is satisfied when the motor heat generation amount HM is larger than a water-cooling upper limit heat generation amount HMupper. The embodiment apparatus acquires the motor heat generation amount HM on the basis of the target first motor generator output power PM1*tgt*, the target second motor generator output power PM2*tgt*, etc.

In this embodiment, the predetermined temperature Tair_th is an upper limit of the outside air temperature Tair, at which the battery and device temperatures Tbat and Tdev can be maintained within the battery and device water temperature ranges WTbat and WTdev, respectively by cooling the battery cooling water and the battery cooling water only by the hybrid system radiator 43. The predetermined temperature Tair_th may be previously set on the basis of the result of the experiment, etc. and for example, is set to 35 degrees Celsius.

Further, in this embodiment, the water-cooling upper limit output power PMupper is an upper limit of the motor output power PMtotal, at which the battery and device temperatures Tbat and Tdev can be maintained within the predetermined battery and device temperature ranges WTbat and WTdev, respectively by cooling the battery cooling water and the device cooling water only by the hybrid system radiator 43. The water-cooling upper limit output power PMupper may be previously set on the basis of the result of the experiment, etc.

Furthermore, in this embodiment, the water-cooling upper limit water temperature TWbat_upper is an upper limit of the battery water temperature TWbat, at which the battery and device temperatures Tbat and Tdev are maintained within the predetermined battery and device temperature ranges WTbat and WTdev, respectively by cooling the battery cooling water and the device cooling water only by the hybrid system radiator 43. The water-cooling upper limit water temperature TWbat_upper may be previously set on the basis of the result of the experiment, etc. and for example, is set to 45 degrees Celsius. In this embodiment, the water-cooling upper limit water temperature TWbat_upper is set to a temperature equal to or higher than the battery warmed water temperature TWbat_dan. The water-cooling upper limit water temperature TWbat_upper is, for example, set to the battery water temperature TWbat corresponding to an upper limit temperature Tbat_upper of the predetermined battery temperature range WTbat.

Further, in this embodiment, the water-cooling upper limit heat generation amount HMupper is an upper limit of the motor heat generation amount HM, at which the battery and device temperatures Tbat and Tdev are maintained within the predetermined battery and device temperature ranges WTbat and WTdev, respectively by cooling the battery cooling water and the device cooling water only by the hybrid system radiator 43. The water-cooling upper limit heat generation amount HMupper may be previously set on the basis of the result of the experiment, etc.

<First Hybrid System Circulation Control and Heat Pump Circulation Stop Control>

Figure 5:
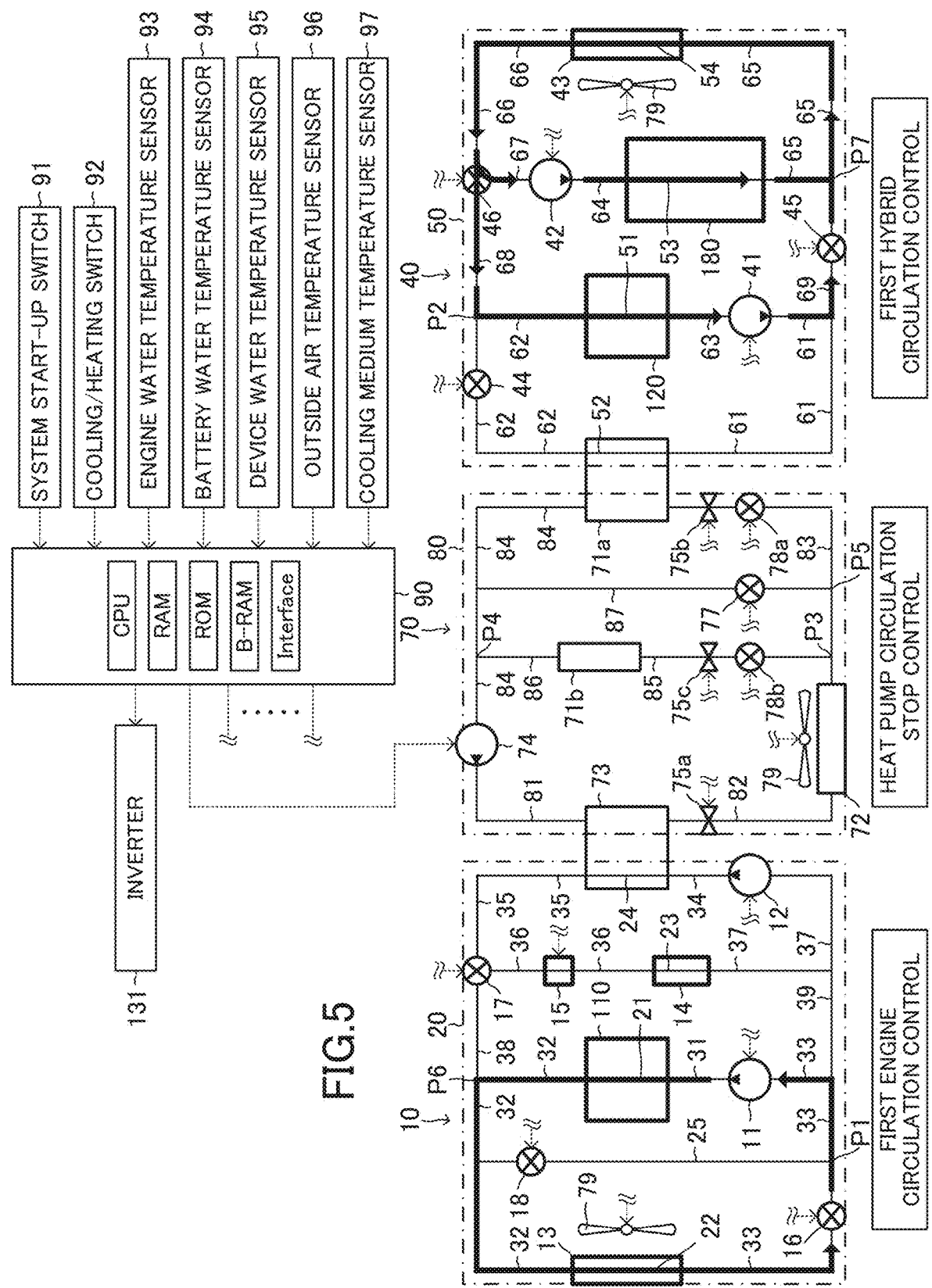
FIG. 5 is a view similar to FIG. 2, and which shows the flow of the cooling water.

When the process of cooling the battery 120 is requested, the process of cooling the hybrid device 180 is requested, and a heat pump activation condition is not satisfied, the embodiment apparatus executes a first hybrid circulation control for flowing the cooling water in the hybrid system water circulation passage 50 as shown by arrows in FIG. 5 and a heat pump circulation stop control for stopping activating the heat pump 70.

When the embodiment apparatus executes the first hybrid system circulation control, the embodiment apparatus sets the hybrid system flow rate control valve 46 at the fourth position, sets the first hybrid system water passage shut-off valve 44 at the closed position, sets the second hybrid system water passage shut-off valve 45 at the open position, and activates the battery pump 41, the device pump 42, and the heat exchanging fan 79.

Thereby, the cooling water discharged from the device pump 42 flows into the device water passage 53 through the fourth hybrid system water passage 64. The cooling water flows through the device water passage 53 and then, flows into the hybrid system radiator water passage 54 through the fifth hybrid system water passage 65. On the other hand, the cooling water discharged from the battery pump 41 flows into the hybrid system radiator water passage 54 through the first, ninth, and fifth hybrid system water passages 61, 69, and 65.

The cooling water flows through the hybrid system radiator water passage 54 and then, flows into the internal water passage of the hybrid system flow rate control valve 46 through the sixth hybrid system water passage 66. A part of the cooling water flowing into the internal water passage of the hybrid system flow rate control valve 46, is suctioned into the device pump 42 through the seventh hybrid system water passage 67. The remaining of the cooling water flowing into the internal water passage of the hybrid system flow rate control valve 46, flows into the battery water passage 51 through the eighth and second hybrid system water passages 68 and 62. The cooling water flows through the battery water passage 51 and then, is suctioned into the battery pump 41 through the third hybrid system water passage 63.

When the first hybrid system circulation control is executed, the cooling water is cooled while the cooling water flows through the hybrid system radiator water passage 54. The cooled cooling water is supplied to the device and battery water passages 53 and 51. Thereby, the hybrid device 180 and the battery 120 are cooled.

<Second Hybrid System Circulation Control and First Heat Pump Circulation Control>

Figure 6:
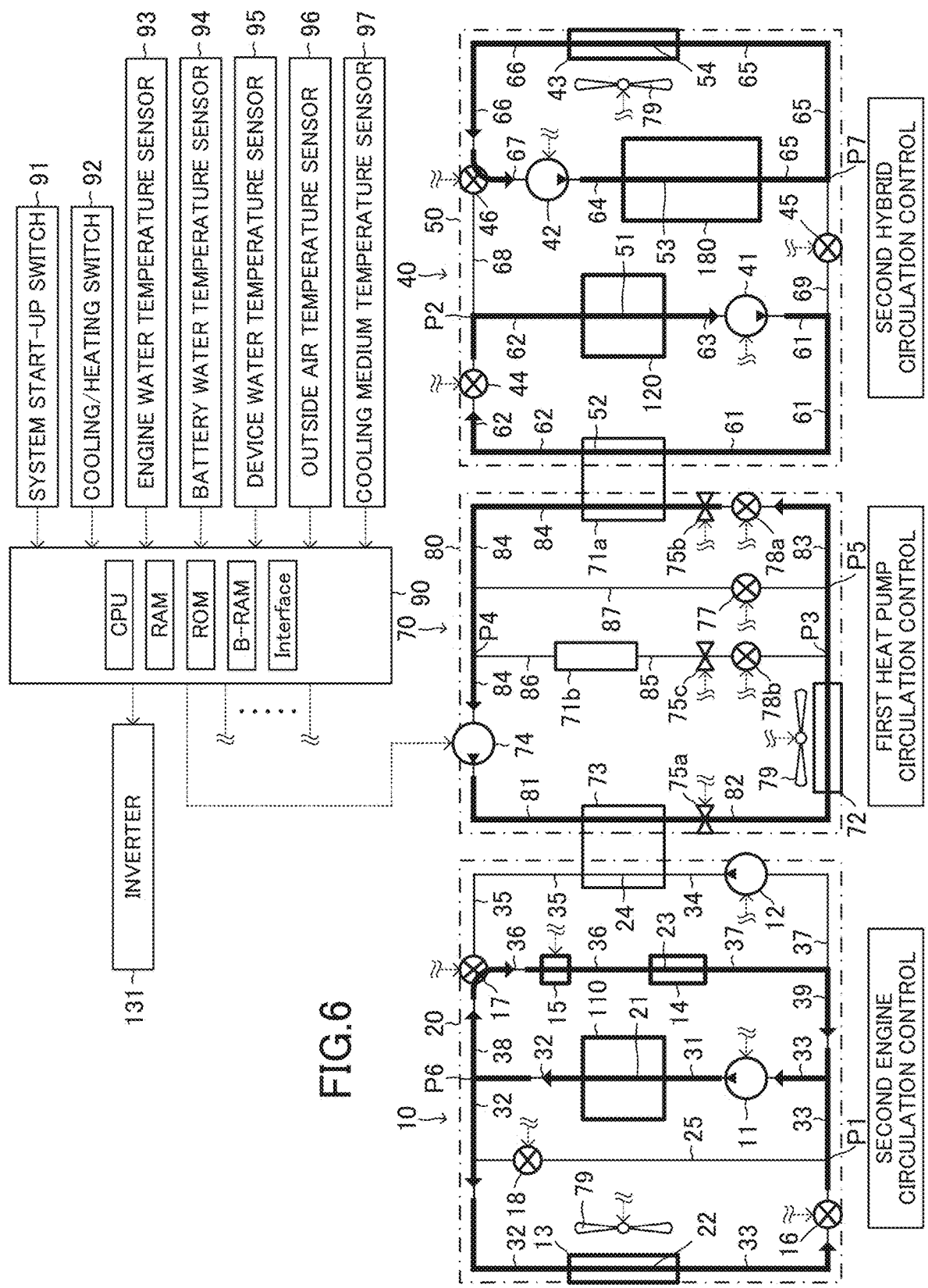
FIG. 6 is a view similar to FIG. 2, and which shows the flow of the cooling water and flow of cooling medium.

When the process of cooling the battery 120 and the process of cooling the hybrid device 180 are requested, and the heat pump activation condition is satisfied, the embodiment apparatus executes a second hybrid circulation control for flowing the cooling water in the hybrid system water circulation passage 50 as shown by arrows in FIG. 6 and a first heat pump circulation control for flowing the cooling medium in the cooling medium circulation passage 80 as shown by arrows in FIG. 6.

When the embodiment apparatus executes the second hybrid system circulation control, the embodiment apparatus sets the hybrid system flow rate control valve 46 at the second position, sets the first hybrid system water passage shut-off valve 44 at the open position, sets the second hybrid system water passage shut-off valve 45 at the closed position, and activates the battery pump 41, the device pump 42, and the heat exchanging fan 79.

Further, when the embodiment apparatus executes the first heat pump circulation control, the embodiment apparatus sets the first expansion valve 75a at the non-decompression position, sets the second expansion valve 75b at the decompression position, sets the heat pump bypass valve 77 at the closed position, sets the first cooling medium passage shut-off valve 78a at the open position, sets the second cooling medium passage shut-off valve 78b at the closed position, and activates the compressor 74. While the first heat pump circulation control is executed, the third expansion valve 75c may be set at any of the decompression and non-decompression positions.

While the second hybrid system circulation control is executed, the cooling water discharged from the device pump 42 flows into the device water passage 53 through the fourth hybrid system water passage 64. The cooling water flows through the device water passage 53 and then, flows into the hybrid system radiator water passage 54 through the fifth hybrid system water passage 65. The cooling water flows through the hybrid system radiator water passage 54 and then, is suctioned into the device pump 42 through the sixth hybrid system water passage 66, the internal water passage of the hybrid system flow rate control valve 46, and the seventh hybrid system water passage 67. Thereby, the cooling water is cooled while the cooling water flows through the hybrid system radiator water passage 54. The cooled cooling water is supplied to the device water passage 53. The hybrid device 180 is cooled by the cooled cooling water.

On the other hand, the cooling water discharged from the battery pump 41 flows into the evaporator water passage 52 through the first hybrid system water passage 61. The cooling water flows through the evaporator water passage 52 and then, flows into the battery water passage 51 through the second hybrid system water passage 62. The cooling water flows through the battery water passage 51 and then, is suctioned into the battery pump 41 through the third hybrid system water passage 63.

When the first heat pump circulation control is executed, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the first evaporator 71a through the third cooling medium passage 83. The cooling medium flows through the first evaporator 71a and then, is suctioned into the compressor 74 through the fourth cooling medium passage 84.

When the first heat pump circulation control is executed, the first expansion valve 75a is set at the non-decompression position, and the second expansion valve 75b is set at the decompression position. In addition, the temperature of the cooling medium is increased by the compressor 74 compressing the cooling medium. Therefore, the cooling medium discharges the heat to the outside air while the cooling medium flows through the outside air heat exchanger 72. Thereby, the temperature of the cooling medium decreases.

The cooling medium having the decreased temperature flows through the second expansion valve 75b. The pressure of the cooling medium decreases when the cooling medium passes the second expansion valve 75b. The cooling medium having the decreased temperature and the decreased pressure, passes the first evaporator 71a. The cooling medium absorbs the heat from the cooling water flowing through the evaporator water passage 52 of the hybrid system water circulation passage 50 while the cooling medium flows through the first evaporator 71a. Thereby, the cooling medium evaporates. Thereby, the battery cooling water is cooled.

When the first hybrid system circulation control and the heat pump circulation stop control are executed, the battery cooling water and the device cooling water are cooled by the hybrid system radiator 43. On the other hand, when the second hybrid system circulation control and the first heat pump circulation control are executed, the battery cooling water is cooled by the first evaporator 71a of the heat pump 70, and the device cooling water is cooled by the hybrid system radiator 43. Therefore, when the second hybrid system circulation control and the first heat pump circulation control are executed, the temperature of the battery cooling water and the temperature of the device cooling water are decreased to a larger extent, compared to when the first hybrid system circulation control and the heat pump circulation stop control are executed.

Thus, when the outside air temperature Tair is higher than the predetermined temperature Tair_th, or when the motor output power PMtotal is larger than the water cooling upper limit output power PMupper, or when the battery water temperature TWbat is higher than the water cooling upper limit water temperature TWbat_upper, or when the motor heat generation amount HM is larger than the water cooling upper limit heat generation amount HMupper, the battery and device temperatures Tbat and Tdev may be maintained within the predetermined battery and device temperature ranges WTbat and WTdev, respectively.

<Operation of Engine Temperature Control Apparatus>

When the engine 110 operates, the engine 110 generates heat. For example, an amount of emission in exhaust gas discharged from the engine 110 is small when a temperature Teng of the engine 110 is maintained within a predetermined engine temperature range WTeng higher than zero degree Celsius. Thus, the engine 110 operates optimally when the temperature Teng of the engine 110 is maintained within the predetermined engine temperature range WTeng. Accordingly, the embodiment apparatus determines that a process of cooling the engine 110 is requested when the engine water temperature TWeng is equal to or higher than an engine warmed water temperature TWeng_dan while the engine 110 operates. In this embodiment, the engine warmed water temperature TWeng_dan is the engine water temperature TWeng corresponding to a lower limit temperature Teng_lower of the predetermined engine temperature range WTeng. The engine warmed water temperature TWeng_dan may be previously set on the basis of the result of the experiment, etc. Hereinafter, the temperature Teng of the engine 110 will be referred to as "the engine temperature Teng".

On the other hand, when the engine water temperature TWeng is lower than the engine warmed water temperature TWeng_dan while the engine 110 operates, the embodiment apparatus determines that no process of cooling the engine 110 is requested. Also, when the engine 110 does not operate, the embodiment apparatus determines that no process of cooling the engine 110 is requested.

As described above, the embodiment apparatus determines that the process of heating the interior of the vehicle 100 is requested when the system start-up switch 91 is set at the ON position, and the cooling/heating switch 92 is set at the ON position. In this case, the embodiment apparatus determines that a process of heating the heater core 14 is requested for increasing a temperature of the heater core 14.

<First Engine Circulation Control>

When the process of cooling the engine 110 is requested, and no process of heating the heater core 14 is requested, the embodiment apparatus executes a first engine circulation control for flowing the cooling water in the engine water circulation passage 20 as shown by arrows in FIG. 5. When the embodiment apparatus executes the first engine circulation control, the embodiment apparatus sets the engine flow rate control valve 17 at the closed position, sets the engine water passage shut-off valve 16 at the open position, sets the engine bypass valve 18 at the closed position, activates the engine pump 11, stops activating the heating pump 12, and activates the heat exchanging fan 79.

When the first engine circulation control is executed, the cooling water discharged from the engine pump 11 flows into the engine internal water passage 21 through the first engine water passage 31. The cooling water flows through the engine internal water passage 21 and then, flows into the engine radiator water passage 22 through the second engine water passage 32. The cooling water flows through the engine radiator water passage 22 and then, is suctioned into the engine pump 11 through the third engine water passage 33.

In this case, the cooling water is heated while the cooling water flows through the engine internal water passage 21. The heated cooling water is cooled by the engine radiator 13 while the cooling water flows through the engine radiator water passage 22. The cooled cooling water is supplied to the engine internal water passage 21. Thereby, the engine 110 is cooled.

<Second Engine Circulation Control>

When the process of cooling the engine 110 is requested, and the process of heating the heater core 14 is requested, the embodiment apparatus executes a second engine circulation control for flowing the cooling water in the engine water circulation passage 20 as shown by arrows in FIG. 6. When the embodiment apparatus executes the second engine circulation control, the embodiment apparatus sets the engine flow rate control valve 17 at the third position, sets the engine water passage shut-off valve 16 at the open position, sets the engine bypass valve 18 at the closed position, activates the engine pump 11, stops activating the heating pump 12, and activates the heat exchanging fan 79.

When the second engine circulation control is executed, the cooling water discharged from the engine pump 11 flows into the engine internal water passage 21 through the first engine water passage 31. The cooling water flows through the engine internal water passage 21 and then, flows into the second engine water passage 32. A part of the cooling water flows into the engine radiator water passage 22 through the second engine water passage 32. The cooling water flows through the engine radiator water passage 22 and then, is suctioned into the engine pump 11 through the third engine water passage 33. The remaining of the cooling water flows into the core water passage 23 through the second, eighth, and sixth engine water passages 32, 38, and 36. The cooling water flows through the core water passage 23 and then, is suctioned into the engine pump 11 through the seventh, ninth, and third engine water passages 37, 39, and 33.

In this case, the part of the cooling water flowing into the second engine water passage 32 from the engine internal water passage 21 is cooled by the engine radiator 13 and supplied to the engine internal water passage 21. The remaining of the cooling water flowing into the second engine water passage 32 from the engine internal water passage 21 is supplied to the core water passage 23 without being cooled by the engine radiator 13. Therefore, the engine 110 is cooled by the cooling water cooled by the engine radiator 13, and the heater core 14 is heated by the cooling water not cooled by the engine radiator 13.

<Engine Circulation Control for No Request of Cooling Engine>

When an amount of the heat generated by the battery 120 is considerably large, or the temperature of the outside air is considerably high while the second hybrid system circulation control and the first heat pump circulation control are executed (see FIG. 6), the battery cooling water may be cooled insufficiently by the heat pump 70. As a result, the battery temperature Tbat may not be maintained within the predetermined battery temperature range WTbat.

In this regard, when no process of cooling the engine 110 is requested, the engine temperature Teng is relatively low. Therefore, if the cooling water flows in the engine water circulation passage 20 through the condenser water passage 24 and the engine internal water passage 21, the cooling water absorbs the heat of the cooling medium while the cooling water flows through the condenser water passage 24 of the condenser 73 and discharges the heat to the engine 110 while the cooling water flows through the engine internal water passage 21. Thereby, the cooling medium is cooled by the outside air heat exchanger 72 and the condenser 73. Thus, the battery temperature Tbat may be maintained within the predetermined battery temperature range WTbat even when the amount of the heat generated by the battery 120 is considerably large, or the temperature of the outside air is considerably high.

Accordingly, when no process of cooling the engine 110 is requested while the embodiment apparatus executes the first heat pump circulation control, the embodiment apparatus determines whether an engine pump activation condition is satisfied. When the engine pump activation condition is satisfied, the embodiment apparatus activates the engine pump 11 in order to discharge the heat of the cooling medium to the engine 110. The engine pump activation condition is satisfied when a permission condition CP is satisfied, and at least one of request conditions CEP1 and CEP2 is satisfied.

(1) The permission condition CP is satisfied when the engine water temperature TWeng is lower than the temperature of the cooling medium flowing into the condenser 73.

(2) The request condition CEP1 is satisfied when the cooling medium temperature TC is higher than an upper limit cooling medium temperature TCupper. The request condition CEP1 may be satisfied when a heat energy amount EH of the cooling medium flowing out of the first evaporator 71a is larger than an upper limit heat energy amount EHupper. Hereinafter, the heat energy amount EH will be referred to as "the cooling medium heat energy amount EH".

(3) The request condition CEP2 is satisfied when the engine water temperature TWeng is lower than the engine warmed water temperature TWeng_dan.

In this embodiment, the upper limit cooling medium temperature TCupper is an upper limit of the cooling medium temperature TC capable of supplying the cooling medium having a temperature equal to or lower than a requested temperature TCreq to the first evaporator 71a even when the cooling medium is cooled only by the outside air heat exchanger 72. The upper limit cooling medium temperature TCupper may be previously set on the basis of the result of the experiment, etc. In this embodiment, the requested temperature TCreq is a temperature requested as the temperature of the cooling medium supplied to the first evaporator 71a to maintain the battery temperature Tbat within the predetermined battery temperature range WTbat.

The upper limit heat energy amount EHupper is an upper limit of the cooling medium heat energy amount EH capable of supplying the cooling medium having the temperature equal to or lower than the requested temperature TCreq to the first evaporator 71a even when the cooling medium is cooled only by the outside air heat exchanger 72. The upper limit heat energy amount EHupper may be previously set on the basis of the result of the experiment, etc. The cooling medium heat energy amount EH can be acquired by using the cooling medium temperature TC, etc. The upper limit heat energy amount EHupper may be set to an amount, depending on the outside air temperature Tair, etc.

When the engine pump activation condition is satisfied, the embodiment apparatus determines that the engine pump 11 is permitted and requested to be activated.

Further, when the cooling medium temperature TC is considerably high, the cooling water flowing out of the condenser water passage 24 and flowing in the engine water circulation passage 20, may be cooled insufficiently only by the engine 110 without using the engine radiator 13. Also, when the engine water temperature TWeng is considerably high, the cooling water flowing in the engine water circulation passage 20 may be cooled insufficiently only by the engine 110 without using the engine radiator 13. When the cooling water is cooled insufficiently, the cooling medium may be cooled insufficiently by the condenser 73. As a result, the cooling medium having the temperature equal to or lower than the requested temperature TCreq may not be supplied to the first evaporator 71a.

Accordingly, when the engine pump activation condition is satisfied, the embodiment apparatus determines whether a radiator cooling condition is satisfied. When the radiator cooling condition is satisfied, the embodiment apparatus cools the cooling water by the engine radiator 13. The radiator cooling condition is satisfied when at least one of request conditions CRC1 and CRC2 is satisfied.

(1) The request condition CRC1 is satisfied when the cooling medium temperature TC is higher than a predetermined cooling medium temperature TCth. The request condition CRC1 may be satisfied when the cooling medium heat energy amount EH is larger than a predetermined heat energy amount EHth.

(2) The request condition CRC2 is satisfied when the engine water temperature TWeng is higher than a predetermined engine water temperature TWeng_th.

In this embodiment, the predetermined cooling medium temperature TCth is set to a temperature equal to or higher than the upper limit cooling medium temperature TCupper. In addition, the predetermined cooling medium temperature TCth is set to an upper limit of the cooling medium temperature TC capable of supplying the cooling medium having the temperature equal to or lower than the requested temperature TCreq to the first evaporator 71a even when the cooling medium is cooled by the cooling water cooled only by the engine 110 without using the engine radiator 13. The predetermined cooling medium temperature TCth may be previously set on the basis of the result of the experiment, etc.

Further, the predetermined heat energy amount EHth is set to an amount equal to or larger than the upper limit heat energy amount EHupper. In addition, the predetermined heat energy amount EHth is set to an upper limit of the cooling medium heat energy amount EH capable of supplying the cooling medium having the temperature equal to or lower than the requested temperature TCreq to the first evaporator 71a even when the cooling medium is cooled by the cooling water cooled only by the engine 110 without using the engine radiator 13. The predetermined heat energy amount EHth may be previously set on the basis of the result of the experiment, etc.

Furthermore, in this embodiment, the predetermined engine water temperature TWeng_th is set to a temperature corresponding to an upper limit of the engine water temperature TWeng capable of supplying the cooling medium having the temperature equal to or lower than the requested temperature TCreq to the first evaporator 71a even when the cooling medium is cooled by the cooling water cooled only by the engine 110 without using the engine radiator 13. The predetermined engine water temperature TWeng_th may be previously set on the basis of the result of the experiment, etc.

<Third Engine Circulation Control>

Figure 7:
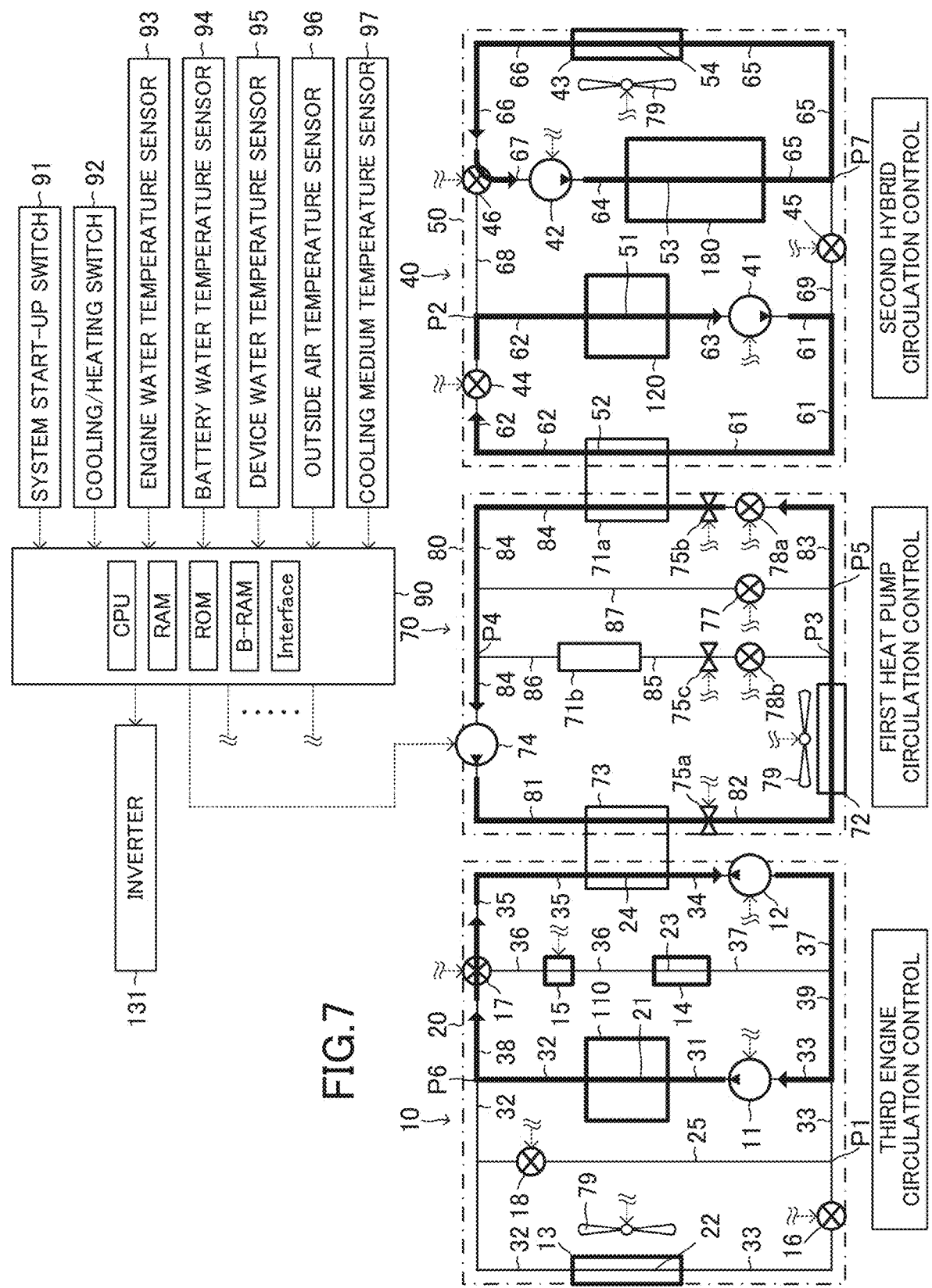
FIG. 7 is a view similar to FIG. 2, and which shows the flow of the cooling water and the flow of the cooling medium.

When the engine pump activation condition is satisfied, the radiator cooling condition is not satisfied, and no process of heating the heater core 14 is requested, the embodiment apparatus executes a third engine circulation control for flowing the cooling water in the engine water circulation passage 20 as shown by arrows in FIG. 7. When the embodiment apparatus executes the third engine circulation control, the embodiment apparatus sets the engine flow rate control valve 17 at the first position, sets the engine water passage shut-off valve 16 at the closed position, sets the engine bypass valve 18 at the closed position, activates the engine pump 11, and stops activating the heating pump 12. At this time, the second hybrid system circulation control is executed. Thus, the heat exchanging fan 79 is activated.

In this case, the cooling water discharged from the engine pump 11 flows into the engine internal water passage 21 through the first engine water passage 31. The cooling water flows through the engine internal water passage 21 and then, flows into the internal water passage of the engine flow rate control valve 17 through the second and eighth engine water passages 32 and 38. The cooling water flows into the condenser water passage 24 through the internal water passage of the engine flow rate control valve 17 and the fifth engine water passage 35. The cooling water flows through the condenser water passage 24 and then, is suctioned into the engine pump 11 through the fourth, seventh, ninth, and third engine water passages 34, 37, 39, and 33.

When the third engine circulation control is executed, no process of cooling the engine 110 is requested. Thus, the engine temperature Teng is relatively low. Therefore, the cooling water can discharge the heat to the engine 110. Thereby, the cooling water is cooled. The cooling water is supplied to the condenser water passage 24. When the third engine circulation control is executed, the second hybrid system circulation control and the first heat pump circulation control are executed. Therefore, the cooling water flows in the hybrid system water circulation passage 50, and the cooling medium flows in the cooling medium circulation passage 80 as shown by the arrows in FIG. 7. Thus, the cooling medium is cooled by the cooling water flowing through the condenser water passage 24 of the condenser 73. The cooled cooling medium is further cooled by the outside air heat exchanger 72. In other words, the cooling medium is cooled by the condenser 73 and the outside air heat exchanger 72. The cooled cooling medium is supplied to the first evaporator 71a. Thus, the cooling medium having the temperature equal to or lower than the requested temperature TCreq may be supplied to the first evaporator 71a. The cooling medium supplied to the first evaporator 71a cools the battery cooling water while the battery cooling water flows through the evaporator water passage 52. Thus, the battery temperature Tbat may be maintained within the predetermined battery temperature range WTbat.

Further, when the third engine circulation control is executed, the engine 110 is heated by the heat discharged from the cooling water. Thus, the engine temperature Teng increases. Therefore, the engine temperature Teng is relatively high when the engine 110 starts to operate later. Thus, the amount of the emission in the exhaust gas discharged from the engine 110 may be small when the engine 110 starts to operate. In addition, when the engine 110 starts to operate, a temperature of lubrication oil for lubricating the engine 110 is relatively high. Thus, friction resistance of movable parts of the engine 110 is small. As a result, the engine 110 may operate efficiently.

<Fourth Engine Circulation Control>

Figure 8:
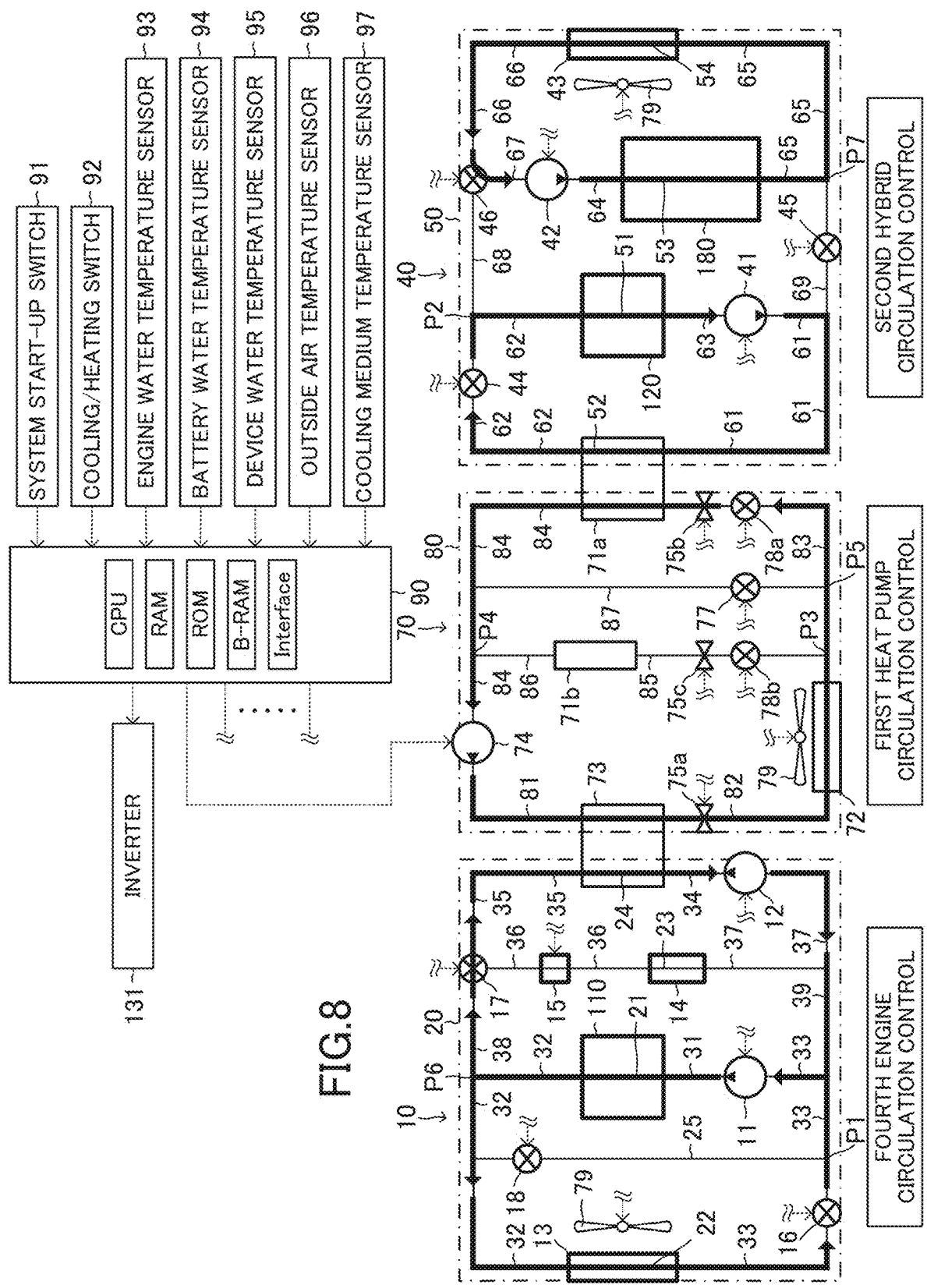
FIG. 8 is a view similar to FIG. 2, and which shows the flow of the cooling water and the flow of the cooling medium.

When the engine pump activation condition is satisfied, the radiator cooling condition is satisfied, and no process of heating the heater core 14 is requested, the embodiment apparatus executes a fourth engine circulation control for flowing the cooling water in the engine water circulation passage 20 as shown by arrows in FIG. 8. When the embodiment apparatus executes the fourth engine circulation control, the embodiment apparatus sets the engine flow rate control valve 17 at the first position, sets the engine water passage shut-off valve 16 at the open position, sets the engine bypass valve 18 at the closed position, activates the engine pump 11, and stops activating the heating pump 12. At this time, the second hybrid system circulation control is executed. Thus, the heat exchanging fan 79 is activated.

In this case, the cooling water discharged from the engine pump 11 flows into the engine internal water passage 21 through the first engine water passage 31. The cooling water flows through the engine internal water passage 21 and then, flows into the second engine water passage 32. A part of the cooling water flowing into the second engine water passage 32, flows into the engine radiator water passage 22 through the second engine water passage 32. The cooling water flows through the engine radiator water passage 22 and then, is suctioned into the engine radiator water passage 22 through the third engine water passage 33. On the other hand, the remaining of the cooling water flowing into the engine radiator water passage 22, flows into the internal water passage of the engine flow rate control valve 17 through the second and eighth engine water passages 32 and 38. The cooling water flows into the fifth engine water passage 35 from the internal water passage of the engine flow rate control valve 17. The cooling water flows into the condenser water passage 24 through the fifth engine water passage 35. The cooling water flows through the condenser water passage 24 and then, is suctioned into the engine pump 11 through the fourth, seventh, ninth, and third engine water passages 34, 37, 39, and 33.

When the fourth engine circulation control is executed, no process of cooling the engine 110 is requested. Thus, the engine temperature Teng is relatively low. Therefore, the cooling water is cooled by discharging the heat to the engine 110 and by the engine radiator 13. The cooled cooling water is supplied to the condenser water passage 24. In addition, when the fourth engine circulation control is executed, the second hybrid system circulation control and the first heat pump circulation control are executed. Therefore, the cooling water flows in the hybrid system water circulation passage 50, and the cooling medium flows in the cooling medium circulation passage 80 as shown by arrows in FIG. 8. Thus, similar to when the third engine circulation control is executed, the battery temperature Tbat may be maintained within the predetermined battery temperature range WTbat. Further, when the engine 110 starts to operate later, the engine temperature Teng is relatively high. Thus, the amount of the emission in the exhaust gas may be small when the engine 110 starts to operate. In addition, the temperature of the lubrication oil for lubricating the engine 110 is relatively high when the engine 110 starts to operate. Thus, the engine 110 may operate efficiently.

Further, when the fourth engine circulation control is executed, a part of the cooling water is heated while the part of the cooling water flows through the condenser water passage 24. The heated cooling water is supplied to the engine radiator water passage 22. The cooling water is cooled by the engine radiator 13. Thus, when the cooling medium heat energy amount EH is larger than the predetermined heat energy amount EHth, that is, the request condition CRC1 is satisfied, the engine temperature Teng may be prevented from increasing excessively. In addition, when the engine water temperature TWeng is higher than the predetermined engine water temperature TWeng_th, that is, the request condition CRC2 is satisfied, the engine temperature Teng may be prevented from increasing excessively.

<Fifth Engine Circulation Control>

Figure 9:
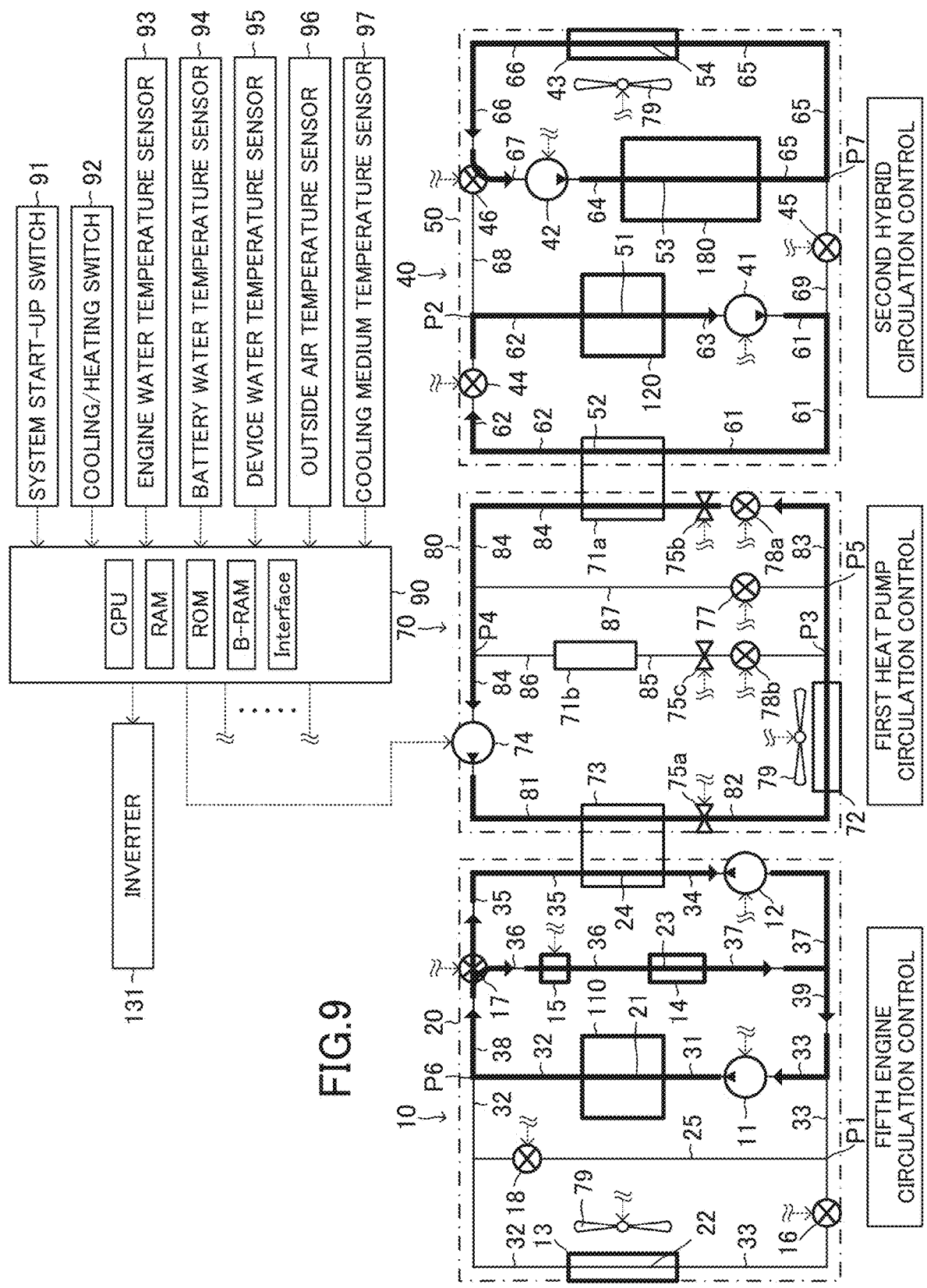
FIG. 9 is a view similar to FIG. 2, and which shows the flow of the cooling water and the flow of the cooling medium.

When the engine pump activation condition is satisfied, the radiator cooling condition is not satisfied, and the process of heating the heater core 14 is requested, the embodiment apparatus executes a fifth engine circulation control for flowing the cooling water in the engine water circulation passage 20 as shown by arrows in FIG. 9. When the embodiment apparatus executes the fifth engine circulation control, the embodiment apparatus sets the engine flow rate control valve 17 at the fourth position, sets the engine water passage shut-off valve 16 at the closed position, sets the engine bypass valve 18 at the closed position, activates the engine pump 11, and stops activating the heating pump 12. At this time, the second hybrid system circulation control is executed. Thus, the heat exchanging fan 79 is activated.

In this case, the cooling water discharged from the engine pump 11 flows into the engine internal water passage 21 through the first engine water passage 31. The cooling water flows through the engine internal water passage 21 and then, flows into the internal water passage of the engine flow rate control valve 17 through the second and eighth engine water passages 32 and 38. A part of the cooling water flows into the fifth engine water passage 35 from the internal water passage of the engine flow rate control valve 17. The cooling water flows into the condenser water passage 24 through the fifth engine water passage 35. The cooling water flows through the condenser water passage 24 and then, is suctioned into the engine pump 11 through the fourth, seventh, ninth, and third engine water passages 34, 37, 39, and 33. On the other hand, the remaining of the cooling water flows into the sixth engine water passage 36 from the internal water passage of the engine flow rate control valve 17. The cooling water flows into the core water passage 23 through the sixth engine water passage 36. The cooling water flows through the core water passage 23 and then, is suctioned into the engine pump 11 through the seventh, ninth, and third engine water passages 37, 39, and 33.

When the fifth engine circulation control is executed, no process of cooling the engine 110 is requested. Thus, the engine temperature Teng is relatively low. Therefore, the cooling water can discharge the heat to the engine 110. Thereby, the cooling water is cooled. The cooled cooling water is supplied to the condenser water passage 24. In addition, when the fifth engine circulation control is executed, the second hybrid system circulation control and the first heat pump circulation control are executed. Therefore, the cooling water flows in the hybrid system water circulation passage 50, and the cooling medium flows in the cooling medium circulation passage 80 as shown by arrows in FIG. 9. Thus, similar to when the third engine circulation control is executed, the battery temperature Tbat may be maintained within the predetermined battery temperature range WTbat. Further, the engine temperature Teng is relatively high when the engine 110 starts to operate later. Thus, the amount of the emission in the exhaust gas may be small when the engine 110 starts to operate. Furthermore, the temperature of the lubrication oil for lubricating the engine 110 is relatively high when the engine 110 starts to operate later. Thus, the engine 110 may operate efficiently.

In addition, the cooling water is heated while the cooling water flows through the condenser water passage 24. The heated cooling water is supplied to the core water passage 23. Thus, the heater core 14 is heated by the cooling water. Thereby, the process of heating the heater core 14 is executed.

<Sixth Engine Circulation Control>

Figure 10:
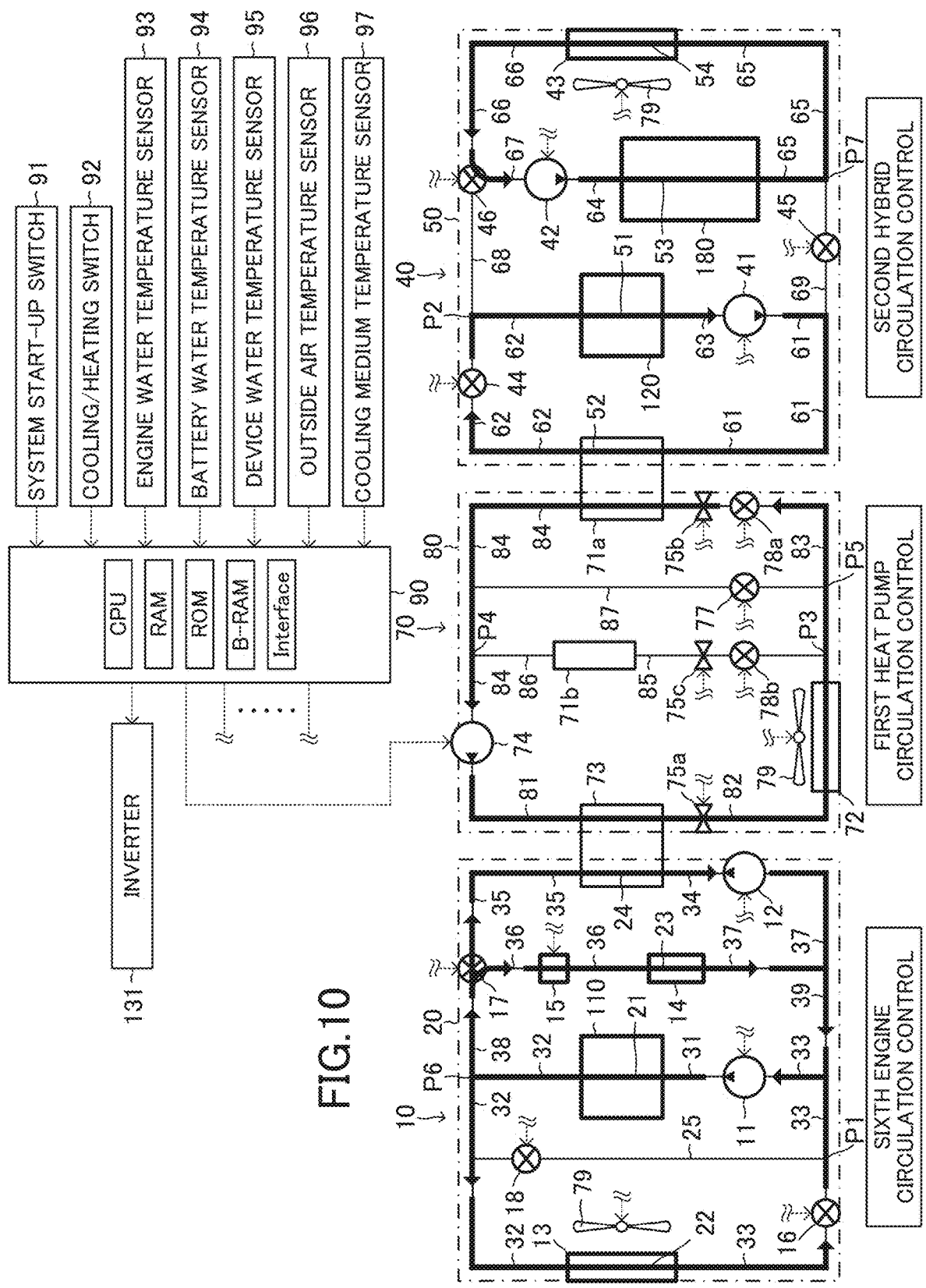
FIG. 10 is a view similar to FIG. 2, and which shows the flow of the cooling water and the flow of the cooling medium.

When the engine pump activation condition is satisfied, the radiator cooling condition is satisfied, and the process of heating the heater core 14 is requested, the embodiment apparatus executes a sixth engine circulation control for flowing the cooling water in the engine water circulation passage 20 as shown by arrows in FIG. 10. When the embodiment apparatus executes the sixth engine circulation control, the embodiment apparatus sets the engine flow rate control valve 17 at the fourth position, sets the engine water passage shut-off valve 16 at the open position, sets the engine bypass valve 18 at the closed position, activates the engine pump 11, and stops activating the heating pump 12. At this time, the second hybrid system circulation control is executed. Thus, the heat exchanging fan 79 is activated.

In this case, the cooling water discharged from the engine pump 11 flows into the engine internal water passage 21 through the first engine water passage 31. The cooling water flows through the engine internal water passage 21 and then, flows into the second engine water passage 32. A part of the cooling water flows into the engine radiator water passage 22 through the second engine water passage 32. The cooling water flows through the engine radiator water passage 22 and then, is suctioned into the engine pump 11 through the third engine water passage 33.

On the other hand, the remaining of the cooling water flows into the internal water passage of the engine flow rate control valve 17 through the second and eighth engine water passages 32 and 38. A part of the cooling water flows into the fifth engine water passage 35 from the internal water passage of the engine flow rate control valve 17. The cooling water flows into the condenser water passage 24 through the fifth engine water passage 35. The cooling water flows through the condenser water passage 24 and then, is suctioned into the engine pump 11 through the fourth, seventh, ninth, and third engine water passages 34, 37, 39, and 33. On the other hand, the remaining of the cooling water flows into the sixth engine water passage 36 from the internal water passage of the engine flow rate control valve 17. The cooling water flows into the core water passage 23 through the sixth engine water passage 36. The cooling water flows through the core water passage 23 and then, is suctioned into the engine pump 11 through the seventh, ninth, and third engine water passages 37, 39, and 33.

When the sixth engine circulation control is executed, no process of cooling the engine 110 is requested. Thus, the engine temperature Teng is relatively low. Therefore, the cooling water is cooled by discharging the heat to the engine 110 and by the engine radiator 13. The cooled cooling water is supplied to the condenser water passage 24. In addition, when the sixth engine circulation control is executed, the second hybrid system circulation control and the first heat pump circulation control are executed. Therefore, the cooling water flows in the hybrid system water circulation passage 50, and the cooling medium flows in the cooling medium circulation passage 80 as shown by arrows in FIG. 10. Thus, similar to when the third engine circulation control is executed, the battery temperature Tbat may be maintained within the predetermined battery temperature range WTbat. Further, the engine temperature Teng is relatively high when the engine 110 starts to operate later. Thus, the amount of the emission in the exhaust gas may be small when the engine 110 starts to operate. Furthermore, the temperature of the lubrication oil for lubricating the engine 110 is relatively high. Thus, the engine 110 may operate efficiently.

In addition, when the sixth engine circulation control is executed, the cooling water is heated while the cooling water flows through the condenser water passage 24. A part of the heated cooling water is supplied to the engine radiator water passage 22. The heated cooling water is cooled by the engine radiator 13. Therefore, similar to when the fourth engine circulation control is executed, the engine temperature Teng may be prevented from increasing excessively.

Further, a part of the cooling water heated at the condenser water passage 24 is supplied to the core water passage 23. The heater core 14 is heated by the heated cooling water. Thereby, the process of heating the heater core 14 is executed.

The summary of the operation of the embodiment apparatus has been described. According to the embodiment apparatus, the battery temperature Tbat may be maintained within the predetermined battery temperature range WTbat by executing the second hybrid system circulation control, the first heat pump circulation control, and any of the third to sixth engine circulation controls when the battery temperature Tbat may not be maintained within the predetermined battery temperature range WTbat by cooling the cooling medium only by the outside air heat exchanger 72.

<Concrete Operation of Embodiment Apparatus>

Next, a concrete operation of the embodiment apparatus will be described. The CPU of the ECU 90 of the embodiment apparatus is configured or programmed to execute a routine shown by a flowchart in FIG. 11 each time a predetermined time elapses when the system start-up switch 91 is set at the ON position.

Figure 11:
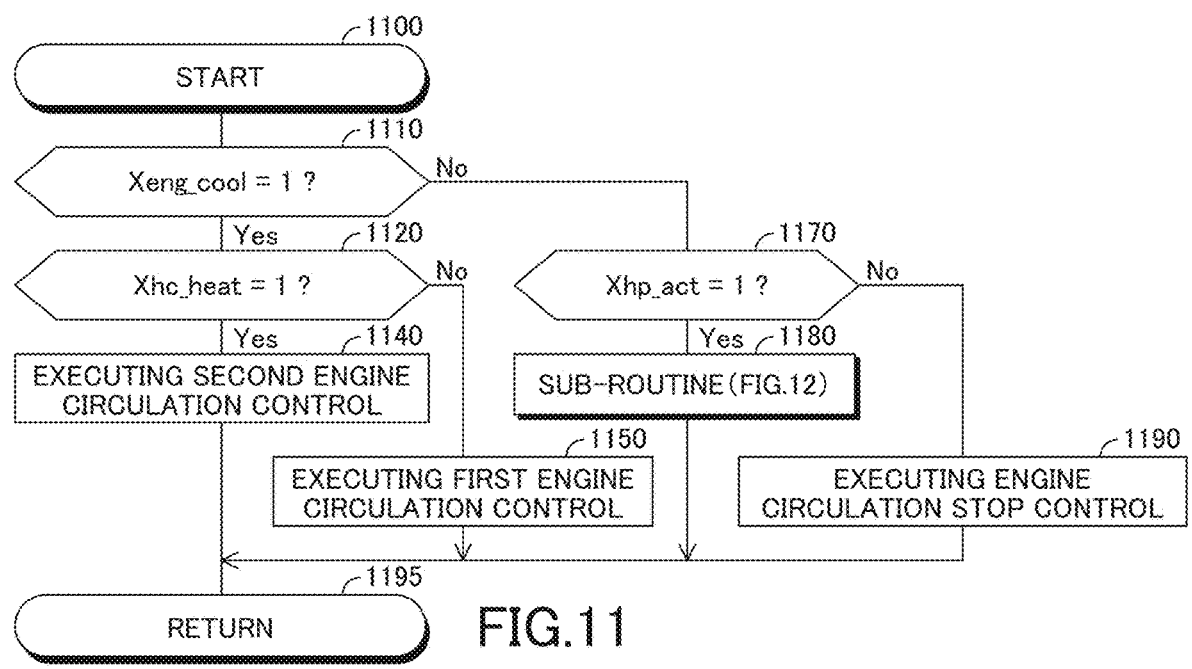
FIG. 11 is a view for showing a flowchart of a routine executed by a CPU of an ECU shown in FIG. 2.

Therefore, at a predetermined timing, the CPU starts a process from a step 1100 in FIG. 11 and then, proceeds with the process to a step 1110 to determine whether a value of an engine cooling request flag Xeng_cool is "1". The value of the engine cooling request flag Xeng_cool is set to "1" when the process of cooling the engine 110 is requested and set to "0" when no process of cooling the engine 110 is requested.

When the value of the engine cooling request flag Xeng_cool is "1", the CPU determines "Yes" at the step 1110 and then, proceeds with the process to a step 1120 to determine whether a value of a core heating request flag Xhc_heat is "1". The value of the core heating request flag Xhc_heat is set to "1" when the process of heating the heater core 14 is requested and set to "0" when no process of heating the heater core 14 is requested.

When the value of the core heating request flag Xhc_heat is "1" the CPU determines "Yes" at the step 1120 and then, executes a process of a step 1140 described below. Then, the CPU proceeds with the process to a step 1195 to terminate this routine once.

Step 1140: The CPU executes the second engine circulation control. Thereby, the cooling water flows in the engine water circulation passage 20 as shown by the arrows in FIG. 6.

On the other hand, when the value of the core heating request flag Xhc_heat is "0", the CPU determines "No" at the step 1120 and then, executes a process of a step 1150 described below. Then, the CPU proceeds with the process to the step 1195 to terminate this routine once.

Step 1150: The CPU executes the first engine circulation control. Thereby, the cooling water flows in the engine water circulation passage 20 as shown by the arrows in FIG. 5.

When the value of the engine cooling request flag Xeng_cool is "1" at a time of executing a process of the step 1110, the CPU determines "No" at the step 1110 and then, proceeds with the process to a step 1170 to determine whether a value of a heat pump activation flag Xhp_act is "1". The value of the heat pump activation flag Xhp_act is set to "1" when the compressor 74 of the heat pump 70 is activated and set to "0" when the compressor 74 is not activated.

Figure 12:
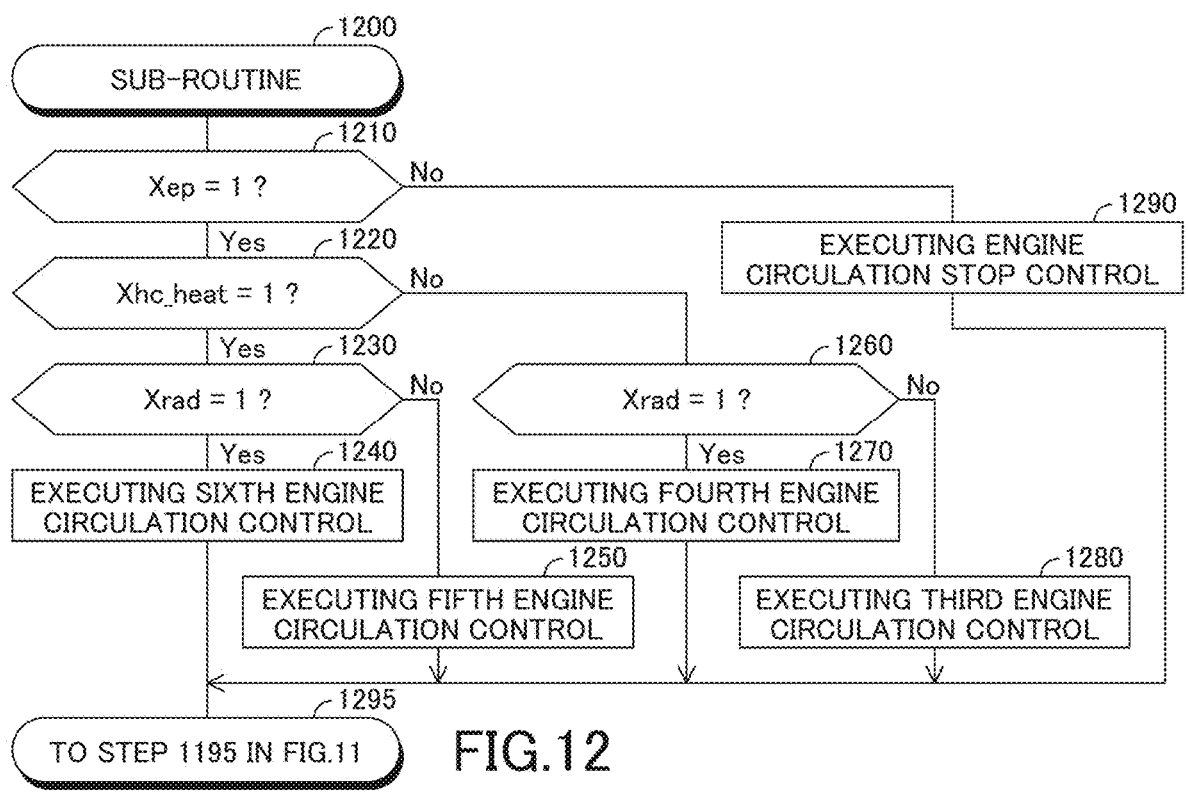
FIG. 12 is a view for showing a flowchart of a routine executed by the CPU.

When the value of the heat pump activation flag Xhp_act is "1", the CPU determines "Yes" at the step 1170 and then, proceeds with the process to a step 1180 to execute a routine shown by a flowchart in FIG. 12.

Therefore, when the CPU proceeds with the process to the step 1180, the CPU starts a process from a step 1200 and then, proceeds with the process to a step 1210 to determine whether a value of an engine pump activation condition flag Xep is "1". The value of the engine pump activation condition flag Xep is set to "1" when the engine pump activation condition is satisfied and set to "0" when the engine pump activation condition is not satisfied.

When the value of the engine pump activation condition flag Xep is "1", the CPU determines "Yes" at the step 1210 and then, proceeds with the process to a step 1220 to determine whether the value of the core heating request flag Xhc_heat is "1".

When the value of the core heating request flag Xhc_heat is "1", the CPU determines "Yes" at the step 1220 and then, proceeds with the process to a step 1230 to determine whether a value of a radiator cooling condition flag Xrad is "1". The value of the radiator cooling condition flag Xrad is set to "1" when the radiator cooling condition is satisfied and set to "0" when the radiator cooling condition is not satisfied.

When the value of the radiator cooling condition flag Xrad is "1", the CPU determines "Yes" at the step 1230 and then, executes a process of a step 1240 described below. Then, the CPU proceeds with the process to the step 1195 in FIG. 11 via a step 1295 to terminate this routine once.

Step 1240: The CPU executes the sixth engine circulation control. Thereby, the cooling water flows in the engine water circulation passage 20 as shown by the arrows in FIG. 10.

On the other hand, when the value of the radiator cooling condition flag Xrad is "0", the CPU determines "No" at the step 1230 and then, executes a process of a step 1250 described below. Then, the CPU proceeds with the process to the step 1195 in FIG. 11 via the step 1295 to terminate this routine once.

Step 1250: The CPU executes the fifth engine circulation control. Thereby, the cooling water flows in the engine water circulation passage 20 as shown by the arrows in FIG. 9.

When the value of the core heating request flag Xhc_heat is "0" at a time of executing a process of the step 1220, the CPU determines "No" at the step 1220 and then, proceeds with the process to a step 1260 to determine whether the value of the radiator cooling condition flag Xrad is "1".

When the value of the radiator cooling condition flag Xrad is "1", the CPU determines "Yes" at the step 1260 and then, executes a process of a step 1270 described below. Then, the CPU proceeds with the process to the step 1195 in FIG. 11 via the step 1295 to terminate this routine once.

Step 1270: The CPU executes the fourth engine circulation control. Thereby, the cooling water flows in the engine water circulation passage 20 as shown by the arrows in FIG. 8.

On the other hand, when the value of the radiator cooling condition flag Xrad is "0", the CPU determines "No" at the step 1260 and then, executes a process of a step 1280 described below. Then, the CPU proceeds with the process to the step 1195 in FIG. 11 via the step 1295 to terminate this routine once.

Step 1280: The CPU executes the third engine circulation control. Thereby, the cooling water flows in the engine water circulation passage 20 as shown by the arrows in FIG. 7.

When the value of the engine pump activation condition flag Xep is "0" at a time of executing a process of the step 1210, the CPU determines "No" at the step 1210 and then, executes a process of a step 1290 described below. Then, the CPU proceeds with the process to the step 1195 in FIG. 11 via the step 1295 to terminate this routine.

Step 1290: The CPU executes an engine circulation stop control for stopping activating the engine pump 11. Thereby, the cooling water stops flowing in the engine water circulation passage 20.

When the value of the heat pump activation flag Xhp_act is "0" at a time of executing a process of the step 1170 in FIG. 11, the CPU determines "No" at the step 1170 and then, executes a process of a step 1190 described below. Then, the CPU proceeds with the process to the step 1195 to terminate this routine once.

Step 1190: The CPU executes the engine circulation stop control. Thereby, the cooling water stops flowing in the engine water circulation passage 20.

Figure 13:
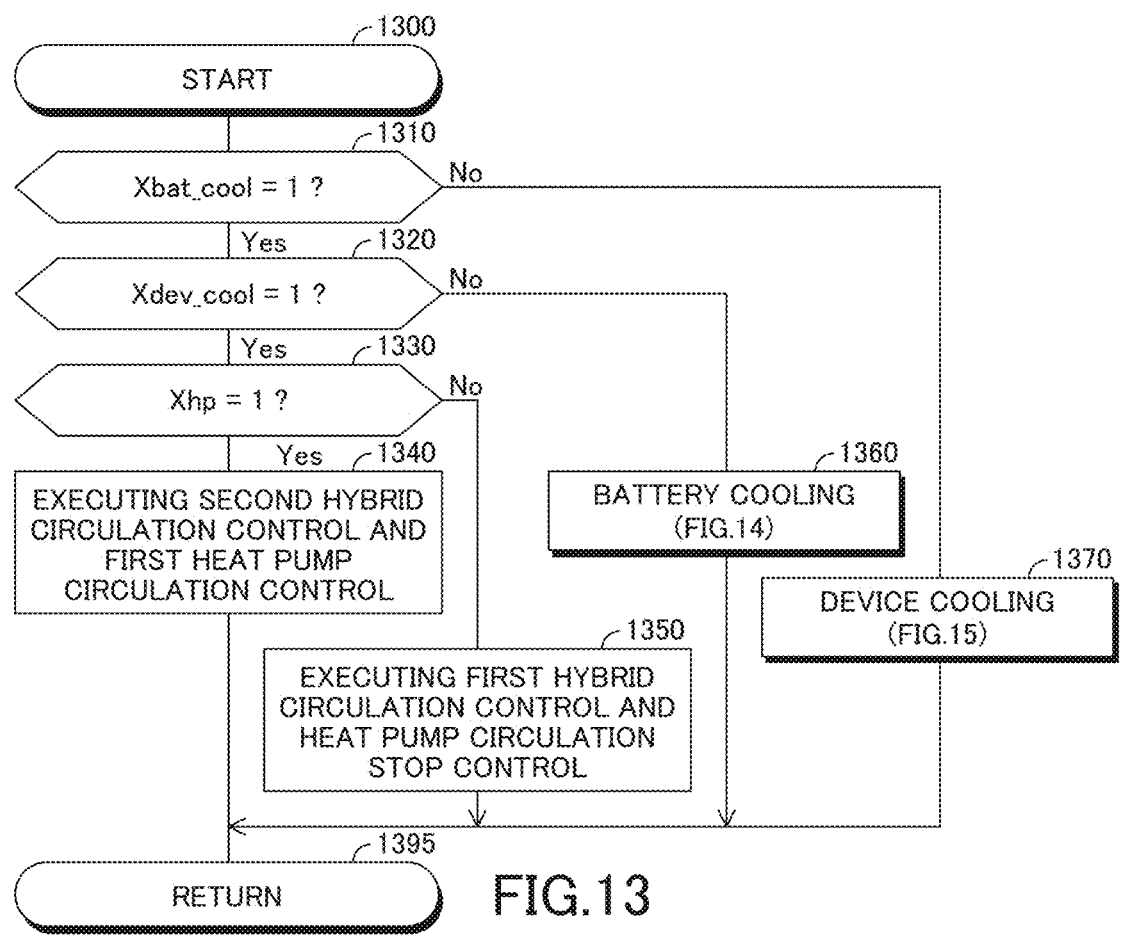
FIG. 13 is a view for showing a flowchart of a routine executed by the CPU.

Further, the CPU is configured or programmed to execute a routine shown by a flowchart in FIG. 13 each time a predetermined time elapses. Therefore, at a predetermined timing, the CPU start a process from a step 1300 in FIG. 13 and then, proceeds with the process to a step 1310 to determine whether a value of a battery cooling request flag Xbat_cool is "1". The value of the battery cooling request flag Xbat_cool is set to "1" when the process of cooling the battery 120 is requested and set to "0" when no process of cooling the battery 120 is requested.

When the value of the battery cooling request flag Xbat_cool is "1", the CPU determines "Yes" at the step 1310 and then, proceeds with the process to a step 1320 to determine whether a value of a device cooling request flag Xdev_cool is "1". The value of the device cooling request flag Xdev_cool is set to "1" when the process of cooling the hybrid device 180 is requested and set to "0" when no process of cooling the hybrid device 180 is requested.

When the value of the device cooling request flag Xdev_cool is "1", the CPU determines "Yes" at the step 1320 and then, proceeds with the process to a step 1330 to determine whether a value of a heat pump activation condition flag Xhp is "1". The value of the heat pump activation condition flag Xhp is set to "1" when the heat pump activation condition is satisfied and set to "0" when the heat pump activation condition is not satisfied.

When the value of the heat pump activation condition flag Xhp is "1", the CPU determines "Yes" at the step 1330 and then, executes a process of a step 1340 described below. Then, the CPU proceeds with the process to a step 1395 to terminate this routine once.

Step 1340: The CPU executes the second hybrid system circulation control and the first heat pump circulation control. Thereby, the cooling water flows in the hybrid system water circulation passage 50, and the cooling medium flows in the cooling medium circulation passage 80 as shown by the arrows in FIG. 6.

On the other hand, when the value of the heat pump activation condition flag Xhp is "0", the CPU determines "No" at the step 1330 and then, executes a process of a step 1350 described below. Then, the CPU proceeds with the process to the step 1395 to terminate this routine once.

Step 1350: The CPU executes the first hybrid system circulation control and the heat pump circulation stop control. Thereby, the cooling water flows in the hybrid system water circulation passage 50 as shown by the arrows in FIG. 5. The cooling medium stops flowing in the cooling medium circulation passage 80.

Figure 14:
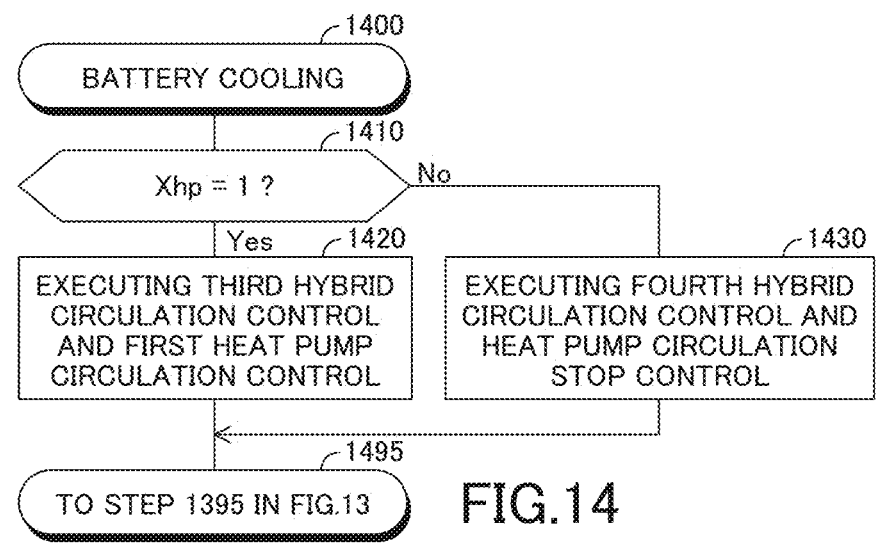
FIG. 14 is a view for showing a flowchart of a routine executed by the CPU.

When the value of the device cooling request flag Xdev_cool is "0" at a time of executing a process of the step 1320, the CPU determines "No" at the step 1320 and then, proceeds with the process to a step 1360 to execute a routine shown by a flowchart in FIG. 14. Therefore, when the CPU proceeds with the process to the step 1360, the CPU starts a process from a step 1400 in FIG. 14 and then, proceeds with the process to a step 1410 to determine whether the value of the heat pump activation condition flag Xhp is "1".

When the value of the heat pump activation condition flag Xhp is "1", the CPU determines "Yes" at the step 1410 and then, executes a process of a step 1420 described below Then, the CPU proceeds with the process to the step 1395 in FIG. 13 via a step 1495 to terminate this routine once.

Figure 16:
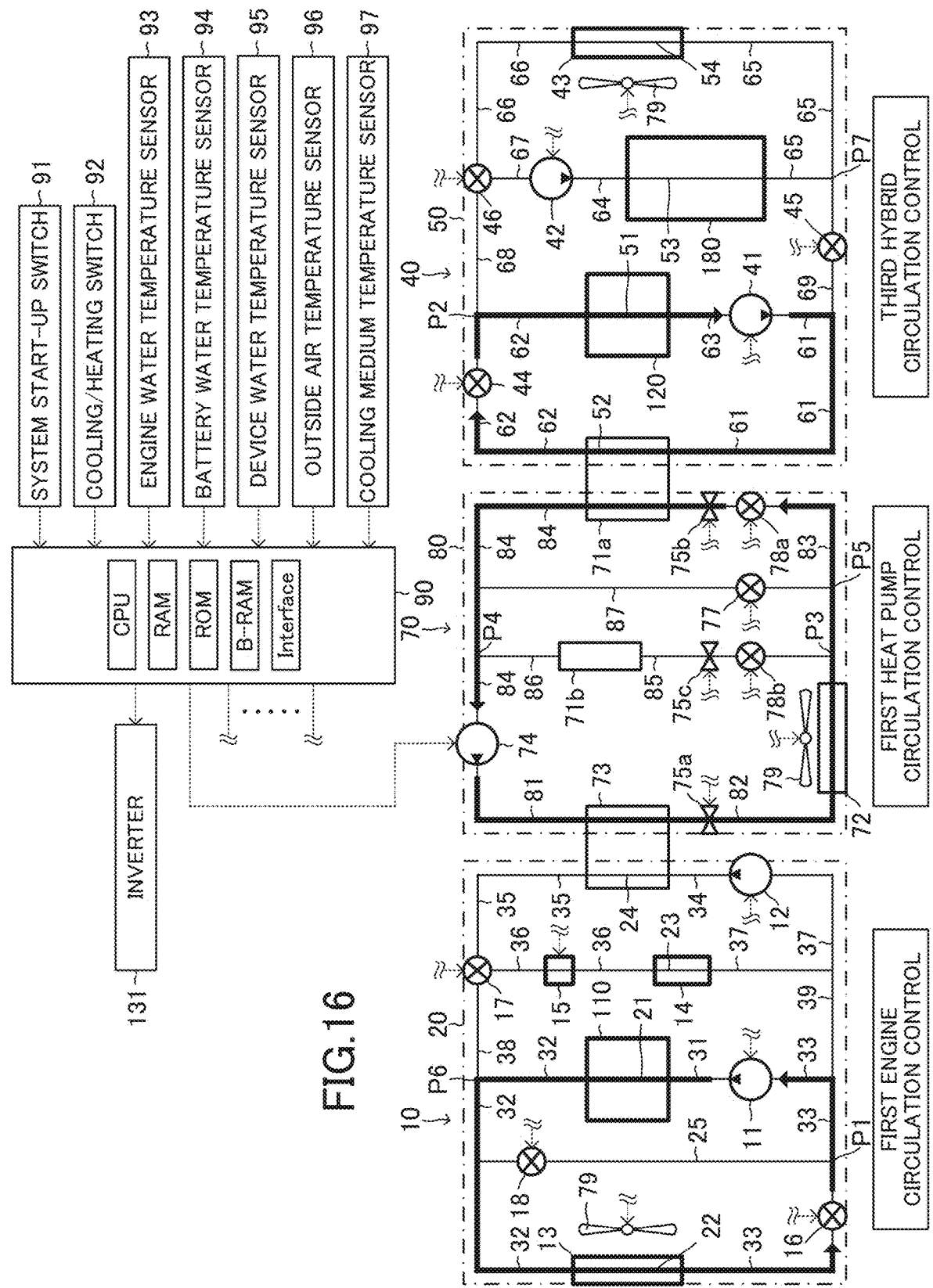
FIG. 16 is a view similar to FIG. 2, and which shows the flow of the cooling water and the flow of the cooling medium.

Step 1420: The CPU executes a third hybrid system circulation control for flowing the cooling water in the hybrid system water circulation passage 50 as shown by arrows in FIG. 16 and the first heat pump circulation control. When the CPU executes the third hybrid system circulation control, the CPU sets the hybrid system flow rate control valve 46 at the closed position, sets the first hybrid system water passage shut-off valve 44 at the open position, sets the second hybrid system water passage shut-off valve 45 at the closed position, activates the battery pump 41, and stops activating the device pump 42.

When the third hybrid system circulation control is executed, the cooling water discharged from the battery pump 41 flows into the evaporator water passage 52 through the first hybrid system water passage 61. The cooling water flows through the evaporator water passage 52 and then, flows into the battery water passage 51 through the second hybrid system water passage 62. The cooling water flows through the battery water passage 51 and then, is suctioned into the battery pump 41 through the third hybrid system water passage 63. Thereby, the cooling water cooled by the heat pump 70 is supplied to the battery water passage 51 and cools the battery 120.

On the other hand, when the value of the heat pump activation condition flag Xhp is "0", the CPU determines "No" at the step 1410 and then, executes a process of a step 1430 described below. Then, the CPU proceeds with the process to the step 1395 in FIG. 13 via the step 1495 to terminate this routine once.

Figure 17:
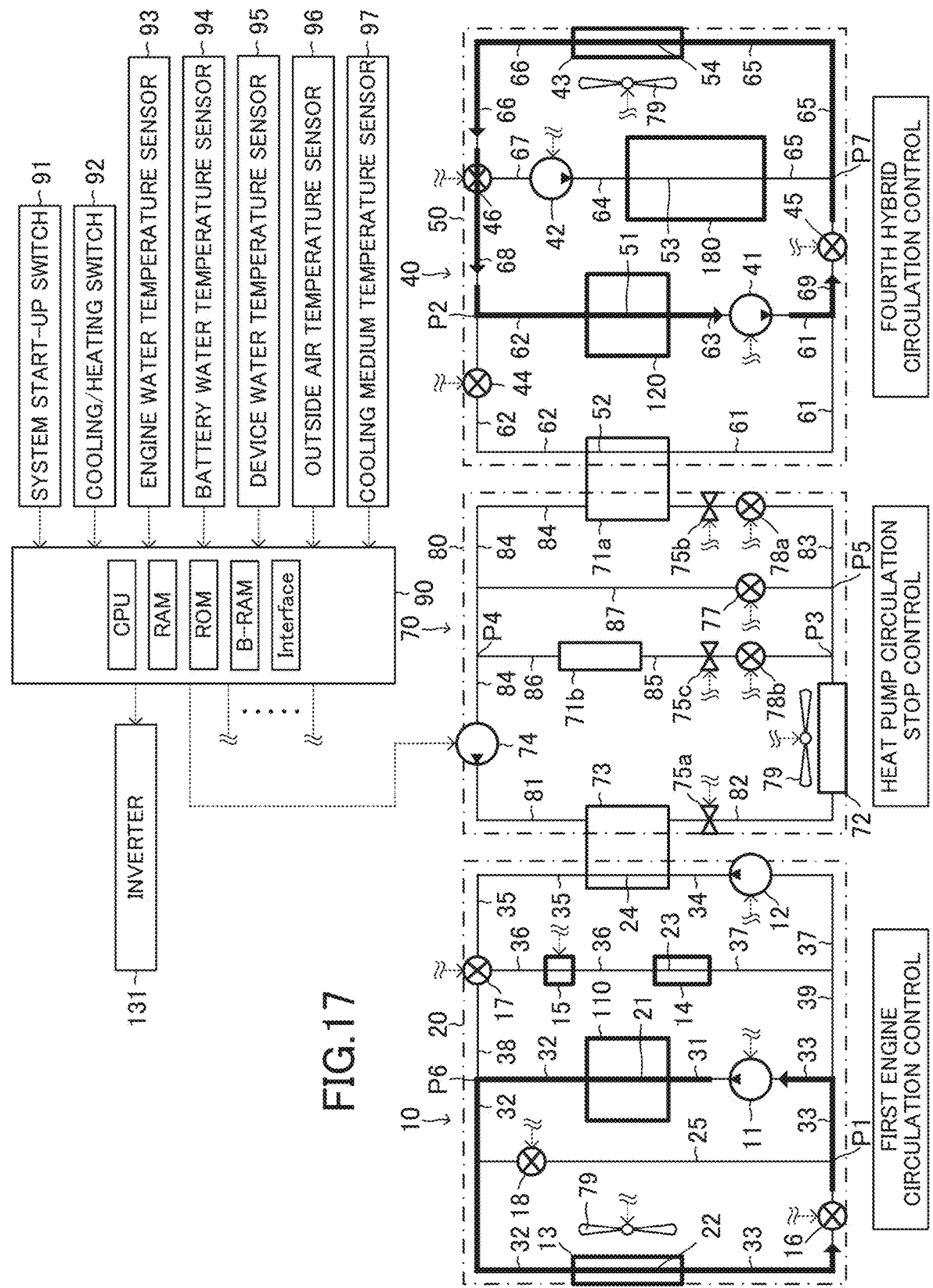
FIG. 17 is a view similar to FIG. 2, and which shows flow of the cooling water.

Step 1430: The CPU executes a fourth hybrid system circulation control for flowing the cooling water in the hybrid system water circulation passage 50 as shown by arrows in FIG. 17 and the heat pump circulation stop control. When the CPU executes the fourth hybrid system circulation control, the CPU sets the hybrid system flow rate control valve 46 at the first position, sets the first hybrid system water passage shut-off valve 44 at the closed position, sets the second hybrid system water passage shut-off valve 45 at the open position, activates the battery pump 41, stops activating the device pump 42, and activates the heat exchanging fan 79.

When the fourth hybrid system circulation control is executed, the cooling water discharged from the battery pump 41 flows into the hybrid system radiator water passage 54 through the first, ninth, and fifth hybrid system water passages 61, 69, and 65. The cooling water flows through the hybrid system radiator water passage 54 and then, flows into the battery water passage 51 through the sixth hybrid system water passage 66, the internal water passage of the hybrid system flow rate control valve 46, the eighth hybrid system water passage 68, and the second hybrid system water passage 62. The cooling water flows through the battery water passage 51 and then, is suctioned into the battery pump 41 through the third hybrid system water passage 63. Thereby, the cooling water cooled by the hybrid system radiator 43 is supplied to the battery water passage 51 and cools the battery 120.

When the heat pump circulation stop control is executed, the cooling medium stops flowing in the cooling medium circulation passage 80.

Figure 15:
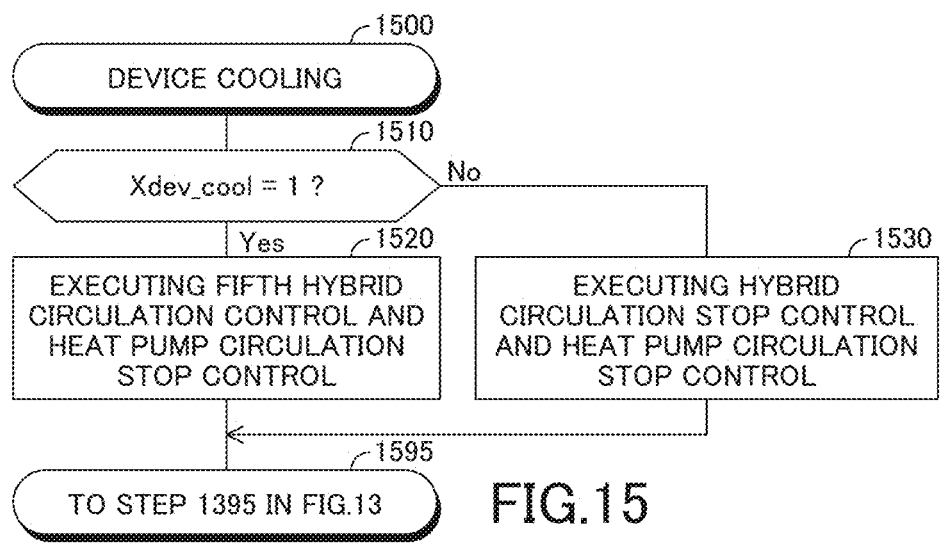
FIG. 15 is a view for showing a flowchart of a routine executed by the CPU.

When the value of the battery cooling request flag Xbat_cool is "0" at a time of executing a process of the step 1310 in FIG. 13, the CPU determines "No" at the step 1310 and then, proceeds with the process to a step 1370 to execute a routine shown by a flowchart in FIG. 15. Therefore, when the CPU proceeds with the process to the step 1370, the CPU starts a process from a step 1500 in FIG. 15 and then, proceeds with the process to a step 1510 to determine whether the value of the device cooling request flag Xdev_cool is "1".

When the value of the device cooling request flag Xdev_cool is "1", the CPU determines "Yes" at the step 1510 and then, executes a process of a step 1520 described below. Then, the CPU proceeds with the process to the step 1395 in FIG. 13 via a step 1595 to terminate this routine once.

Figure 18:
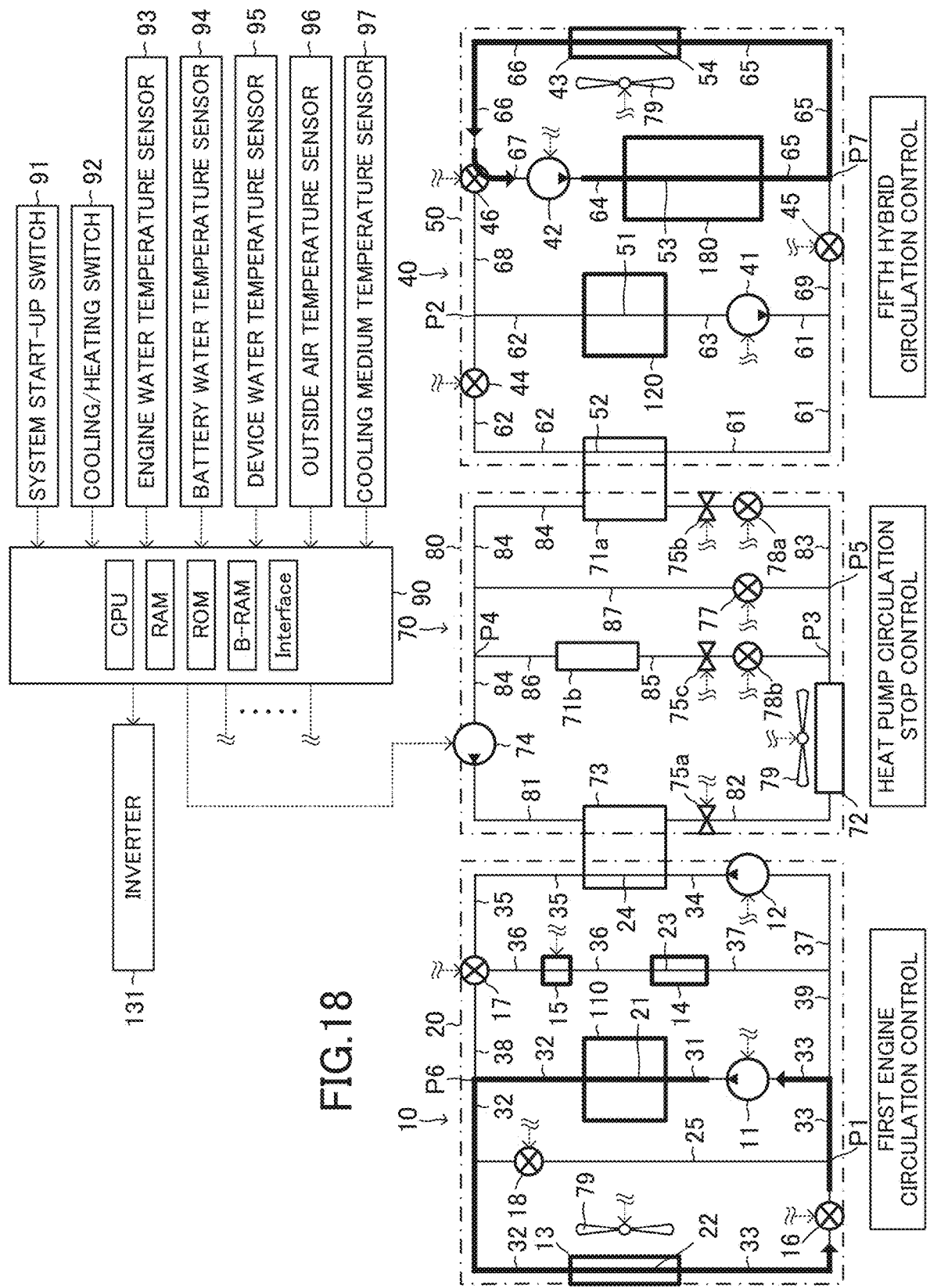
FIG. 18 is a view similar to FIG. 2, and which shows flow of the cooling water.

Step 1520: The CPU executes a fifth hybrid system circulation control for flowing the cooling water in the hybrid system water circulation passage 50 as shown by arrows in FIG. 18 and the heat pump circulation stop control. When the CPU executes the fifth hybrid system circulation control, the CPU sets the hybrid system flow rate control valve 46 at the second position, sets the first hybrid system water passage shut-off valve 44 at the closed position, sets the second hybrid system water passage shut-off valve 45 at the closed position, stops activating the battery pump 41, activates the device pump 42, and activates the heat exchanging fan 79.

When the fifth hybrid system circulation control is executed, the cooling water discharged from the device pump 42 flows into the device water passage 53 through the fourth hybrid system water passage 64. The cooling water flows through the device water passage 53 and then, flows into the hybrid system radiator water passage 54 through the fifth hybrid system water passage 65. The cooling water flows through the hybrid system radiator water passage 54 and then, is suctioned into the device pump 42 through the sixth hybrid system water passage 66, the internal water passage of the hybrid system flow rate control valve 46, and the seventh hybrid system water passage 67. Thereby, the cooling water cooled by the hybrid system radiator 43 is supplied to the device water passage 53 and cools the hybrid device 180.

When the heat pump circulation stop control is executed, the cooling medium stops flowing in the cooling medium circulation passage 80.

On the other hand, when the value of the device cooling request flag Xdev_cool is "0", the CPU determines "No" at the step 1510 and then, executes a process of a step 1530 described below. Then, the CPU proceeds with the process to the step 1395 in FIG. 13 via a step 1595 to terminate this routine once.

Step 1530: The CPU executes a hybrid system circulation stop control for stopping flowing the cooling water in the hybrid system water circulation passage 50 and the heat pump circulation stop control for stopping flowing the cooling medium in the cooling medium circulation passage 80. When the CPU executes the hybrid system circulation stop control, the CPU stops activating the battery and device pumps 41 and 42.

The concrete operation of the embodiment apparatus has been described. The embodiment apparatus executes any of the third to sixth engine circulation controls (see the processes of the steps 1240, 1250, 1270, and 1280 in FIG. 12) when the engine pump activation condition is satisfied (see a determination "Yes" at the step 1210 in FIG. 12). Thereby, the battery temperature Tbat may be maintained within the predetermined battery temperature range WTbat when the battery temperature Tbat may not be maintained within the predetermined battery temperature range WTbat by cooling the cooling medium only by the outside air heat exchanger 72.

<Second Heat Pump Circulation Control>

Figure 19:
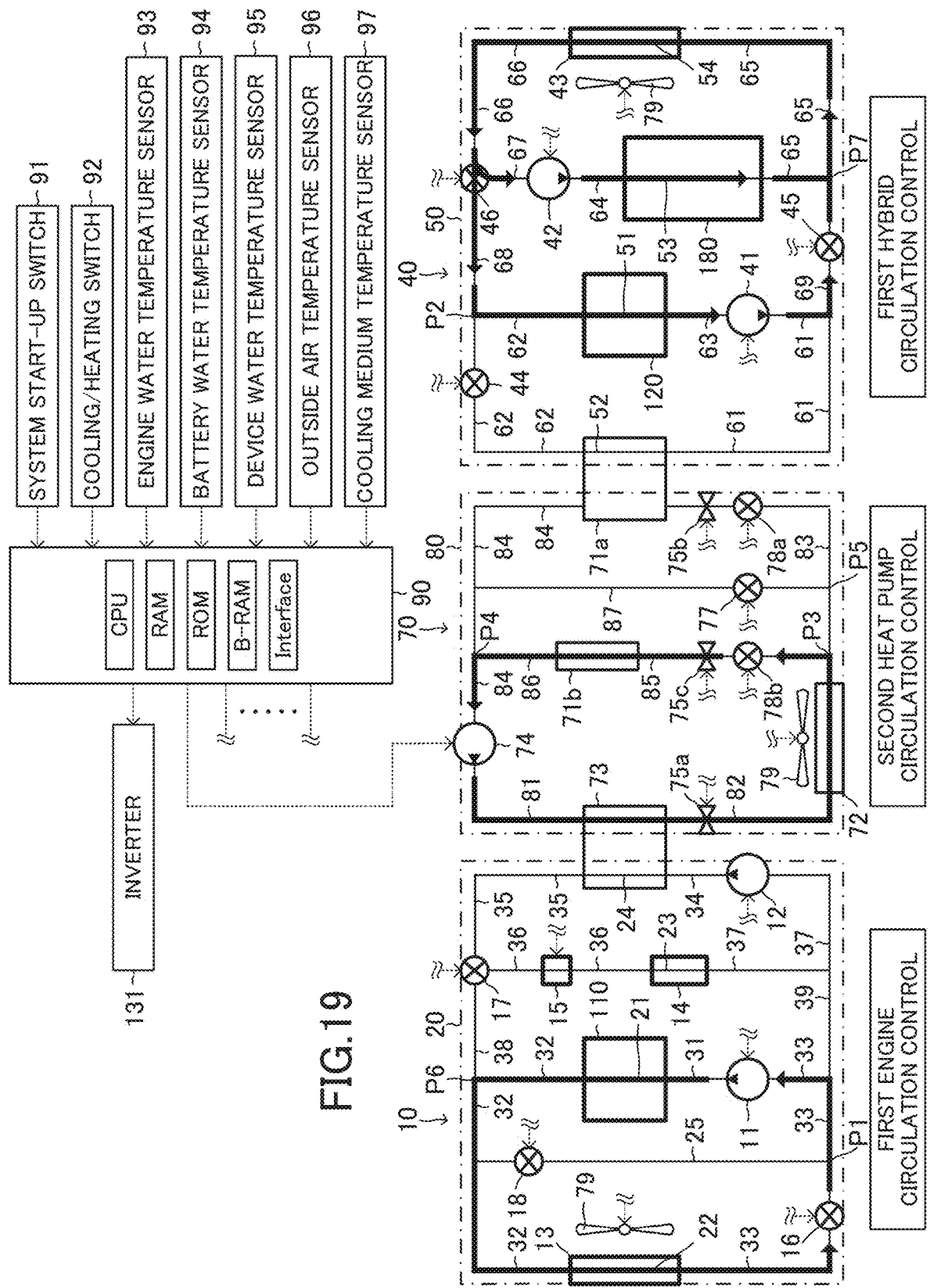
FIG. 19 is a view similar to FIG. 2, and which shows the flow of the cooling water and the flow of the cooling medium.

When the heat pump activation condition is not satisfied, no process of heating the interior of the vehicle 100 is requested, and the process of cooling the interior of the vehicle 100 is requested, the embodiment apparatus is configured to activate the heat pump 70 for supplying the air cooled by the second evaporator 71b to the interior of the vehicle 100. In other words, when the heat pump activation condition is not satisfied, no process of heating the interior of the vehicle 100 is requested, and the process of cooling the interior of the vehicle 100 is requested, the embodiment apparatus executes a second heat pump circulation control for flowing the cooling medium in the cooling medium circulation passage 80 as show by arrows in FIG. 19. When the embodiment apparatus executes the second heat pump circulation control, the embodiment apparatus sets the first expansion valve 75a at the non-decompression position, sets the third expansion valve 75c at the decompression position, sets the first cooling medium passage shut-off valve 78a at the closed position, sets the second cooling medium passage shut-off valve 78b at the open position, sets the heat pump bypass valve 77 at the closed position, and activates the compressor 74 and the heat exchanging fan 79.

In this case, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the second evaporator 71b through the third and fifth cooling medium passages 83 and 85. The cooling medium flows through the second evaporator 71b and then, is suctioned into the compressor 74 through the sixth and fourth cooling medium passages 86 and 84.

Thereby, the cooling medium having the temperature increased by a compression by the compressor 74, discharges the heat to the outside air at the outside air heat exchanger 72. Thereby, the cooling medium is cooled. The cooled cooling medium flows into the second evaporator 71b through the third and fifth cooling medium passages 83 and 85. The cooling medium passes the third expansion valve 75c while the cooling medium flows through the fifth cooling medium passage 85. When the cooling medium passes the third expansion valve 75c, the pressure of the cooling medium decreases, the cooling medium is likely to evaporate. Therefore, the cooling medium flowing into the second evaporator 71b absorbs the heat from the air supplied to the second evaporator 71b by the fan and evaporates. Thereby, the temperature of the air supplied to the second evaporator 71b by the fan decreases. The air having the decreased temperature is supplied to the interior of the vehicle 100. The cooling medium evaporating at the second evaporator 71b and having the increased temperature, is suctioned into the compressor 74 through the sixth and fourth cooling medium passages 86 and 84. The temperature of the cooling medium is further increased by the compression by the compressor 74.

<Seventh Engine Circulation Control>

Figure 20:
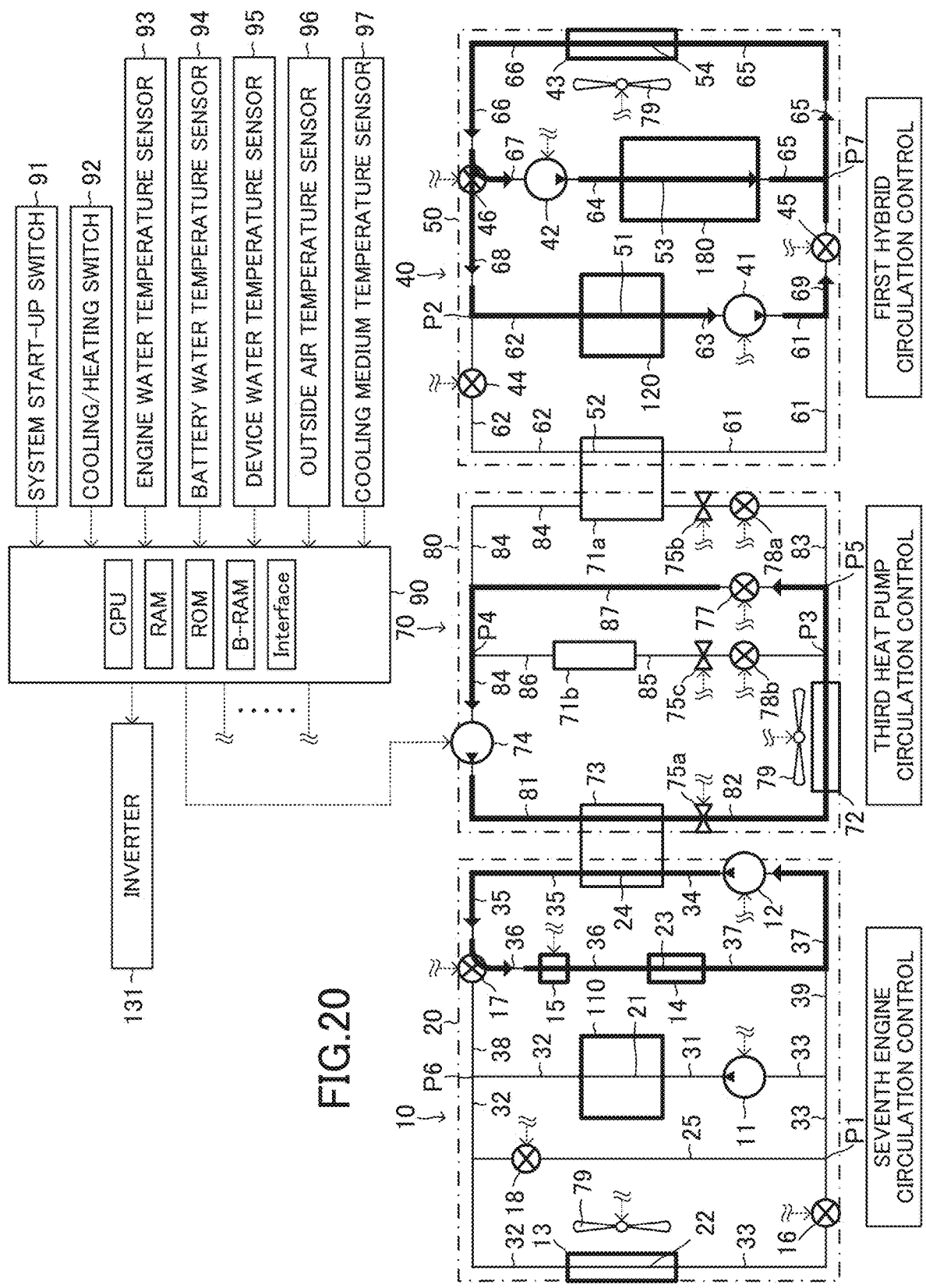
FIG. 20 is a view similar to FIG. 2, and which shows the flow of the cooling water and the flow of the cooling medium.

When the heat pump activation condition is not satisfied, no process of cooling the interior of the vehicle 100 is requested, and the process of heating the interior of the vehicle 100 is requested while the engine 110 stops operating, the embodiment apparatus is configured to activate the heat pump 70 in order to heat the heater core 14. In particular, when the heat pump activation condition is not satisfied, no process of cooling the interior of the vehicle 100 is requested, and the process of heating the interior of the vehicle 100 is requested while the engine 110 stops operating, the embodiment apparatus executes a seventh engine circulation control for flowing the cooling water in the engine water circulation passage 20 as shown by arrows in FIG. 20 and a third heat pump circulation control for flowing the cooling medium in the cooling medium circulation passage 80 as shown by arrows in FIG. 20. When the embodiment apparatus executes the seventh engine circulation control, the embodiment apparatus sets the engine flow rate control valve 17 at the second position and activates the heating pump 12. In addition, when the embodiment apparatus executes the third heat pump circulation control, the embodiment apparatus sets the first expansion valve 75a at the decompression position, sets the first cooling medium passage shut-off valve 78a at the closed position, sets the second cooling medium passage shut-off valve 78b at the closed position, sets the heat pump bypass valve 77 at the open position, and activates the compressor 74 and the heat exchanging fan 79.

In this case, the cooling water discharged from the heating pump 12 flows into the condenser water passage 24 through the fourth engine water passage 34. The cooling water flows through the condenser water passage 24 and then, flows into the core water passage 23 through the fifth and sixth engine water passages 35 and 36. The cooling water flows through the core water passage 23 and then, is suctioned into the heating pump 12 through the seventh engine water passage 37.

The cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, is suctioned into the compressor 74 through the third cooling medium passage 83, the bypass passage 87, and the fourth cooling medium passage 84.

Thereby, the cooling medium having the temperature increased by the compression by the compressor 74, discharges the heat at the condenser 73 to the cooling water flowing through the condenser water passage 24. Thereby, the cooling water is heated. The heated cooling water flows into the core water passage 23 through the fifth and sixth engine water passages 35 and 36. The cooling water heats the heater core 14 while the cooling water flows through the core water passage 23.

After the cooling medium discharges the heat to the cooling water at the condenser 73, the cooling medium flows into the outside air heat exchanger 72 through the second cooling medium passage 82. The cooling medium passes the first expansion valve 75a while the cooling medium flows through the second cooling medium passage 82. When the cooling medium passes the first expansion valve 75a, the cooling medium is decompressed and is likely to evaporate. Therefore, the cooling medium flowing into the outside air heat exchanger 72 absorbs the heat of the outside air and evaporates. Thereby, the temperature of the cooling medium increases. The cooling medium having the increased temperature is suctioned into the compressor 74. The temperature of the cooling medium is further increased by the compression by the compressor 74.

<Fifth Engine Circulation Control by First Modified Apparatus>

Figure 21:
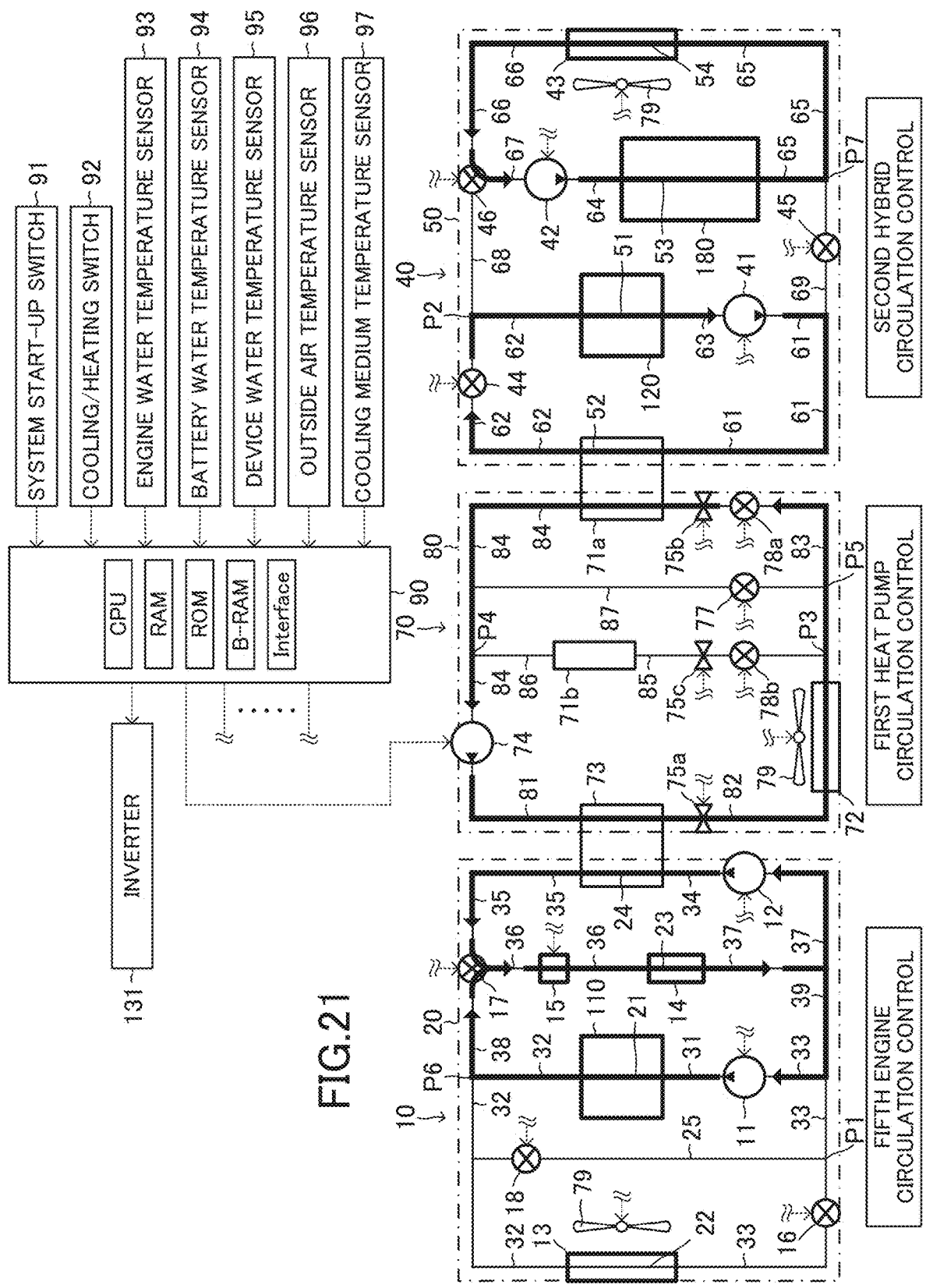
FIG. 21 is a view similar to FIG. 2, and which shows the flow of the cooling water and the flow of the cooling medium.

The embodiment apparatus may be configured to execute the fifth engine circulation control for flowing the cooling water in the engine water circulation passage 20 as shown by arrows in FIG. 21 when the engine pump activation condition is satisfied, the radiator cooling condition is not satisfied, and the process of heating the heater core 14 is requested. When the embodiment apparatus configured as such (hereinafter, will be referred to as "the first modified apparatus") executes the fifth engine circulation control, the first modified apparatus sets the engine flow rate control valve 17 at the fourth position, sets the engine water passage shut-off valve 16 at the closed position, sets the engine bypass valve 18 at the closed position, and activates the engine and heating pumps 11 and 12. At this time, the second hybrid system circulation control is executed. Thus, the heat exchanging fan 79 is activated.

When the first modified apparatus executes the fifth engine circulation control, the cooling water discharged from the engine pump 11 flows into the engine internal water passage 21 through the first engine water passage 31. The cooling water flows through the engine internal water passage 21 and then, flows into the internal water passage of the engine flow rate control valve 17 through the second and eighth engine water passages 32 and 38. On the other hand, the cooling water discharged from the heating pump 12 flows into the condenser water passage 24 through the fourth engine water passage 34. The cooling water flows through the condenser water passage 24 and then, flows into the internal water passage of the engine flow rate control valve 17 through the fifth engine water passage 35.

The cooling water flows into the sixth engine water passage 36 from the internal water passage of the engine flow rate control valve 17. The cooling water flows into the core water passage 23 through the sixth engine water passage 36. The cooling water flows through the core water passage 23 and then, flows into the seventh engine water passage 37. A part of the cooling water is suctioned into the engine pump 11 through the seventh, ninth, and third engine water passage 37, 39, and 33. On the other hand, the remaining of the cooling water is suctioned into the heating pump 12 through the seventh engine water passage 37.

Thereby, effects similar to effect accomplished by the embodiment apparatus executing the fifth engine circulation control may be accomplished.

<Engine Warming Control>

Figure 22:
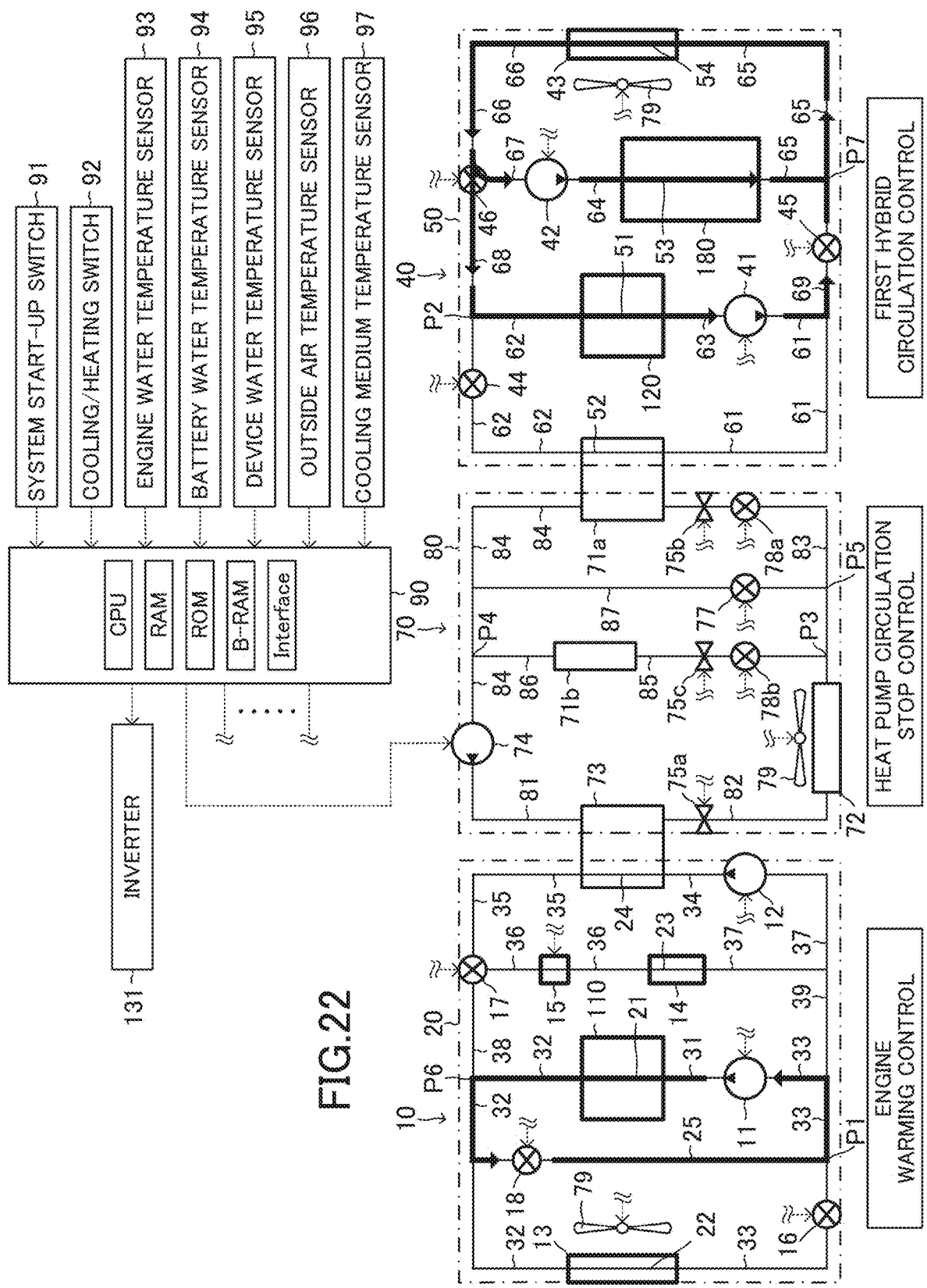
FIG. 22 is a view similar to FIG. 2, and which shows the flow of the cooling water.

The embodiment apparatus executes an engine warming control for increasing the engine temperature Teng to the engine warmed temperature Teng_dan when no process of cooling the engine 110 is requested while the engine 110 operates. In particular, when no process of cooling the engine 110 is requested while the engine 110 operates, the embodiment apparatus executes an engine warming control for flowing the cooling water in the engine water circulation passage 20 as shown by arrows in FIG. 22. When the embodiment apparatus executes the engine warming control, the embodiment apparatus sets the engine flow rate control valve 17 at the closed or second position, sets the engine water passage shut-off valve 16 at the closed position, sets the engine bypass valve 18 at the open position, and activates the engine pump 11.

In this case, the cooling water discharged from the engine pump 11 flows into the engine internal water passage 21 through the first engine water passage 31. The cooling water flows through the engine internal water passage 21 and then, is suctioned into the engine pump 11 through the second engine water passage 32, the engine bypass water passage 25, and the third engine water passage 33.

Thereby, the cooling water heated by the heat generated by the engine 110 while the cooling water flows through the engine internal water passage 21, is supplied to the engine internal water passage 21 without being cooled by the engine radiator 13, etc. Thus, the engine temperature Teng may reach the engine warmed temperature Teng_dan promptly.

It should be noted that the invention is not limited to the aforementioned embodiment and various modifications can be employed within the scope of the present invention.

For example, the embodiment apparatus may be configured to determine that the engine pump activation condition is satisfied when at least one, or at least two, or all of the permission condition CP, the request condition CEP1, and the request condition CEP2 is/are satisfied.

Further, the embodiment apparatus may be configured to determine that the radiator cooling condition is satisfied when both of the request condition CRC1 and the request condition CRC2 are satisfied.

Furthermore, the embodiment apparatus may be configured to determine that the heat pump activation control is satisfied when at least two, or at least three, or all of the request conditions CHP1 to CHP4 is/are satisfied.

Further, the embodiment apparatus cools the battery 120 by the heat pump 70 when the heat pump activation condition is satisfied. In this regard, the embodiment apparatus may be configured to cool the battery 120 by the heat pump 70 when the process of cooling the battery 120 is requested, independently of whether the heat pump activation condition is satisfied or not.

Furthermore, the embodiment apparatus may be configured to use the heat pump 70 in order to cool the hybrid device 180 or a hybrid system including the battery 120 and the hybrid device 180 without using the heat pump 70 in order to cool the battery 120 only.

Figure 23:
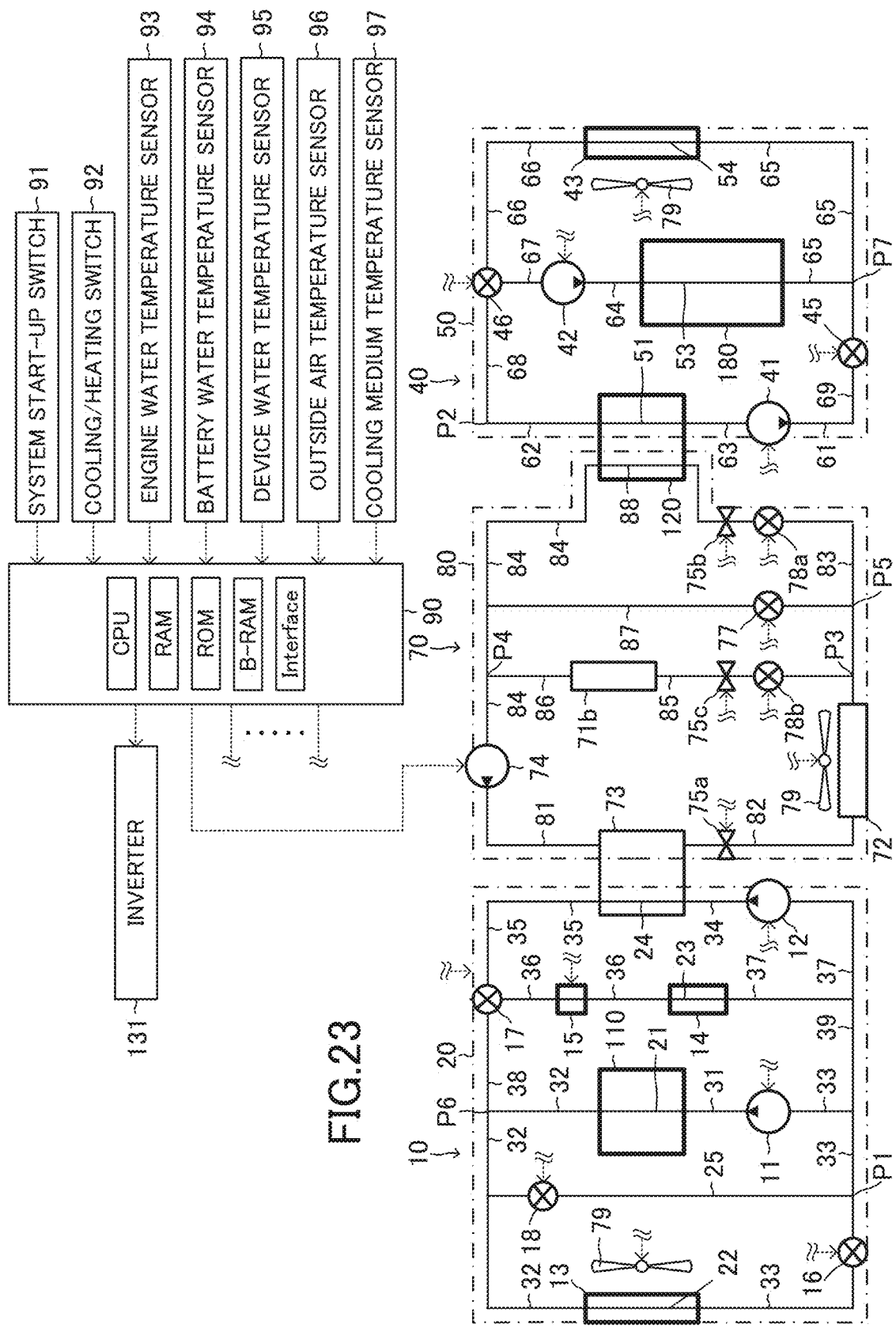
FIG. 23 is a view for showing a cooling apparatus of the vehicle driving system according to a second modified example of the embodiment.

Further, the invention may be applied to a cooling apparatus of the vehicle driving system configured as shown in FIG. 23. The cooling apparatus shown in FIG. 23 has the same configuration as the configuration of the embodiment apparatus except of the hybrid system temperature control apparatus 40 and the heat pump 70. Hereinafter, the cooling apparatus shown in FIG. 23 will be referred to as "the second modified apparatus".

The hybrid system temperature control apparatus 40 of the second modified apparatus includes the battery pump 41, the device pump 42, the hybrid system radiator 43, the second hybrid system water passage shut-off valve 45, the hybrid system flow rate control valve 46, and the hybrid system water circulation passage 50. Function of the hybrid system flow rate control valve 46 of the second modified apparatus is the same as function of the hybrid system flow rate control valve 46 of the embodiment apparatus.

The hybrid system water circulation passage 50 of the second modified apparatus is formed by the battery water passage 51, the device water passage 53, the hybrid system radiator water passage 54, the first to ninth hybrid system water passages 61 to 69, the internal water passage (not shown) of the battery pump 41, the internal water passage (not shown) of the device pump 42, and the internal water passage (not shown) of the hybrid system flow rate control valve 46.

Functions of the battery water passage 51, the device water passage 53, and the hybrid system radiator water passage 54 of the second modified apparatus are the same as functions of the battery water passage 51, the device water passage 53, and the hybrid system radiator water passage 54 of the embodiment apparatus, respectively.

The first hybrid system water passage 61 of the second modified apparatus is a passage for the cooling water and fluidically connects the cooling water discharging opening of the battery pump 41 to the ninth hybrid system water passage 69. The second hybrid system water passage 62 of the second modified apparatus is a passage for the cooling water and fluidically connects the eighth hybrid system water passage 68 to the inlet of the battery water passage 51. The third to seventh hybrid system water passages 63 to 67 of the second modified apparatus are the same as the third to seventh hybrid system water passages 63 to 67 of the embodiment apparatus, respectively.

As described above, the end of the eighth hybrid system water passage 68 of the second modified apparatus is fluidically connected to the second hybrid system water passage 62, and the other end of the eighth hybrid system water passage 68 is fluidically connected to the third hybrid system port 46c of the hybrid system flow rate control valve 46. Also, as described above, the end of the ninth hybrid system water passage 69 of the second modified apparatus is fluidically connected to the fifth hybrid system water passage 65, and the other end of the ninth hybrid system water passage 69 is fluidically connected to the first hybrid system water passage 61.

Functions of the second hybrid system water passage shut-off valve 45 and the hybrid system flow rate control valve 46 of the second modified apparatus are the same as functions of the second hybrid system water passage shut-off valve 45 and the hybrid system flow rate control valve 46 of the embodiment apparatus, respectively. Functions of the battery and device pumps 41 and 42 of the second modified apparatus are the same as functions of the battery and device pumps 41 and 42 of the embodiment apparatus, respectively.

<Heat Pump>

The heat pump 70 of the second modified apparatus includes the second evaporator 71b, the outside air heat exchanger 72, the condenser 73, the compressor 74, the first expansion valve 75a, the second expansion valve 75b, the third expansion valve 75c, the heat pump bypass valve 77, the first cooling medium passage shut-off valve 78a, the second cooling medium passage shut-off valve 78b, and the cooling medium circulation passage 80.

The cooling medium circulation passage 80 of the second modified apparatus is formed by a battery cooling medium passage 88 provided in the battery 120, the internal passage (not shown) of the outside air heat exchanger 72, the internal passage (not shown) of the condenser 73, the first to sixth cooling medium passages 81 to 86, and the bypass passage 87.

The first and second cooling medium passages 81 and 82 of the second modified apparatus are the same as the first and second cooling medium passages 81 and 82 of the embodiment apparatus, respectively. The third cooling medium passage 83 of the second modified apparatus is a passage for the cooling medium and fluidically connects the cooling medium outlet of the outside air heat exchanger 72 to the cooling medium inlet of the battery cooling medium passage 88. The fourth cooling medium passage 84 of the second modified apparatus is a passage for the cooling medium and fluidically connects the cooling medium outlet of the battery cooling medium passage 88 to the cooling medium suctioning opening of the compressor 74. The fifth and sixth cooling medium passages 85 and 86 of the second modified apparatus are the same as the fifth and sixth cooling medium passages 85 and 86 of the embodiment apparatus, respectively. The bypass passage 87 of the second modified apparatus is a passage for the cooling medium and fluidically connects a portion of the third cooling medium passage 83 between the connection portion P3 and the cooling medium inlet of the battery cooling medium passage 88 to a portion of the fourth cooling medium passage 84 between the connection portion P4 and the cooling medium outlet of the battery cooling medium passage 88. The fifth cooling medium passage 85 is fluidically connected to the third cooling medium passage 83 at the connection portion P3. The sixth cooling medium passage 86 is fluidically connected to the fourth cooling medium passage 84 at the connection portion P4.

The first expansion valve 75a, the second expansion valve 75b, the third expansion valve 75c, the first cooling medium passage shut-off valve 78a, the second cooling medium passage shut-off valve 78b, the heat pump bypass valve 77, and the compressor 74 of the second modified apparatus are the same as the first expansion valve 75a, the second expansion valve 75b, the third expansion valve 75c, the first cooling medium passage shut-off valve 78a, the second cooling medium passage shut-off valve 78b, the heat pump bypass valve 77, and the compressor 74 of the embodiment apparatus, respectively.

The heat pump 70 of the second modified apparatus does not include the first evaporator 71a in contrast to the heat pump 70 of the embodiment apparatus. The heat pump 70 of the second modified apparatus is configured to cause the cooling medium to cool the battery 120 directly. Thus, the hybrid system temperature control apparatus 40 of the second modified apparatus does not include a passage for supplying the cooling water to the evaporator water passage 52 in contrast to the hybrid system temperature control apparatus 40 of the embodiment apparatus. Therefore, the heat pump 70 and the hybrid system temperature control apparatus 40 of the second modified apparatus are simplified, compared to the heat pump 70 and the hybrid system temperature control apparatus 40 of the embodiment apparatus.

<First Hybrid System Circulation Control and Heat Pump Circulation Stop Control>

When the process of cooling the battery 120 is requested, the process of cooling the hybrid device 180 is requested, and the heat pump activation condition is not satisfied, the second modified apparatus executes the first hybrid system circulation control for flowing the cooling water in the hybrid system water circulation passage 50 and the heat pump circulation stop control for stopping activating the heat pump 70.

When the second modified apparatus executes the first hybrid system circulation control, the second modified apparatus sets the hybrid system flow rate control valve 46 at the fourth position, sets the second hybrid system water passage shut-off valve 45 at the open position, and activates the battery pump 41, the device pump 42, and the heat exchanging fan 79.

Flow of the cooling water in the hybrid system water circulation passage 50 when the second modified apparatus executes the first hybrid system circulation control, is the same as the flow of the cooling water in the hybrid system water circulation passage 50 when the embodiment apparatus executes the first hybrid system circulation control.

The cooling water is cooled while the cooling water flows through the hybrid system radiator water passage 54 by executing the first hybrid system circulation control. The cooled cooling water is supplied to the device and battery water passages 53 and 51. Thereby, the hybrid device 180 and the battery 120 are cooled.

<First Hybrid System Circulation Control and First Heat Pump Circulation Control>

Figure 25:
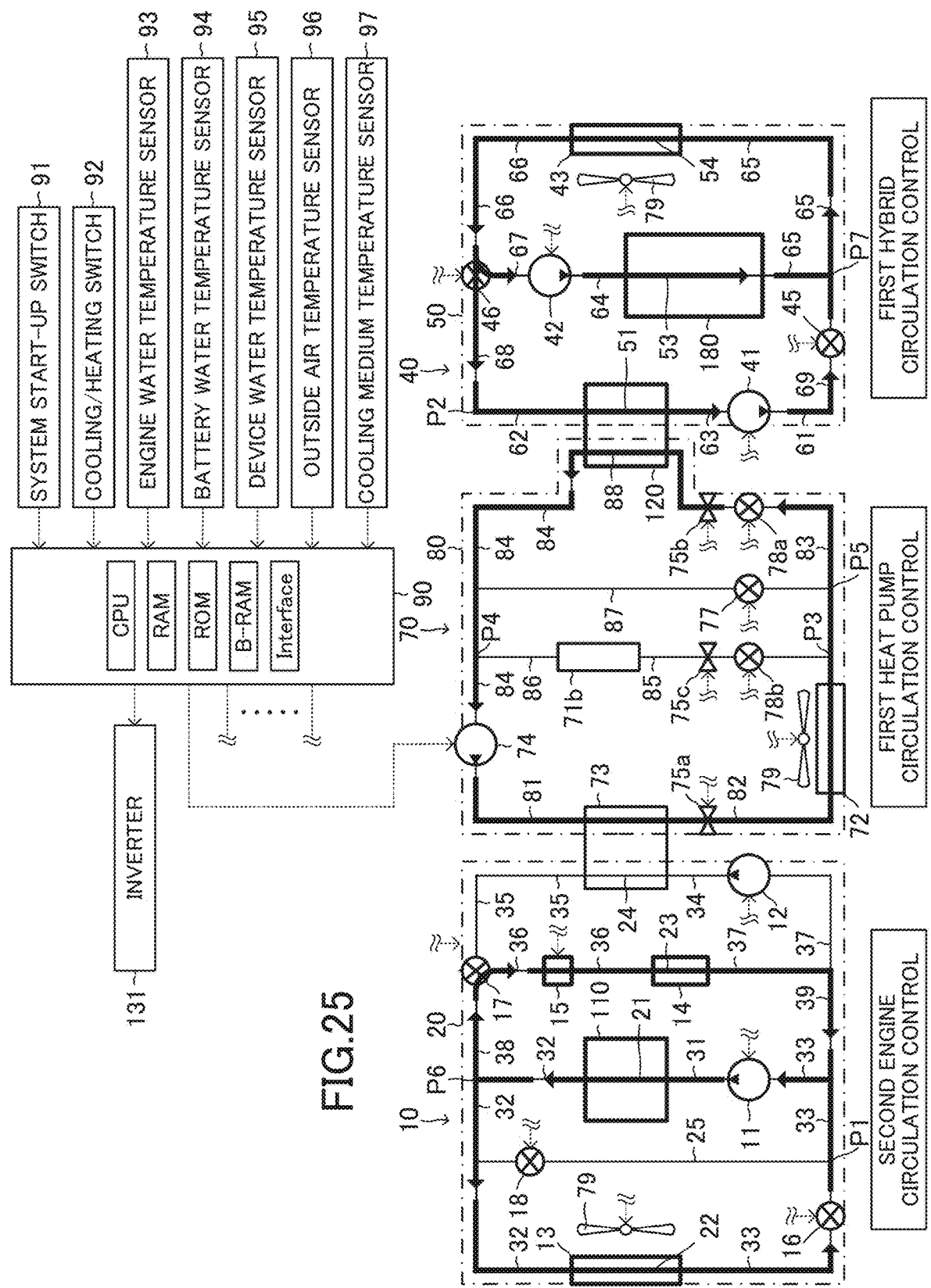
FIG. 25 is a view similar to FIG. 23, and which shows the flow of the cooling water and the flow of the cooling medium.

When the process of cooling the battery 120 is requested, the process of cooling the hybrid device 180 is requested, and the heat pump activation condition is satisfied, the second modified apparatus executes the first hybrid system circulation control for flowing the cooling water in the hybrid system water circulation passage 50 as shown by arrows in FIG. 25 and the first heat pump circulation control for flowing the cooling medium in the cooling medium circulation passage 80 as shown by arrows in FIG. 25.

When the second modified apparatus executes the first heat pump circulation control, the second modified apparatus sets the first expansion valve 75a at the non-decompression position, sets the second expansion valve 75b at the decompression position, sets the heat pump bypass valve 77 at the closed position, sets the first cooling medium passage shut-off valve 78a at the open position, sets the second cooling medium passage shut-off valve 78b at the closed position, and activates the compressor 74. At this time, the third expansion valve 75c may be sets at the decompression or non-decompression position.

When the first heat pump circulation control is executed, the cooling medium discharged from the compressor 74 flows into the condenser 73 through the first cooling medium passage 81. The cooling medium flows through the condenser 73 and then, flows into the outside air heat exchanger 72 through the second cooling medium passage 82. The cooling medium flows through the outside air heat exchanger 72 and then, flows into the battery cooling medium passage 88 through the third cooling medium passage 83. The cooling medium flows through the battery cooling medium passage 88 and then, is suctioned into the compressor 74 through the fourth cooling medium passage 84.

According to the first heat pump circulation control, the first expansion valve 75a is set at the non-decompression position, and the second expansion valve 75b is set at the decompression position. Therefore, the cooling medium having the temperature increased by the compression by the compressor 74 discharges the heat to the outside air when the cooling medium passes the outside air heat exchanger 72. Thereby, the temperature of the cooling medium decreases.

The cooling medium having the decreased temperature passes the second expansion valve 75b. The cooling medium is decompressed when the cooling medium passes the second expansion valve 75b. The cooling medium having the decompressed pressure and the decreased temperature passes the battery cooling medium passage 88. The cooling medium absorbs the heat from the battery 120 and evaporates while the cooling medium flows through the battery cooling medium passage 88. Thereby, the battery 120 is cooled.

When the first hybrid system circulation control and the heat pump circulation stop control are executed, the battery cooling water and the device cooling water are cooled only by the hybrid system radiator 43. On the other hand, when the first hybrid system circulation control and the first heat pump circulation control are executed, the battery cooling water and the device cooling water are cooled by the heat pump 70 and the hybrid system radiator 43. Therefore, when the first hybrid system circulation control and the first heat pump circulation control are executed, the temperatures of the battery cooling water and the device cooling water are decreased to lower temperatures, compared to when the first hybrid system circulation control and the heat pump circulation stop control are executed.

Thus, when the outside air temperature Tair is higher than the predetermined temperature Tair_th, or when the motor output power PMtotal is larger than the water cooling upper limit output power PMupper, or when the battery water temperature TWbat is higher than the water cooling upper limit water temperature TWbat_upper, or when the motor heat generation amount HM is larger than the water cooling upper limit heat generation amount HMupper, the battery and device temperatures Tbat and Tdev may be maintained within the predetermined battery and device temperature ranges WTbat and WTdev, respectively.

<First Engine Circulation Control>

Figure 24:
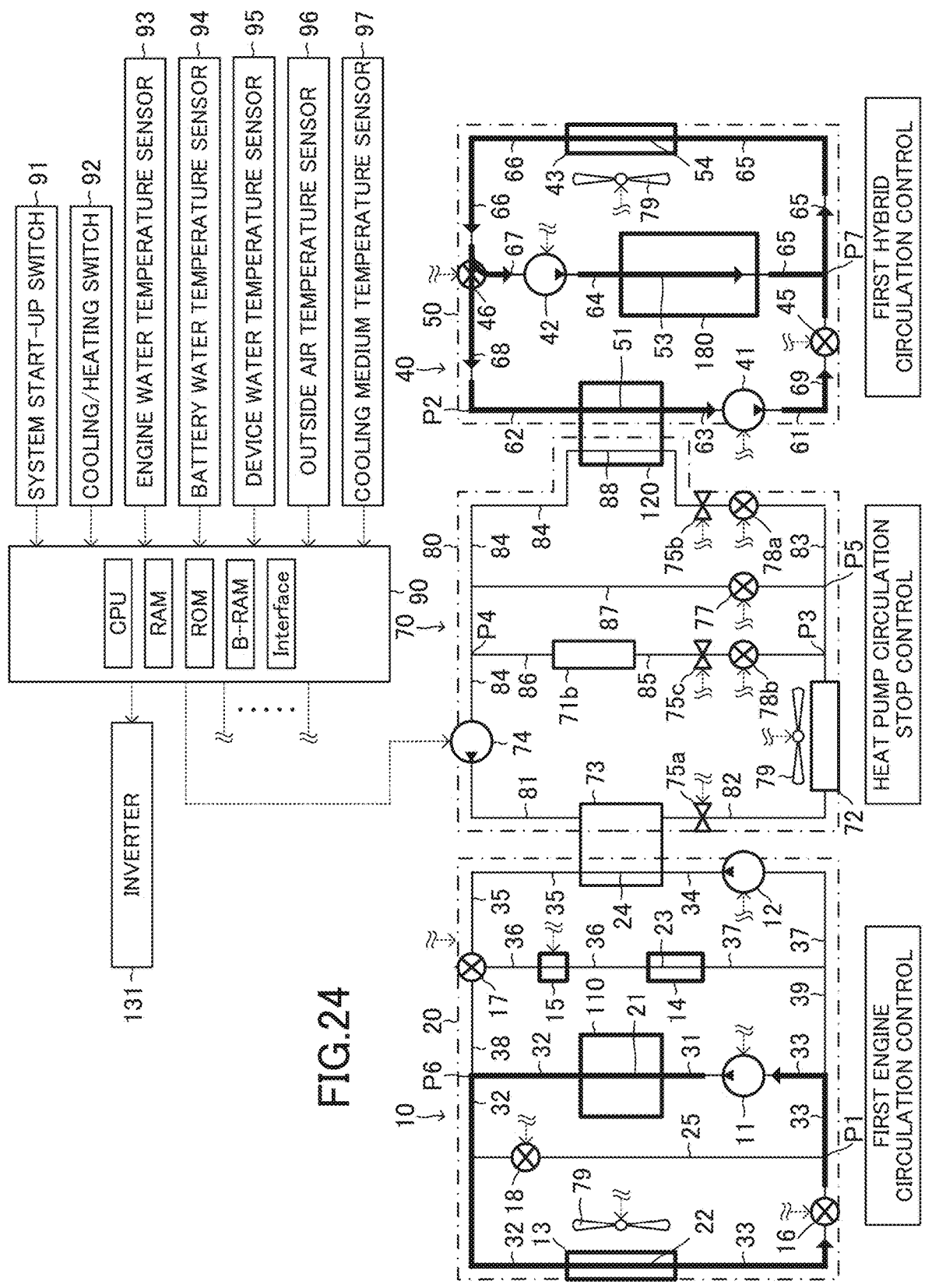
FIG. 24 is a view similar to FIG. 23, and which shows the flow of the cooling water.

When the process of cooling the engine 110 is requested, and no process of heating the heater core 14 is requested, the second modified apparatus executes the first engine circulation control for flowing the cooling water in the engine water circulation passage 20 as shown by arrows in FIG. 24. When the second modified apparatus executes the first engine circulation control, the second modified apparatus sets the engine flow rate control valve 17 at the closed position, sets the engine water passage shut-off valve 16 at the open position, sets the engine bypass valve 18 at the closed position, activates the engine pump 11, stops activating the heating pump 12, and activates the heat exchanging fan 79.

The flow of the cooling water in the engine water circulation passage 20 when the second modified apparatus executes the first engine circulation control, is the same as the flow of the cooling water in the engine water circulation passage 20 when the embodiment apparatus executes the first engine circulation control. When the second modified apparatus executes the first engine circulation control, the same effects as the effects accomplished when the embodiment apparatus executes the first engine circulation control, may be accomplished.

<Second Engine Circulation Control>

When the process of cooling the engine 110 is requested, and the process of heating the heater core 14 is requested, the second modified apparatus executes the second engine circulation control for flowing the cooling water in the engine water circulation passage 20 as shown by arrows in FIG. 25. When the second modified apparatus executes the second engine circulation control, the second modified apparatus sets the engine flow rate control valve 17 at the third position, sets the engine water passage shut-off valve 16 at the open position, sets the engine bypass valve 18 at the closed position, activates the engine pump 11, stops activating the heating pump 12, and activates the heat exchanging fan 79.

The flow of the cooling water in the engine water circulation passage 20 when the second modified apparatus executes the second engine circulation control, is the same as the flow of the cooling water in the engine water circulation passage 20 when the embodiment apparatus executes the second engine circulation control. When the second modified apparatus executes the second engine circulation control, the same effects as the effects accomplished by the embodiment apparatus executing the second engine circulation control, may be accomplished.

<Third Engine Circulation Control>

Figure 26:
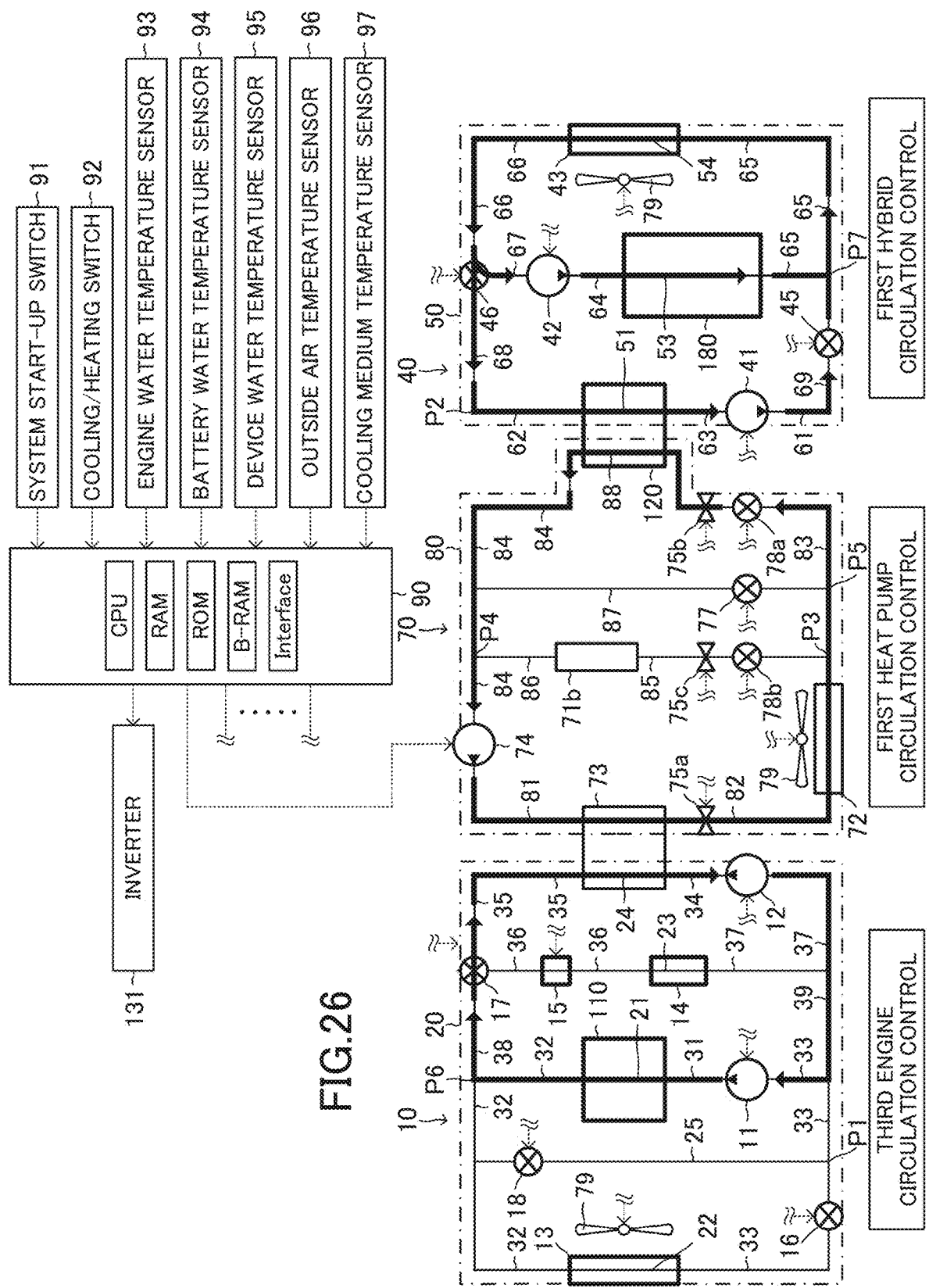
FIG. 26 is a view similar to FIG. 23, and which shows the flow of the cooling water and the flow of the cooling medium.

When the engine pump activation condition is satisfied, the radiator cooling condition is not satisfied, and no process of heating the heater core 14 is requested, the second modified apparatus executes the third engine circulation control for flowing the cooling water in the engine water circulation passage 20 as shown by arrows in FIG. 26. When the second modified apparatus executes the third engine circulation control, the second modified apparatus sets the engine flow rate control valve 17 at the first position, sets the engine water passage shut-off valve 16 at the closed position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the second modified apparatus executes the third engine circulation control, is the same as the flow of the cooling water in the engine water circulation passage 20 when the embodiment apparatus executes the third engine circulation control. When the second modified apparatus executes the third engine circulation control, the same effects as the effects accomplished by the embodiment apparatus executing the third engine circulation control, may be accomplished.

<Fourth Engine Circulation Control>

Figure 27:
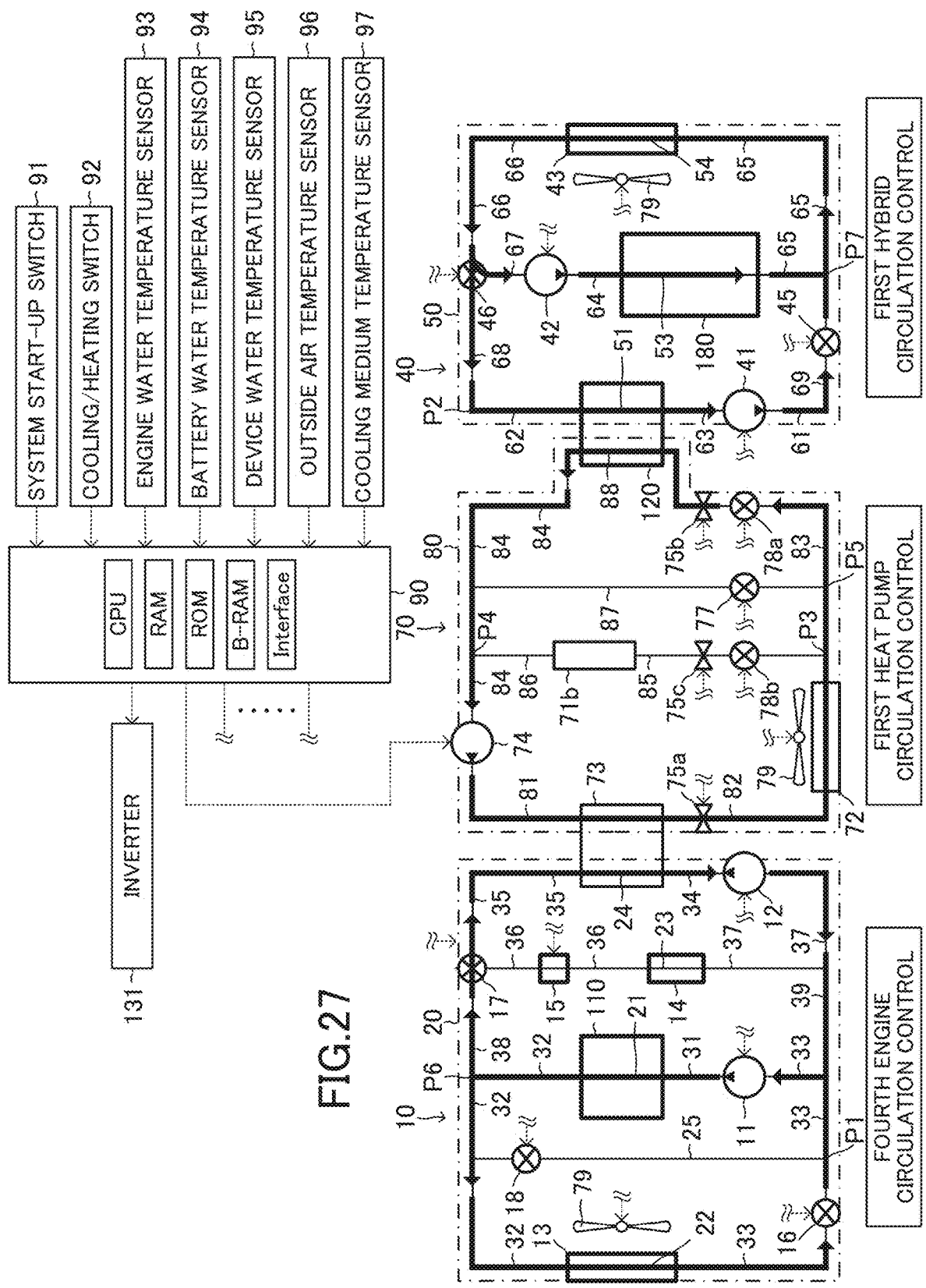
FIG. 27 is a view similar to FIG. 23, and which shows the flow of the cooling water and the flow of the cooling medium.

When the engine pump activation condition is satisfied, the radiator cooling condition is satisfied, and no process of heating the heater core 14 is requested, the second modified apparatus executes the fourth engine circulation control for flowing the cooling water in the engine water circulation passage 20 as shown by arrows in FIG. 27. When the second modified apparatus executes the fourth engine circulation control, the second modified apparatus sets the engine flow rate control valve 17 at the first position, sets the engine water passage shut-off valve 16 at the open position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the second modified apparatus executes the fourth engine circulation control, is the same as the flow of the cooling water in the engine water circulation passage 20 when the embodiment apparatus executes the fourth engine circulation control. When the second modified apparatus executes the fourth engine circulation control, the same effects as the effects accomplished by the embodiment apparatus executing the fourth engine circulation control, may be accomplished.

<Fifth Engine Circulation Control>

Figure 28:
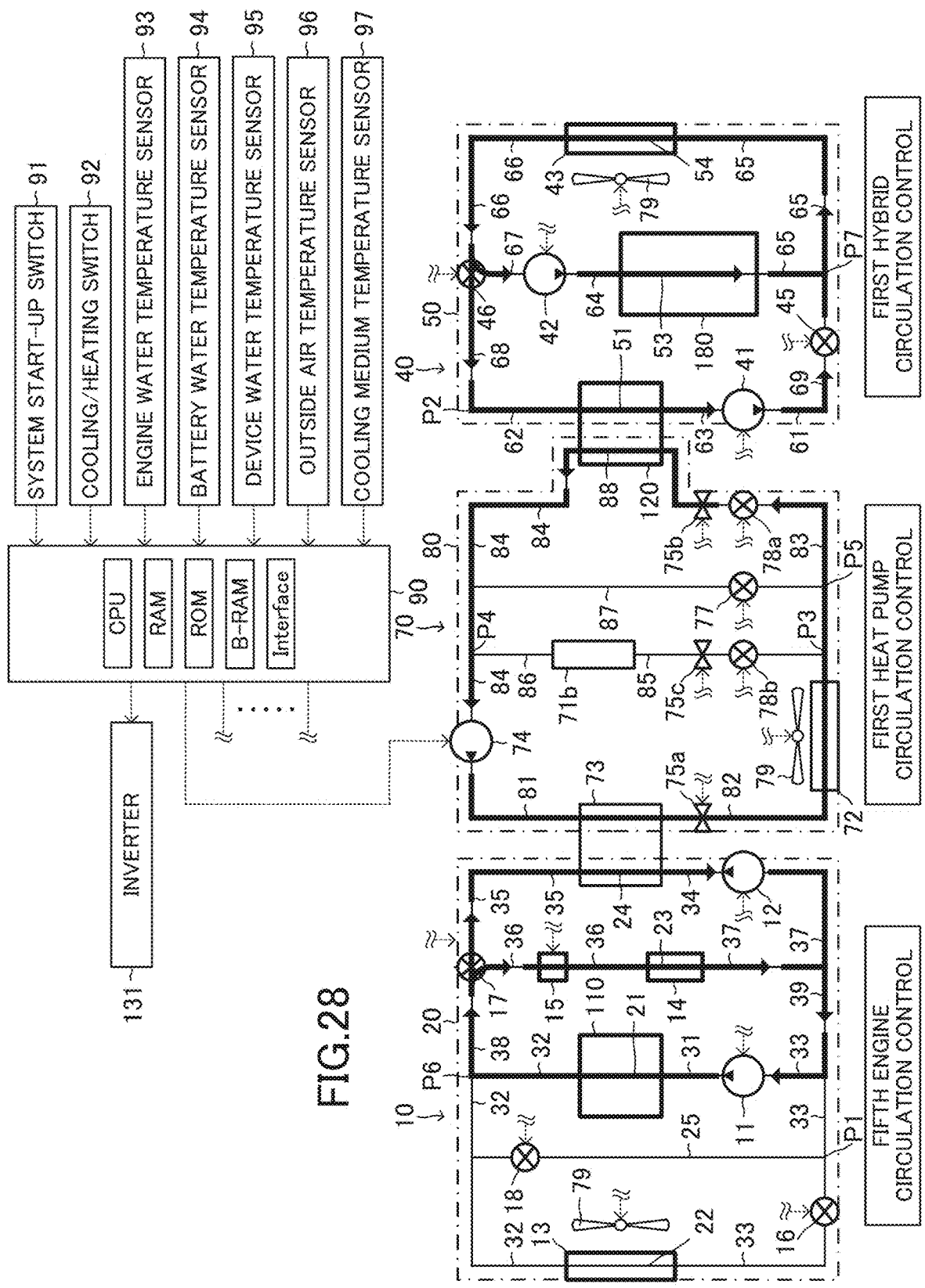
FIG. 28 is a view similar to FIG. 23, and which shows the flow of the cooling water and the flow of the cooling medium.

When the engine pump activation condition is satisfied, the radiator cooling condition is not satisfied, and the process of heating the heater core 14 is requested, the second modified apparatus executes the fifth engine circulation control for flowing the cooling water in the engine water circulation passage 20 as shown by arrows in FIG. 28. When the second modified apparatus executes the fifth engine circulation control, the second modified apparatus sets the engine flow rate control valve 17 at the fourth position, sets the engine water passage shut-off valve 16 at the closed position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the second modified apparatus executes the fifth engine circulation control, is the same as the flow of the cooling water in the engine water circulation passage 20 when the embodiment apparatus executes the fifth engine circulation control. When the second modified apparatus executes the fifth engine circulation control, the same effects as the effects accomplished by the embodiment apparatus executing the fifth engine circulation control, may be accomplished.

<Sixth Engine Circulation Control>

Figure 29:
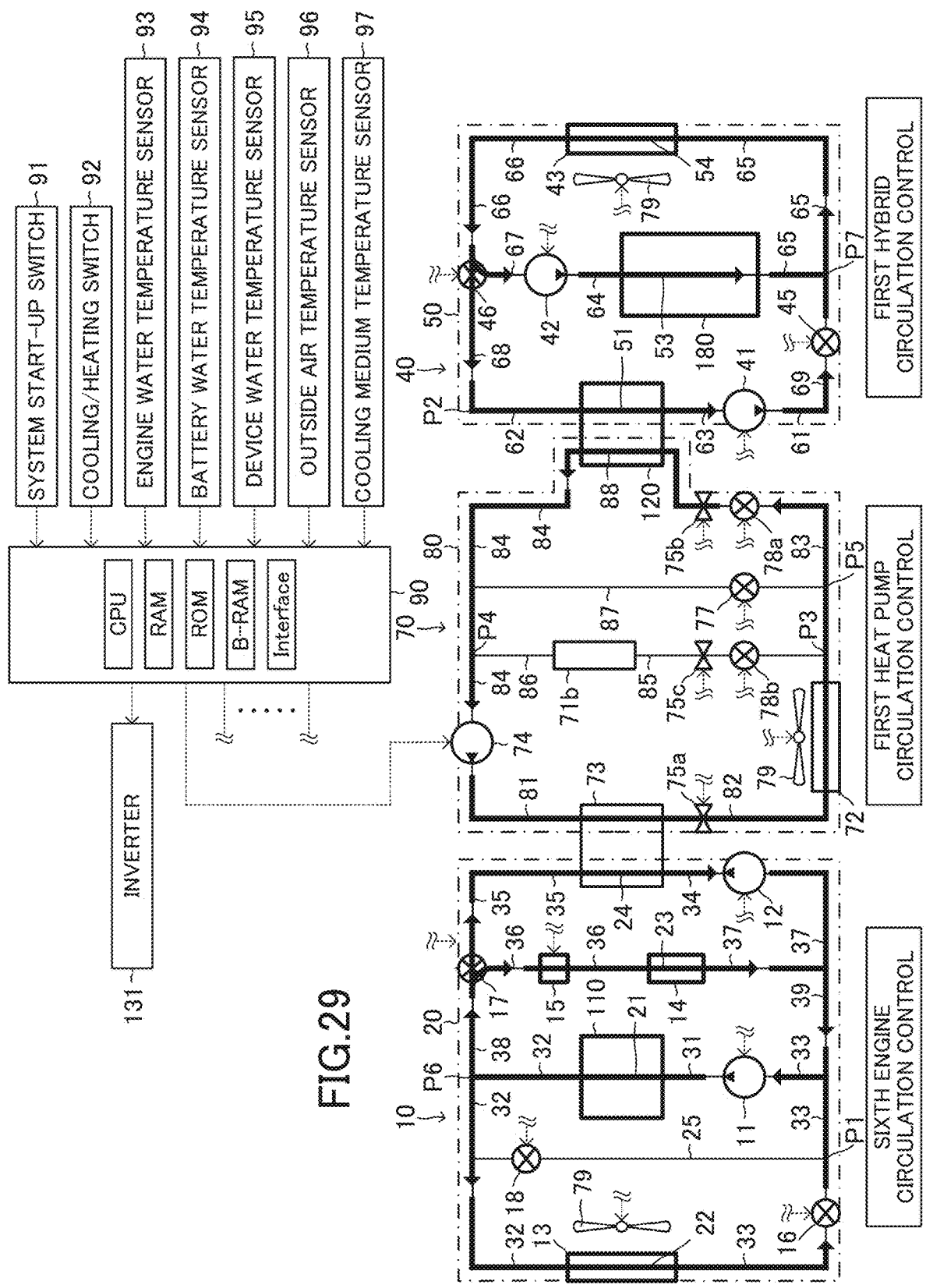
FIG. 29 is a view similar to FIG. 23, and which shows the flow of the cooling water and the flow of the cooling medium.

When the engine pump activation condition is satisfied, the radiator cooling condition is satisfied, and the process of heating the heater core 14 is requested, the second modified apparatus executes the sixth engine circulation control for flowing the cooling water in the engine water circulation passage 20 as shown by arrows in FIG. 29. When the second modified apparatus executes the sixth engine circulation control, the second modified apparatus sets the engine flow rate control valve 17 at the fourth position, sets the engine water passage shut-off valve 16 at the open position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the second modified apparatus executes the sixth engine circulation control, is the same as the flow of the cooling water in the engine water circulation passage 20 when the embodiment apparatus executes the sixth engine circulation control. When the second modified apparatus executes the sixth engine circulation control, the same effects as the effects accomplished by the embodiment apparatus executing the sixth engine circulation control, may be accomplished.

Figure 30:
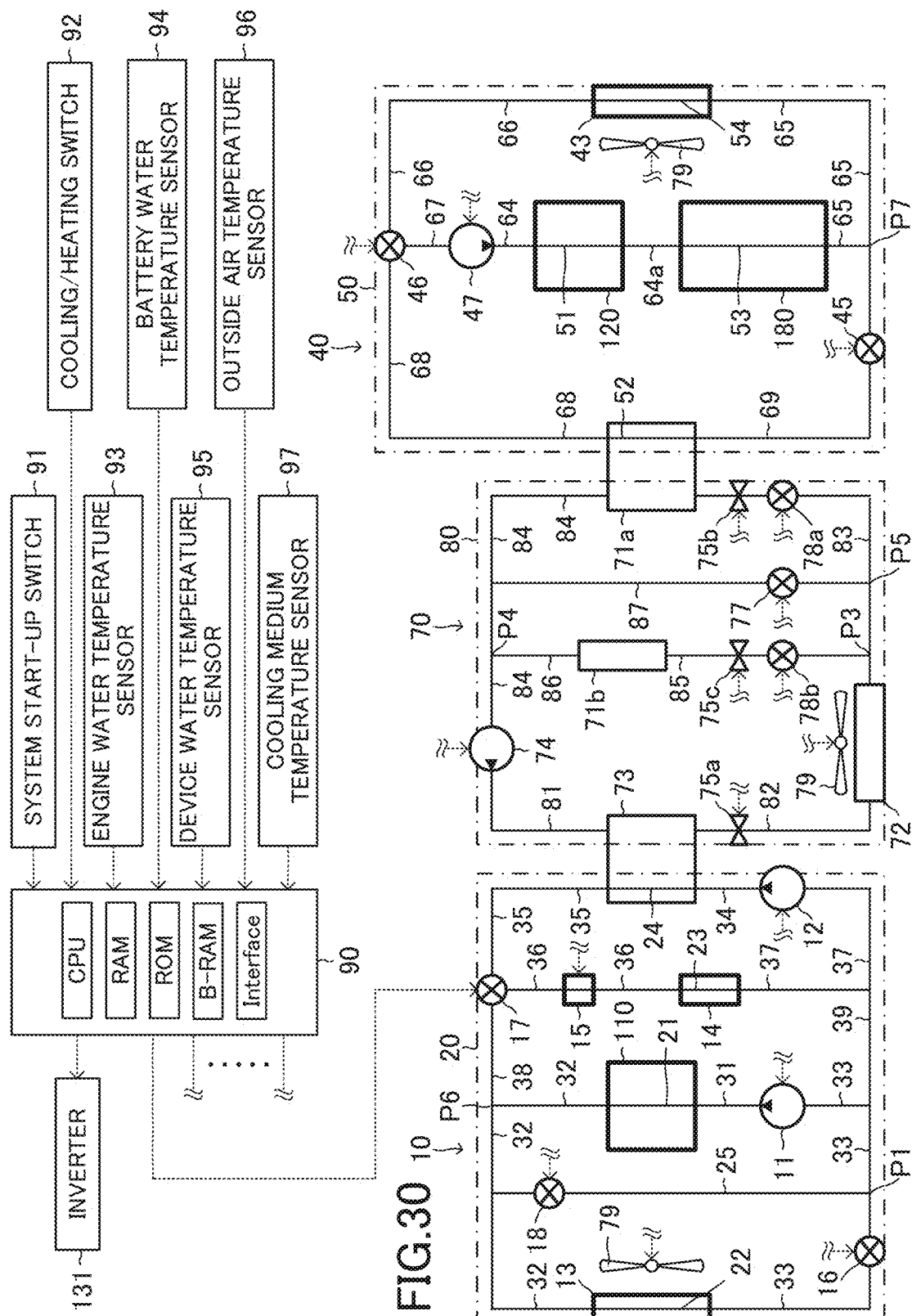
FIG. 30 is a view for showing a cooling apparatus of the vehicle driving system according to a third modified example of the embodiment.

The invention may be applied to a cooling apparatus of the vehicle driving system configured as shown in FIG. 30. The cooling apparatus shown in FIG. 30 is the same as the embodiment apparatus except of the hybrid system temperature control apparatus 40. Hereinafter, the cooling apparatus shown in FIG. 30 will be referred to as "the third modified apparatus".

The hybrid system temperature control apparatus 40 of the third modified apparatus includes a hybrid system pump 47, the hybrid system radiator 43, the second hybrid system water passage shut-off valve 45, the hybrid system flow rate control valve 46, and the hybrid system water circulation passage 50. The hybrid system flow rate control valve 46 of the third modified apparatus is the same as the hybrid system flow rate control valve 46 of the embodiment apparatus.

The hybrid system water circulation passage 50 of the third modified apparatus is formed by the battery water passage 51, the evaporator water passage 52, the device water passage 53, the hybrid system radiator water passage 54, the fourth to ninth hybrid system water passages 64 to 69, a tenth hybrid system water passage 64a, an internal water passage (not shown) of the hybrid system pump 47, and the internal water passage (not shown) of the hybrid system flow rate control valve 46.

The battery water passage 51, the evaporator water passage 52, the device water passage 53, and the hybrid system radiator water passage 54 of the third modified apparatus are the same as the battery water passage 51, the evaporator water passage 52, the device water passage 53, and the hybrid system radiator water passage 54 of the embodiment apparatus, respectively.

The fourth hybrid system water passage 64 of the third modified apparatus is a passage for the cooling water and fluidically connects a cooling water discharging opening of the hybrid system pump 47 to the inlet of the battery water passage 51. The fifth hybrid system water passage 65 of the third modified apparatus is a passage for the cooling water and fluidically connects the outlet of the device water passage 53 to the inlet of the hybrid system radiator water passage 54.

The sixth hybrid system water passage 66 of the third modified apparatus is a passage for the cooling water and fluidically connects the outlet of the hybrid system radiator water passage 54 to the first hybrid system port 46a of the hybrid system flow rate control valve 46. The seventh hybrid system water passage 67 of the third modified apparatus is a passage for the cooling water and fluidically connects the second hybrid system port 46b of the hybrid system flow rate control valve 46 to a cooling water suctioning opening of the hybrid system pump 47.

The eighth hybrid system water passage 68 of the third modified apparatus is a passage for the cooling water and fluidically connects the outlet of the evaporator water passage 52 to the third hybrid system port 46c of the hybrid system flow rate control valve 46. The ninth hybrid system water passage 69 of the third modified apparatus is a passage for the cooling water and fluidically connects the fifth hybrid system water passage 65 to the inlet of the evaporator water passage 52. The tenth hybrid system water passage 64a is a passage for the cooling water and fluidically connects the outlet of the battery water passage 51 to the inlet of the device water passage 53.

The second hybrid system water passage shut-off valve 45 of the third modified apparatus is the same as the second hybrid system water passage shut-off valve 45 of the embodiment apparatus except that the second hybrid system water passage shut-off valve 45 of the third modified apparatus is provided in the ninth hybrid system water passage 69. The hybrid system flow rate control valve 46 of the third modified apparatus is the same as the hybrid system flow rate control valve 46 of the embodiment apparatus.

The hybrid system pump 47 is electrically connected to the ECU 90. An activation of the hybrid system pump 47 is controlled by the ECU 90.

<First Hybrid System Circulation Control and Heat Pump Circulation Stop Control>

Figure 31:
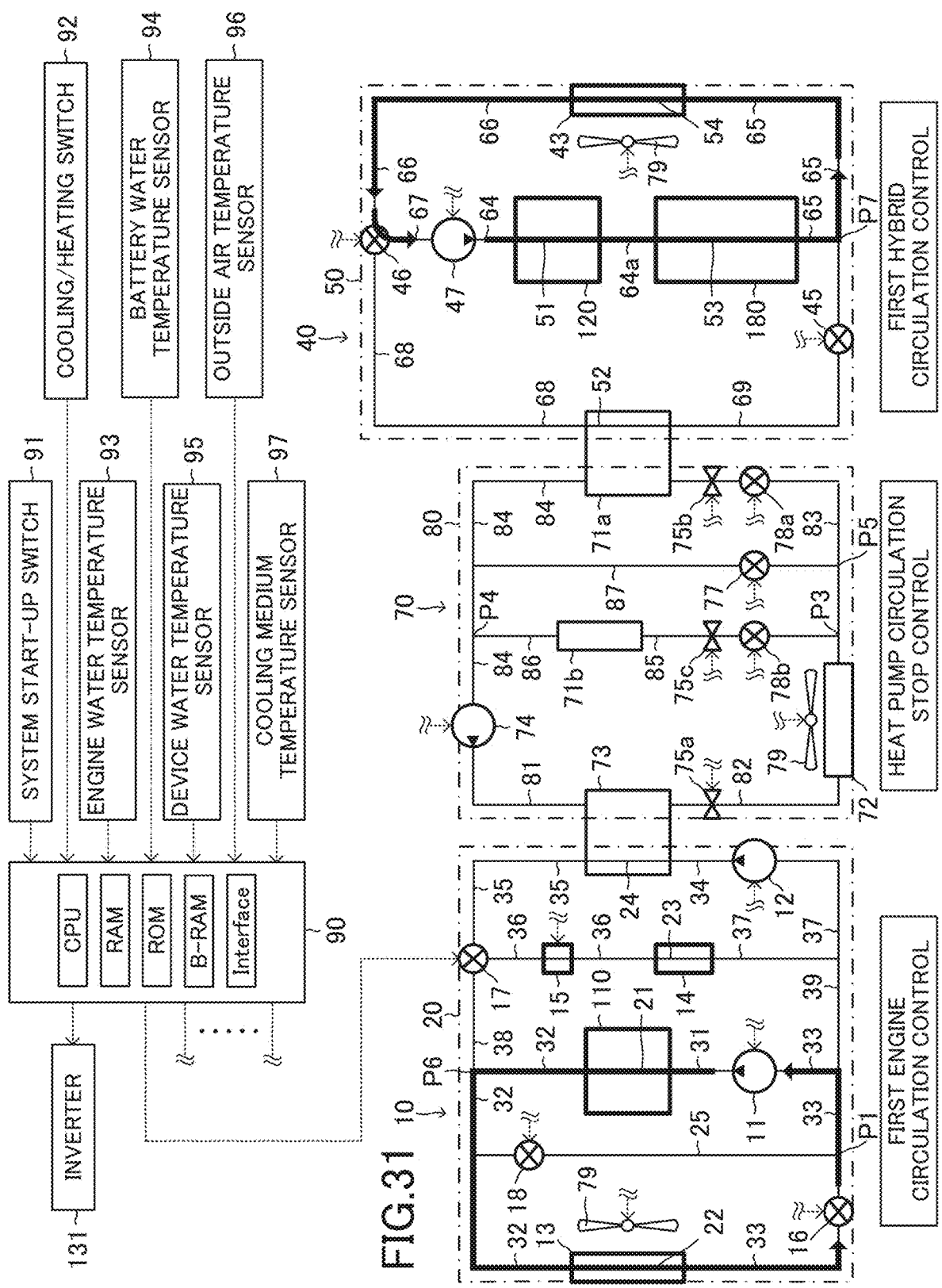
FIG. 31 is a view similar to FIG. 30, and which shows the flow of the cooling water.

When at least one of the process of cooling the battery 120 and the process of cooling the hybrid device 180 is requested, and the heat pump activation condition is not satisfied, the third modified apparatus executes the first hybrid system circulation control for flowing the cooling water in the hybrid system water circulation passage 50 as shown by arrows in FIG. 31 and the heat pump circulation stop control for stopping activating the heat pump 70.

When the third modified apparatus executes the first hybrid system circulation control, the third modified apparatus sets the hybrid system flow rate control valve 46 at the second position, sets the second hybrid system water passage shut-off valve 45 at the closed position, and activates the hybrid system pump 47 and the heat exchanging fan 79.

In this case, the cooling water discharged from the hybrid system pump 47 flows into the battery water passage 51 through the fourth hybrid system water passage 64. The cooling water flows through the battery water passage 51 and then, flows into the device water passage 53 through the tenth hybrid system water passage 64*a*. The cooling water flows through the device water passage 53 and then, flows into the hybrid system radiator water passage 54 through the fifth hybrid system water passage 65. The cooling water flows through the hybrid system radiator water passage 54 and then, flows into the internal water passage of the hybrid system flow rate control valve 46 through the sixth hybrid system water passage 66. The cooling water flowing into the internal water passage of the hybrid system flow rate control valve 46, is suctioned into the hybrid system pump 47 through the seventh hybrid system water passage 67.

The cooling water is cooled while the cooling water flows through the hybrid system radiator water passage 54 by executing the first hybrid system circulation control. The cooled cooling water is supplied to the device and battery water passages 53 and 51. Thereby, the hybrid device 180 and the battery 120 are cooled.

<First Hybrid System Circulation Control and First Heat Pump Circulation Control>

Figure 32:
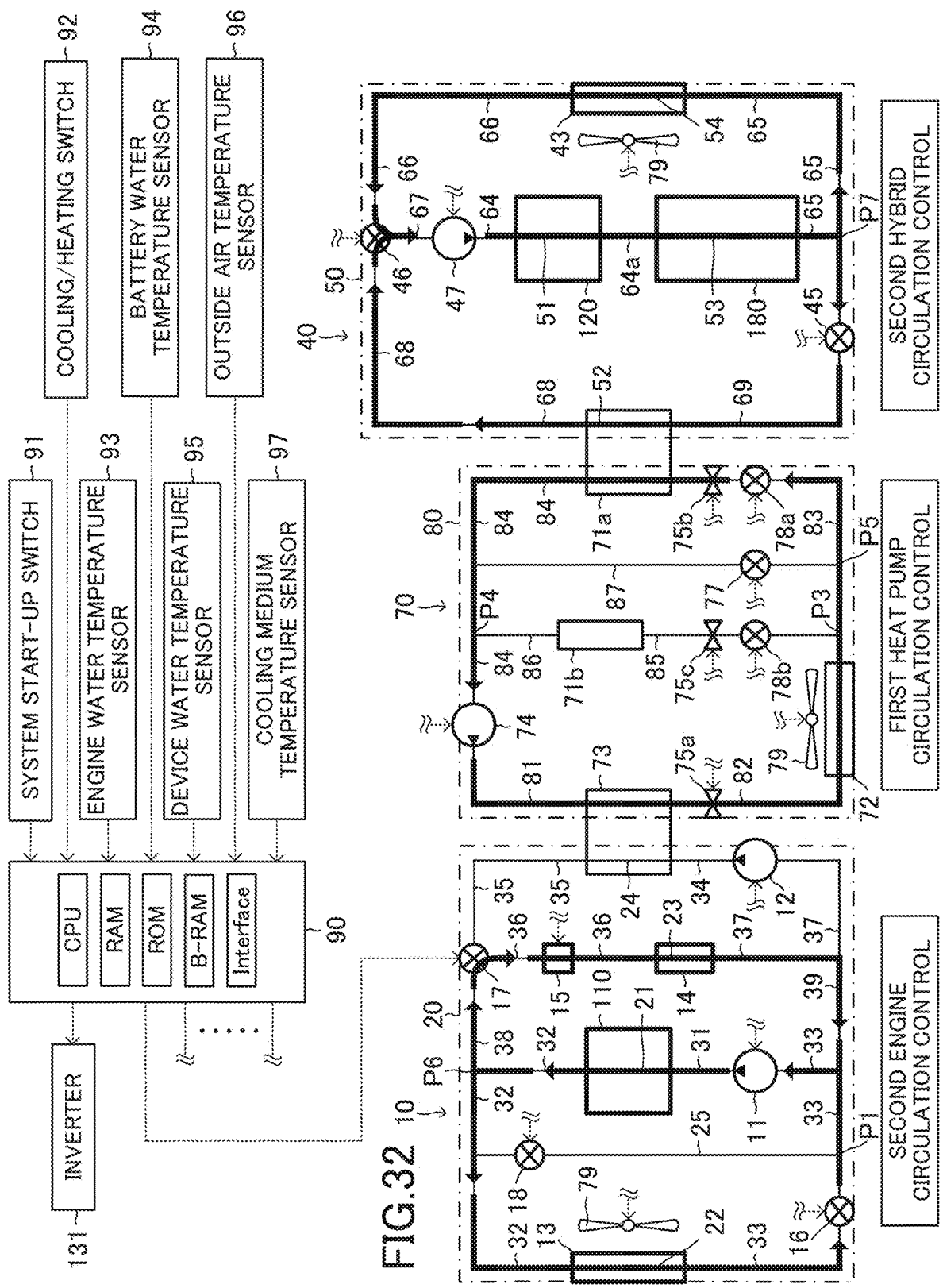
FIG. 32 is a view similar to FIG. 30, and which shows the flow of the cooling water and the flow of the cooling medium.

When the process of cooling the battery 120 is requested, the process of cooling the hybrid device 180 is requested, the heat pump activation condition is satisfied, the third modified apparatus executes the second hybrid system circulation control for flowing the cooling water in the hybrid system water circulation passage 50 as shown by arrows in FIG. 32 and first heat pump circulation control for flowing the cooling medium in the cooling medium circulation passage 80 as shown by arrows in FIG. 32.

When the third modified apparatus executes the second hybrid system circulation control, the third modified apparatus sets the hybrid system flow rate control valve 46 at the fourth position, sets the second hybrid system water passage shut-off valve 45 at the open position, and activates the hybrid system pump 47 and the heat exchanging fan 79.

When the third modified apparatus executes the first heat pump circulation control, the third modified apparatus sets the first expansion valve 75*a* at the non-decompression position, sets the second expansion valve 75*b* at the decompression position, sets the heat pump bypass valve 77 at the closed position, sets the first cooling medium passage shut-off valve 78*a* at the open position, sets the second cooling medium passage shut-off valve 78*b* at the closed position, and activates the compressor 74. The third expansion valve 75*c* may be set at the decompression or non-decompression position.

When the third modified apparatus executes the second hybrid system circulation control, the cooling water discharged from the hybrid system pump 47 flows into the battery water passage 51 through the fourth hybrid system water passage 64. The cooling water flows through the battery water passage 51 and then, flows into the device water passage 53 through the tenth hybrid system water passage 64*a*. The cooling water flows through the device water passage 53 and then, flows into the fifth hybrid system water passage 65. A part of the cooling water flows into the hybrid system radiator water passage 54 through the fifth hybrid system water passage 65. The cooling water flows through the hybrid system radiator water passage 54 and then, is suctioned into the hybrid system pump 47 through the sixth hybrid system water passage 66, the internal water passage of the hybrid system flow rate control valve 46, and the seventh hybrid system water passage 67.

On the other hand, the remaining of the cooling water flows into the evaporator water passage 52 through the fifth and ninth hybrid system water passages 65 and 69. The cooling water flows through the evaporator water passage 52 and then, is suctioned into the hybrid system pump 47 through the eighth hybrid system water passage 68, the internal water passage of the hybrid system flow rate control valve 46, and the seventh hybrid system water passage 67.

The flow of the cooling medium in the cooling medium circulation passage 80 when the third modified apparatus executes the first heat pump circulation control, is the same as the flow of the cooling medium in the cooling medium circulation passage 80 when the embodiment apparatus executes the first heat pump circulation control.

Thereby, the cooling water is cooled by the hybrid system radiator 43 while the cooling water flows through the hybrid system radiator water passage 54 and cooled by the first evaporator 71*a* while the cooling water flows through the evaporator water passage 52. The cooled cooling water is supplied to the battery and device water passages 51 and 53.

When the first hybrid system circulation control and the heat pump circulation stop control are executed, the battery cooling water and the device cooling water are cooled only by the hybrid system radiator 43. When the second hybrid system circulation control and the first heat pump circulation control are executed, the battery cooling water and the device cooling water are cooled by the first evaporator 71*a* of the heat pump 70 and the hybrid system radiator 43. Therefore, when the second hybrid system circulation control and the first heat pump circulation control are executed, the temperatures of the battery cooling water and the device cooling water may be decreased to lower temperatures, compared to when the first hybrid system circulation control and the heat pump circulation stop control are executed.

Thus, when the outside air temperature Tair is higher than the predetermined temperature Tair_th, or when the motor output power PMtotal is larger than the water cooling upper limit output power PMupper, or when the battery water temperature TWbat is higher than the water cooling upper limit water temperature TWbat_upper, or when the motor heat generation amount HM is larger than the water cooling upper limit heat generation amount HMupper, the battery and device temperatures Tbat and Tdev may be maintained within the predetermined battery and device temperature ranges WTbat and WTdev, respectively.

<First Engine Circulation Control>

When the process of cooling the engine 110 is requested, and no process of heating the heater core 14 is requested, the third modified apparatus executes the first engine circulation control for flowing the cooling water in the engine water circulation passage 20 as shown by arrows in FIG. 31. When the third modified apparatus executes the first engine circulation control, the third modified apparatus sets the engine flow rate control valve 17 at the closed position, sets the engine water passage shut-off valve 16 at the open position, sets the engine bypass valve 18 at the closed position, activates the engine pump 11, stops activating the heating pump 12, and activates the heat exchanging fan 79.

The flow of the cooling water in the engine water circulation passage 20 when the third modified apparatus executes the first engine circulation control, is the same as the flow of the cooling water in the engine water circulation passage 20 when the embodiment apparatus executes the first engine circulation control. When the third modified apparatus executes the first engine circulation control, the same effects as the effects accomplished by the embodiment apparatus executing the first engine circulation control, may be accomplished.

<Second Engine Circulation Control>

When the process of cooling the engine 110 is requested, and the process of heating the heater core 14 is requested, the third modified apparatus executes the second engine circulation control for flowing the cooling water in the engine water circulation passage 20 as shown by arrows in FIG. 32. When the third modified apparatus executes the second engine circulation control, the third modified apparatus sets the engine flow rate control valve 17 at the third position, sets the engine water passage shut-off valve 16 at the open position, sets the engine bypass valve 18 at the closed position, activates the engine pump 11, stops activating the heating pump 12, and activates the heat exchanging fan 79.

The flow of the cooling water in the engine water circulation passage 20 when the third modified apparatus executes the second engine circulation control, is the same as the flow of the cooling water in the engine water circulation passage 20 when the embodiment apparatus executes the second engine circulation control. When the third modified apparatus executes the second engine circulation control, the same effects as the effects accomplished by the embodiment apparatus executing the second engine circulation control, may be accomplished.

<Third Engine Circulation Control>

Figure 33:
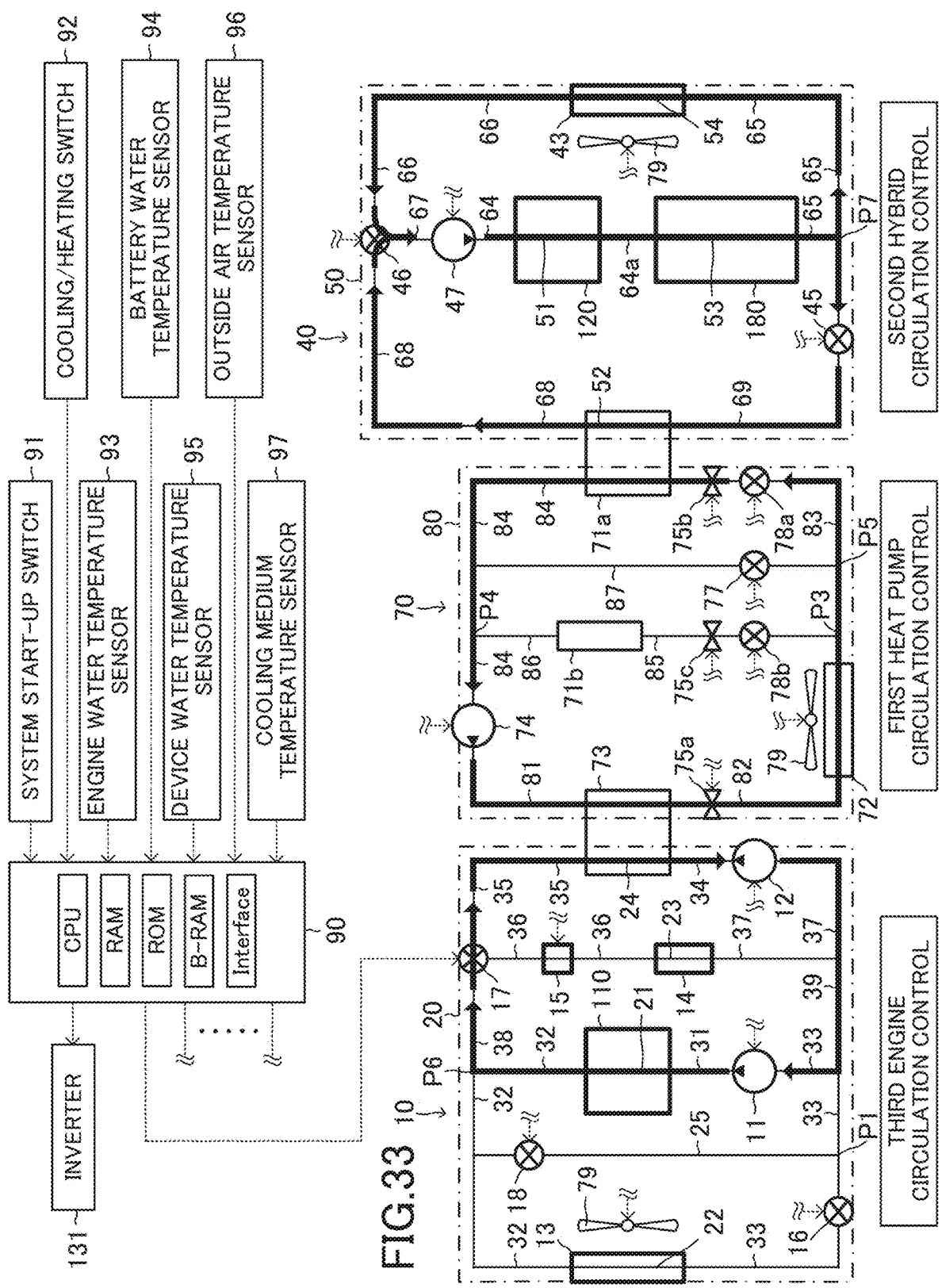
FIG. 33 is a view similar to FIG. 30, and which shows the flow of the cooling water and the flow of the cooling medium.

When the engine pump activation condition is satisfied, the radiator cooling condition is not satisfied, and no process of heating the heater core 14 is requested, the third modified apparatus executes the third engine circulation control for flowing the cooling water in the engine water circulation passage 20 as shown by arrows in FIG. 33. When the third modified apparatus executes the third engine circulation control, the third modified apparatus sets the engine flow rate control valve 17 at the first position, sets the engine water passage shut-off valve 16 at the closed position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the third modified apparatus executes the third engine circulation control, is the same as the flow of the cooling water in the engine water circulation passage 20 when the embodiment apparatus executes the third engine circulation control. When the third modified apparatus executes the third engine circulation control, the same effects as the effects accomplished by the embodiment apparatus executing the third engine circulation control, may be accomplished.

<Fourth Engine Circulation Control>

Figure 34:
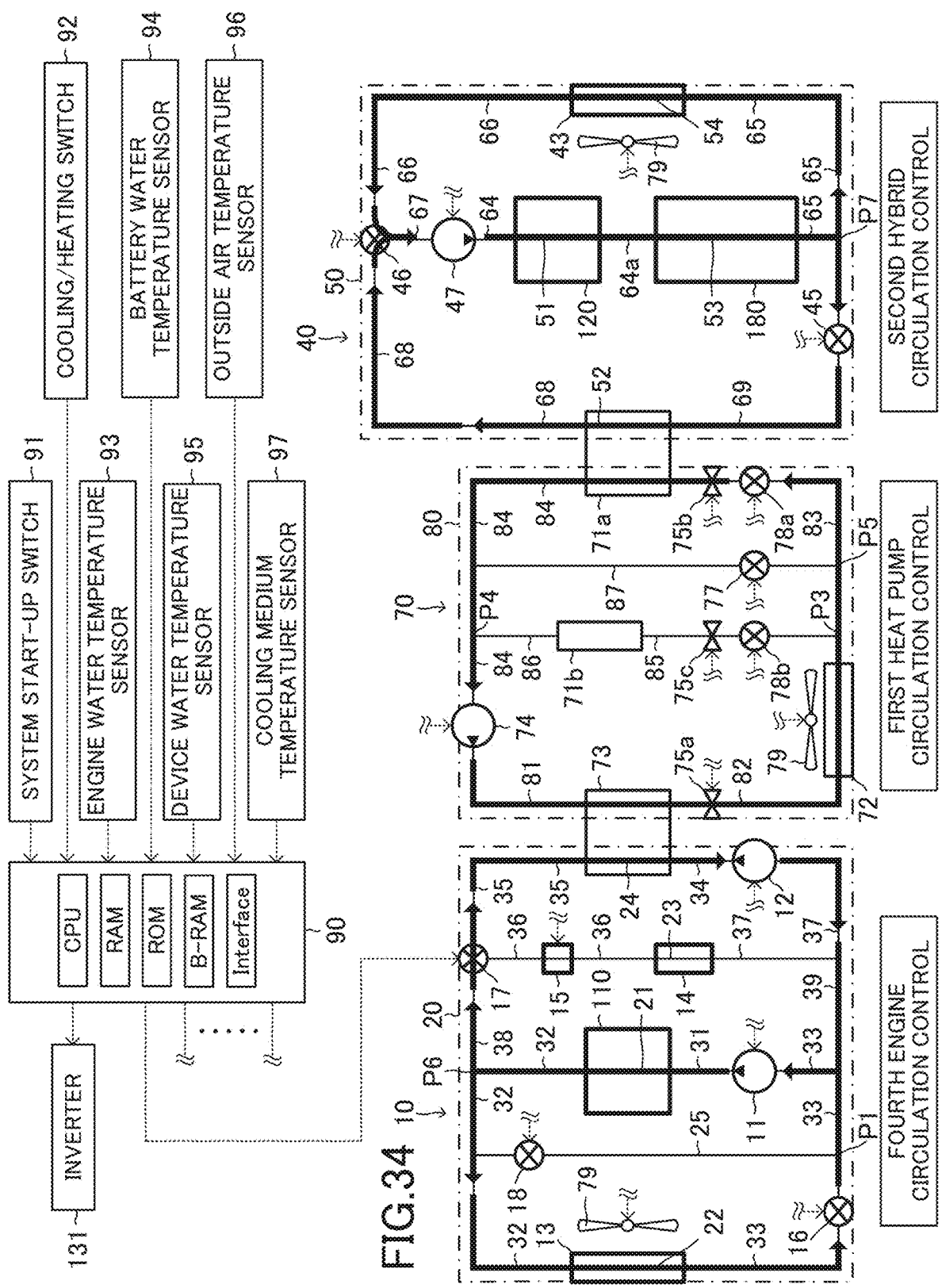
FIG. 34 is a view similar to FIG. 30, and which shows the flow of the cooling water and the flow of the cooling medium.

When the engine pump activation condition is satisfied, the radiator cooling condition is satisfied, and no process of heating the heater core 14 is requested, the third modified apparatus executes the fourth engine circulation control for flowing the cooling water in the engine water circulation passage 20 as shown by arrows in FIG. 34. When the third modified apparatus executes the fourth engine circulation control, the third modified apparatus sets the engine flow rate control valve 17 at the first position, sets the engine water passage shut-off valve 16 at the open position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the third modified apparatus executes the fourth engine circulation control, is the same as the flow of the cooling water in the engine water circulation passage 20 when the embodiment apparatus executes the fourth engine circulation control. When the third modified apparatus executes the fourth engine circulation control, the same effects as the effects accomplished by the embodiment apparatus executing the fourth engine circulation control, may be accomplished.

<Fifth Engine Circulation Control>

Figure 35:
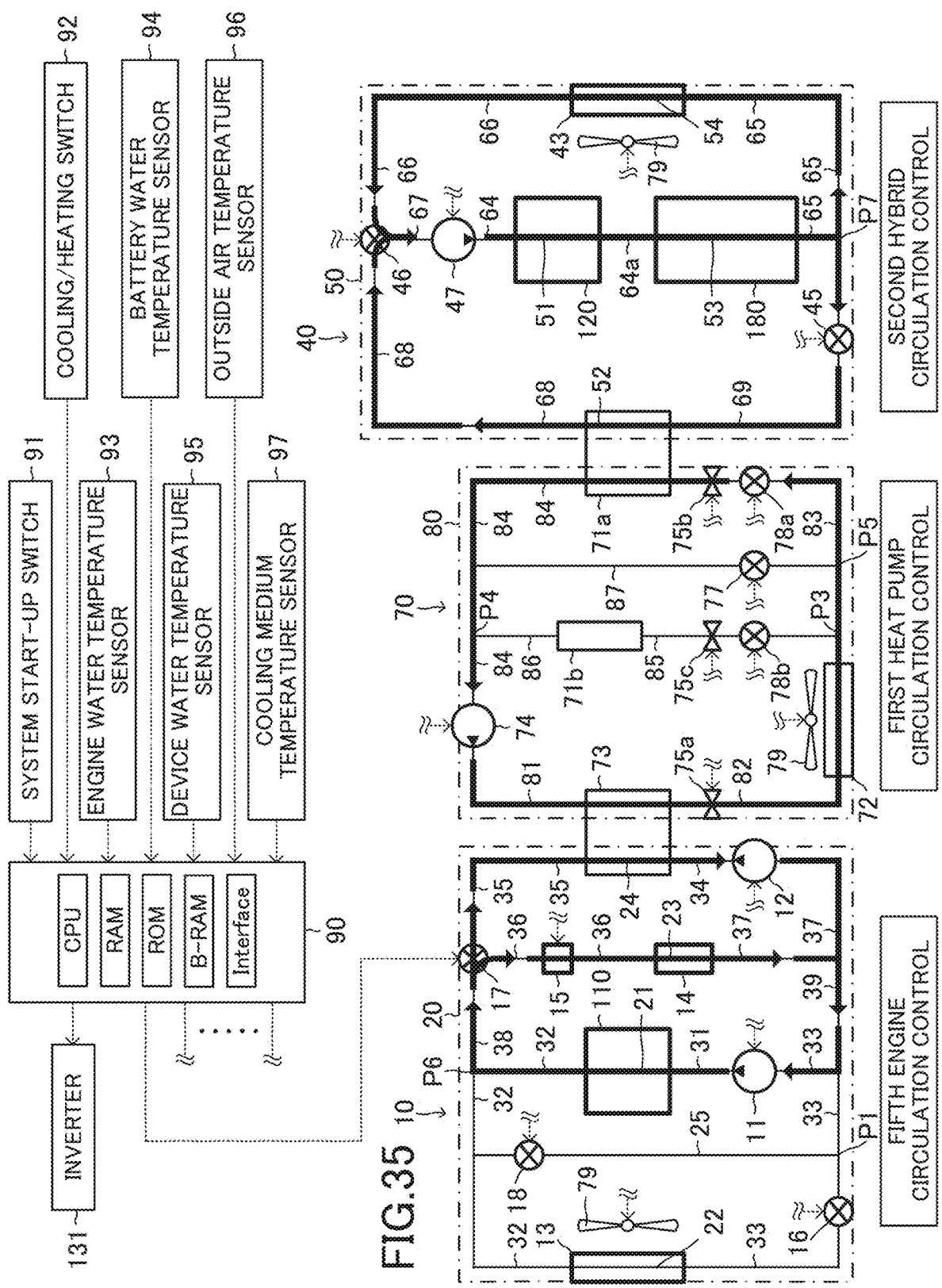
FIG. 35 is a view similar to FIG. 30, and which shows the flow of the cooling water and the flow of the cooling medium.

When the engine pump activation condition is satisfied, the radiator cooling condition is not satisfied, the process of heating the heater core 14 is requested, the third modified apparatus executes the fifth engine circulation control for flowing the cooling water in the engine water circulation passage 20 as shown by arrows in FIG. 35. When the third modified apparatus executes the fifth engine circulation control, the third modified apparatus sets the engine flow rate control valve 17 at the fourth position, sets the engine water passage shut-off valve 16 at the closed position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the third modified apparatus executes the fifth engine circulation control, is the same as the flow of the cooling water in the engine water circulation passage 20 when the embodiment apparatus executes the fifth engine circulation control. When the third modified apparatus executes the fifth engine circulation control, the same effects as the effects accomplished by the embodiment apparatus executing the fifth engine circulation control, may be accomplished.

<Sixth Engine Circulation Control>

Figure 36:
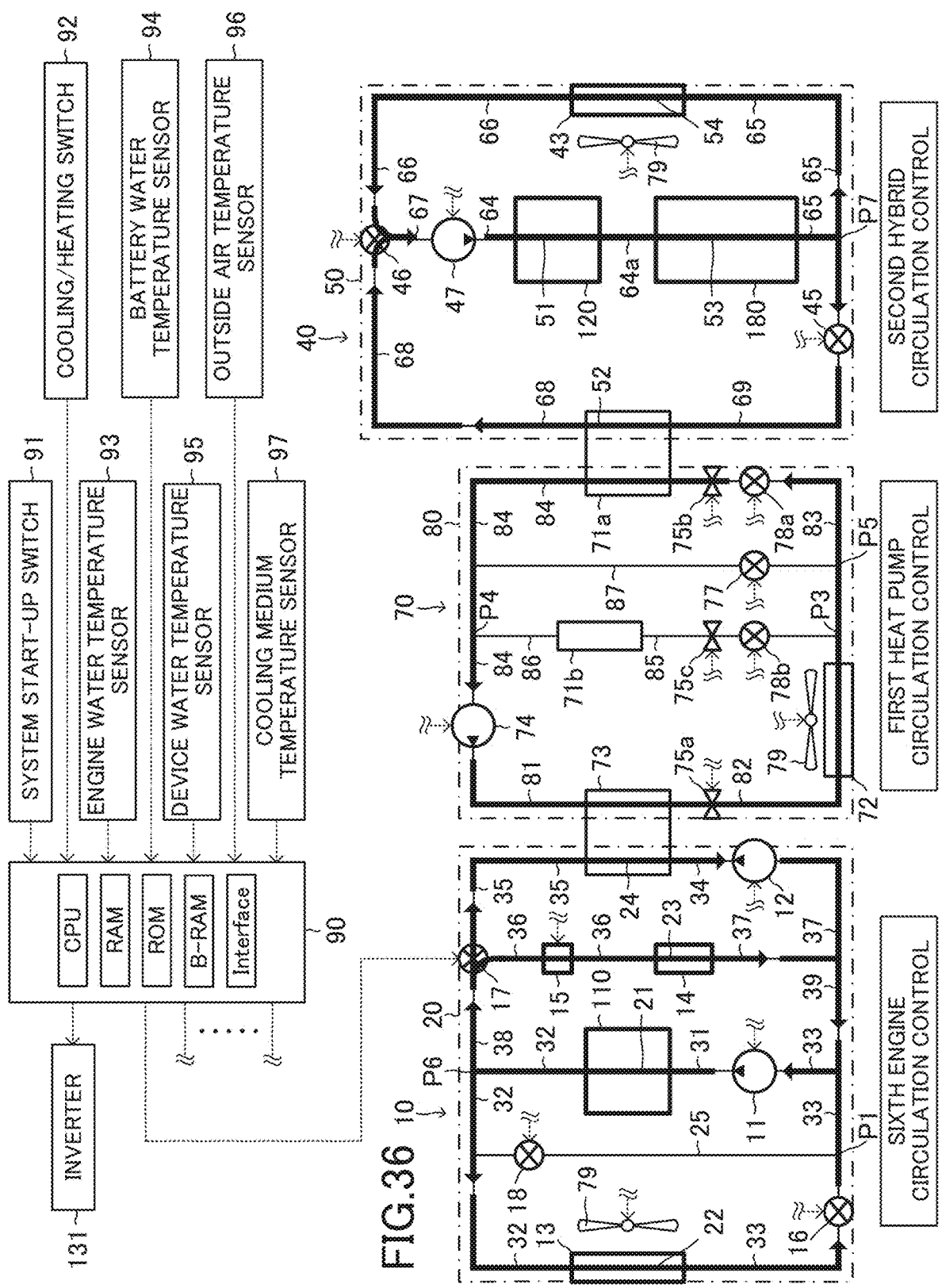
FIG. 36 is a view similar to FIG. 30, and which shows the flow of the cooling water and the flow of the cooling medium.

When the engine pump activation condition is satisfied, the radiator cooling condition is satisfied, and the process of heating the heater core 14 is requested, the third modified apparatus executes the sixth engine circulation control for flowing the cooling water in the engine water circulation passage 20 as shown by arrows in FIG. 36. When the third modified apparatus executes the sixth engine circulation control, the third modified apparatus sets the engine flow rate control valve 17 at the fourth position, sets the engine water passage shut-off valve 16 at the open position, sets the engine bypass valve 18 at the closed position, activates the engine pump 11, and stops activating the heating pump 12. At this time, the first hybrid system circulation control is executed. Thus, the heat exchanging fan 79 is activated.

The flow of the cooling water in the engine water circulation passage 20 when the third modified apparatus executes the sixth engine circulation control, is the same as the flow of the cooling water in the engine water circulation passage 20 when the embodiment apparatus executes the sixth engine circulation control. When the third modified apparatus executes the sixth engine circulation control, the same effects as the effects accomplished by the embodiment apparatus executing the sixth engine circulation control, may be accomplished.

Figure 37:
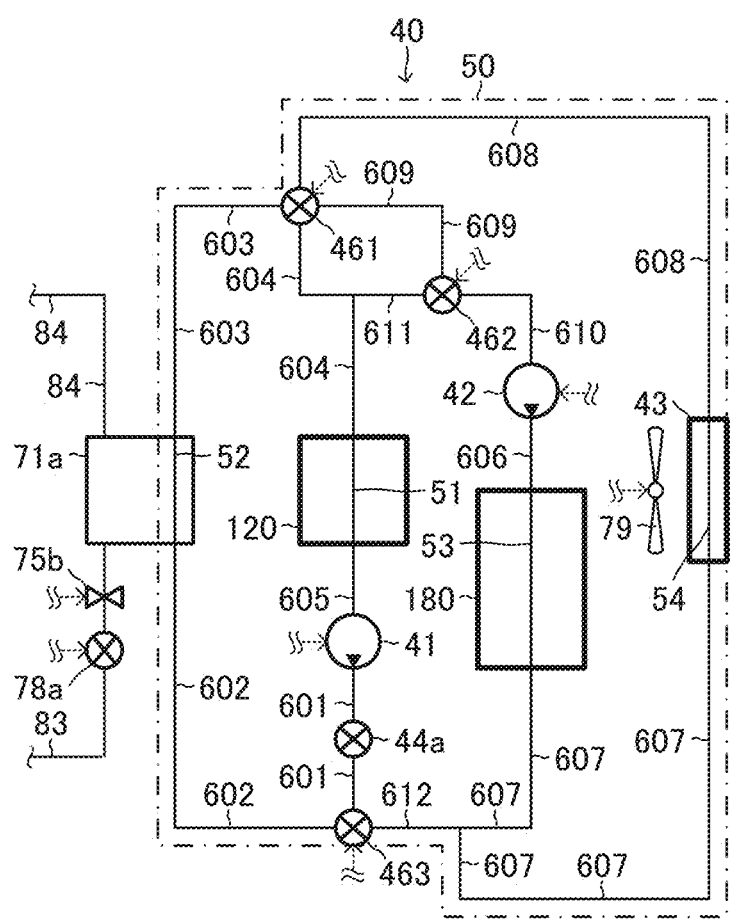
FIG. 37 is a view for showing a part of a cooling apparatus of the vehicle driving system according to a fourth modified example of the embodiment.

The invention may be applied to a cooling apparatus of the vehicle driving system including the hybrid system temperature control apparatus 40 configured as shown in FIG. 37. The cooling apparatus shown in FIG. 37 is the same as the embodiment apparatus except of the hybrid system temperature control apparatus 40 shown in FIG. 37. Hereinafter, the cooling apparatus shown in FIG. 37 will be referred to as "the fourth modified apparatus".

The hybrid system temperature control apparatus 40 of the fourth modified apparatus includes the battery pump 41, the device pump 42, the hybrid system radiator 43, a hybrid system water passage shut-off valve 440, a first hybrid system flow rate control valve 461, a second hybrid system flow rate control valve 462, a third hybrid system flow rate control valve 463, and the hybrid system water circulation passage 50.

Figure 38A:
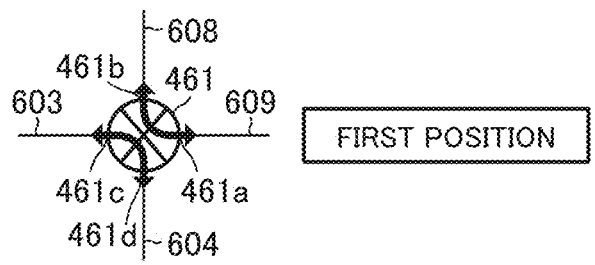
FIG. 38A is a view for showing the flow of the cooling water when a first hybrid device flow rate control valve of the cooling apparatus according to the third modified example is set at a first position.
Figure 39A:
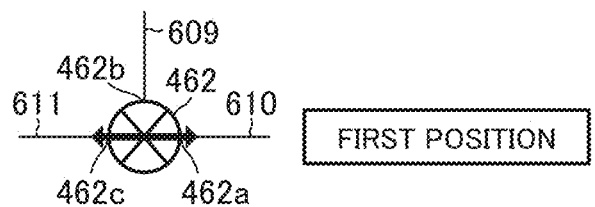
FIG. 39A is a view for showing the flow of the cooling water when a second hybrid device flow rate control valve of the cooling apparatus according to the third modified example is set at a first position.
Figure 40A:
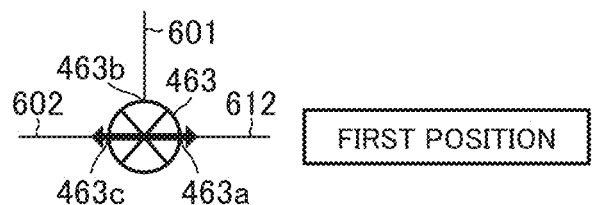
FIG. 40A is a view for showing the flow of the cooling water when a third hybrid device flow rate control valve of the cooling apparatus according to the third modified example is set at a first position.

As shown in FIG. 38A, the first hybrid system flow rate control valve 461 includes a first hybrid system port 461a, a second hybrid system port 461b, a third hybrid system port 461c, and a fourth hybrid system port 461d. As shown in FIG. 39A, the second hybrid system flow rate control valve 462 includes a first hybrid system port 462a, a second hybrid system port 462b, and a third hybrid system port 462c. As shown in FIG. 40A, the third hybrid system flow rate control valve 463 includes a first hybrid system port 463a, a second hybrid system port 463b, and a third hybrid system port 463c.

As shown in FIG. 37, the hybrid system water circulation passage 50 of the fourth modified apparatus is formed by the battery water passage 51, the evaporator water passage 52, the device water passage 53, the hybrid system radiator water passage 54, first to twelfth hybrid system water passages 601 to 612, the internal water passage (not shown) of the battery pump 41, the internal water passage (not shown) of the device pump 42, and internal water passages (not shown) of the first to third hybrid system flow rate control valves 461 to 463.

The battery water passage 51, the evaporator water passage 52, the device water passage 53, and the hybrid system radiator water passage 54 of the fourth modified apparatus are the same as the battery water passage 51, the evaporator water passage 52, the device water passage 53, and the hybrid system radiator water passage 54 of the embodiment apparatus, respectively.

The first hybrid system water passage 601 is a passage for the cooling water and fluidically connects the cooling water discharging opening of the battery pump 41 to the second hybrid system port 463b of the third hybrid system flow rate control valve 463. The second hybrid system water passage 602 is a passage for the cooling water and fluidically connects the third hybrid system port 463c of the third hybrid system flow rate control valve 463 to the inlet of the evaporator water passage 52. The third hybrid system water passage 603 is a passage for the cooling water and fluidically connects the outlet of the evaporator water passage 52 to the third hybrid system port 461c of the first hybrid system flow rate control valve 461. The fourth hybrid system water passage 604 is a passage for the cooling water and fluidically connects the fourth hybrid system port 461d of the first hybrid system flow rate control valve 461 to the inlet of the battery water passage 51. The fifth hybrid system water passage 605 is a passage for the cooling water and fluidically connects the outlet of the battery water passage 51 to the cooling water suctioning opening of the battery pump 41.

The sixth hybrid system water passage 606 is a passage for the cooling water and fluidically connects the cooling water discharging opening of the device pump 42 to the inlet of the device water passage 53. The seventh hybrid system water passage 607 is a passage for the cooling water and fluidically connects the outlet of the device water passage 53 to the inlet of the hybrid system radiator water passage 54. The eighth hybrid system water passage 608 is a passage for the cooling water and fluidically connects the outlet of the hybrid system radiator water passage 54 to the second hybrid system port 461b of the first hybrid system flow rate control valve 461. The ninth hybrid system water passage 609 is a passage for the cooling water and fluidically connects the first hybrid system port 461a of the first hybrid system flow rate control valve 461 to the second hybrid system port 462b of the second hybrid system flow rate control valve 462. The tenth hybrid system water passage 610 is a passage for the cooling water and fluidically connects the first hybrid system port 462a of the second hybrid system flow rate control valve 462 to the cooling water suctioning opening of the device pump 42.

An end of the eleventh hybrid system water passage 611 is fluidically connected to the fourth hybrid system water passage 604. The other end of the eleventh hybrid system water passage 611 is fluidically connected to the third hybrid system port 462c of the second hybrid system flow rate control valve 462. An end of the twelfth hybrid system water passage 612 is fluidically connected to the seventh hybrid system water passage 607. The other end of the twelfth hybrid system water passage 612 is fluidically connected to the first hybrid system port 463a of the third hybrid system flow rate control valve 463.

The hybrid system water passage shut-off valve 440 is provided in the first hybrid system water passage 601. The hybrid system water passage shut-off valve 440 is electrically connected to the ECU 90. A setting position of the hybrid system water passage shut-off valve 440 is controlled by the ECU 90. When the hybrid system water passage shut-off valve 440 is set at an open position, the cooling water can pass the hybrid system water passage shut-off valve 440. When the hybrid system water passage shut-off valve 440 is positioned at a closed position, the cooling water cannot pass the hybrid system water passage shut-off valve 440.

Figure 38B:
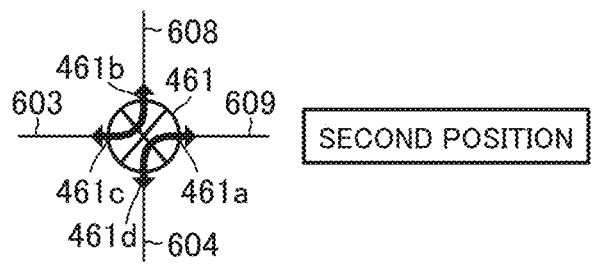
FIG. 38B is a view for showing the flow of the cooling water when the first hybrid device flow rate control valve is set at a second position.

The first hybrid system flow rate control valve 461 is electrically connected to the ECU 90. A setting position of the first hybrid system flow rate control valve 461 is controlled by the ECU 90. When the first hybrid system flow rate control valve 461 is set at a first position, the first hybrid system flow rate control valve 461 permits a flow of the cooling water between the third and fourth hybrid system water passages 603 and 604 and a flow of the cooling water between the eighth and ninth hybrid system water passages 608 and 609 as shown in FIG. 38A. When the first hybrid system flow rate control valve 461 is set at a second position, the first hybrid system flow rate control valve 461 permits a flow of the cooling water between the third and eighth hybrid system water passages 603 and 608 and a flow of the cooling water between the fourth and ninth hybrid system water passages 604 and 609 as shown in FIG. 38B.

Figure 39B:
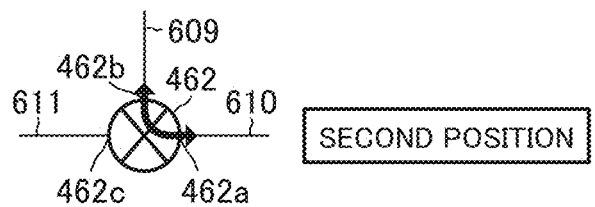
FIG. 39B is a view for showing the flow of the cooling water when the second hybrid device flow rate control valve is set at a second position.
Figure 39C:
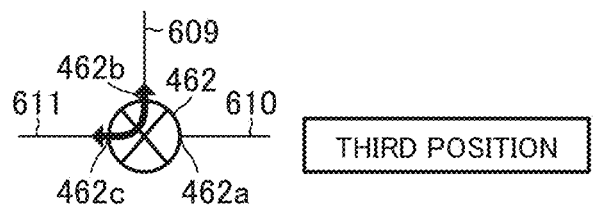
FIG. 39C is a view for showing the flow of the cooling water when the second hybrid device flow rate control valve is set at a third position.
Figure 39D:
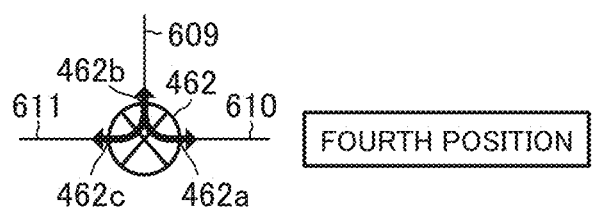
FIG. 39D is a view for showing the flow of the cooling water when the second hybrid device flow rate control valve is set at a fourth position.

The second hybrid system flow rate control valve 462 is electrically connected to the ECU 90. A setting position of the second hybrid system flow rate control valve 462 is controlled by the ECU 90. When the second hybrid system flow rate control valve 462 is set at a first position, the second hybrid system flow rate control valve 462 permits a flow of the cooling water between the tenth and eleventh hybrid system water passages 610 and 611 as shown in FIG. 39A. When the second hybrid system flow rate control valve 462 is set at a second position, the second hybrid system flow rate control valve 462 permits a flow of the cooling water between the ninth and tenth hybrid system water passages 609 and 610 as shown in FIG. 39B. When the second hybrid system flow rate control valve 462 is set at a third position, the second hybrid system flow rate control valve 462 permits a flow of the cooling water between the ninth and eleventh hybrid system water passages 609 and 611 as shown in FIG. 39C. When the second hybrid system flow rate control valve 462 is set at a fourth position, the second hybrid system flow rate control valve 462 permits a flow of the cooling water between the ninth and tenth hybrid system water passages 609 and 610 and a flow of the cooling water between the ninth and eleventh hybrid system water passages 609 and 611 as shown in FIG. 39D.

Figure 40B:
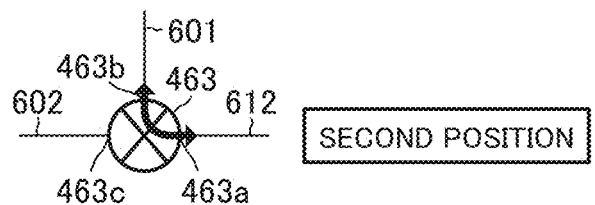
FIG. 40B is a view for showing the flow of the cooling water when the third hybrid device flow rate control valve is set at a second position.
Figure 40C:
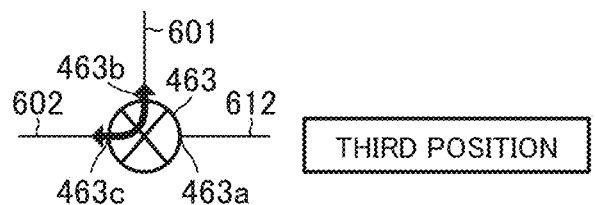
FIG. 40C is a view for showing the flow of the cooling water when the third hybrid device flow rate control valve is set at a third position.
Figure 40D:
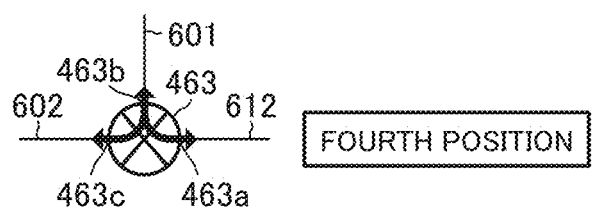
FIG. 40D is a view for showing the flow of the cooling water when the third hybrid device flow rate control valve is set at a fourth position.

The third hybrid system flow rate control valve 463 is electrically connected to the ECU 90. A setting position of the third hybrid system flow rate control valve 463 is controlled by the ECU 90. When the third hybrid system flow rate control valve 463 is set at a first position, the third hybrid system flow rate control valve 463 permits a flow of the cooling water between the second and twelfth hybrid system water passages 602 and 612 as shown in FIG. 40A. When the third hybrid system flow rate control valve 463 is set at a second position, the third hybrid system flow rate control valve 463 permits a flow of the cooling water between the first and twelfth hybrid system water passages 601 and 612 as shown in FIG. 40B. When the third hybrid system flow rate control valve 463 is set at a third position, the third hybrid system flow rate control valve 463 permits a flow of the cooling water between the first and second hybrid system water passages 601 and 602 as shown in FIG. 40C. When the third hybrid system flow rate control valve 463 is set at a fourth position, the third hybrid system flow rate control valve 463 permits a flow of the cooling water between the first and second hybrid system water passages 601 and 602 and a flow of the cooling water between the first and twelfth hybrid system water passages 601 and 612 as shown in FIG. 40D.

The battery pump 41 is electrically connected to the ECU 90. The activation of the battery pump 41 is controlled by the ECU 90. The device pump 42 is electrically connected to the ECU 90. The activation of the device pump 42 is controlled by the ECU 90.

When the fourth modified apparatus executes the first hybrid system circulation control, the fourth modified apparatus sets the first hybrid system flow rate control valve 461 at the first position, sets the second hybrid system flow rate control valve 462 at the fourth position, sets the third hybrid system flow rate control valve 463 at the second position, sets the hybrid system water passage shut-off valve 440 at the open position, and activates the battery pump 41, the device pump 42, and the heat exchanging fan 79.

Figure 41:
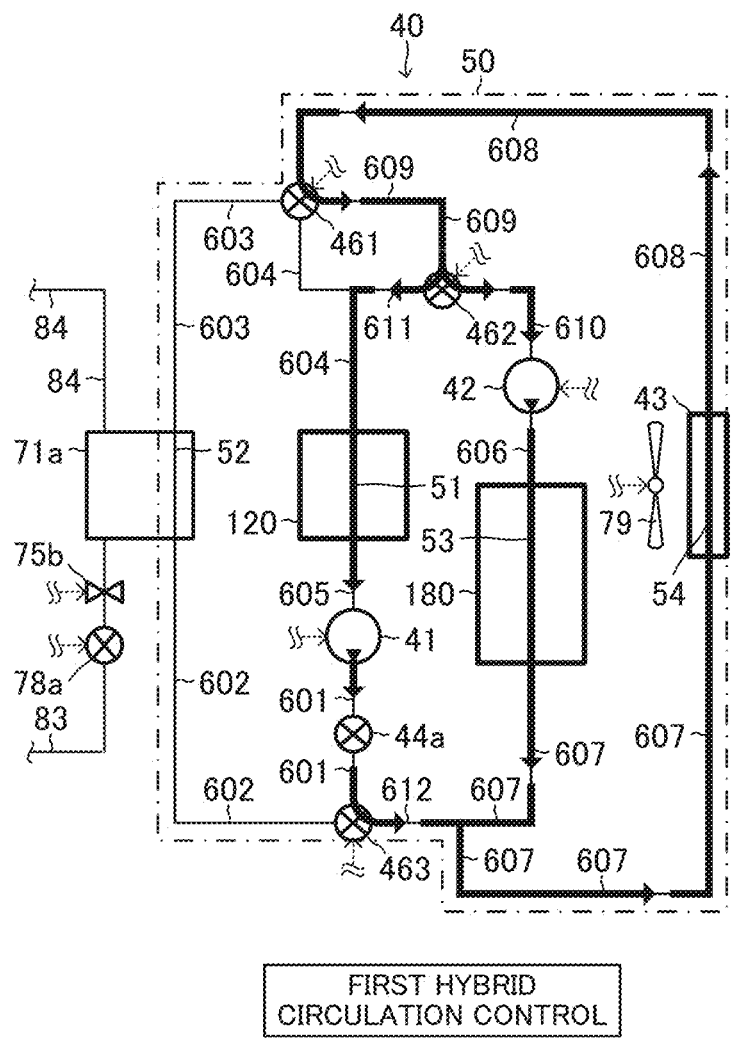
FIG. 41 is a view similar to FIG. 37, and which shows the flow of the cooling water.

In this case, the cooling water flows in the hybrid system water circulation passage 50 as shown in FIG. 41. In particular, the cooling water discharged from the device pump 42 flows into the device water passage 53 through the sixth hybrid system water passage 606. The cooling water flows through the device water passage 53 and then, flows into the hybrid system radiator water passage 54 through the seventh hybrid system water passage 607. On the other hand, the cooling water discharged from the battery pump 41 flows into the hybrid system radiator water passage 54 through the first hybrid system water passage 601, the internal water passage of the third hybrid system flow rate control valve 463, the twelfth hybrid system water passage 612, and the seventh hybrid system water passage 607.

The cooling water flowing into the hybrid system radiator water passage 54, flows through the hybrid system radiator water passage 54 and then, flows into the internal water passage of the second hybrid system flow rate control valve 462 through the eighth hybrid system water passage 608, the internal water passage of the first hybrid system flow rate control valve 461, and the ninth hybrid system water passage 609. A part of the cooling water flowing into the internal water passage of the second hybrid system flow rate control valve 462, is suctioned into the device pump 42 through the tenth hybrid system passage 610. On the other hand, the remaining of the cooling water flowing into the internal water passage of the second hybrid system flow rate control valve 462, flows into the battery water passage 51 through the eleventh and fourth hybrid system water passages 611 and 604. The cooling water flows through the battery water passage 51 and then, is suctioned into the battery pump 41 through the fifth hybrid system water passage 605.

When the fourth modified apparatus executes the second hybrid system circulation control, the fourth modified apparatus sets the first hybrid system flow rate control valve 461 at the first position, sets the second hybrid system flow rate control valve 462 at the second position, sets the third hybrid system flow rate control valve 463 at the third position, sets the hybrid system water passage shut-off valve 440 at the open position, and activates the battery pump 41, the device pump 42, and the heat exchanging fan 79.

Figure 42:
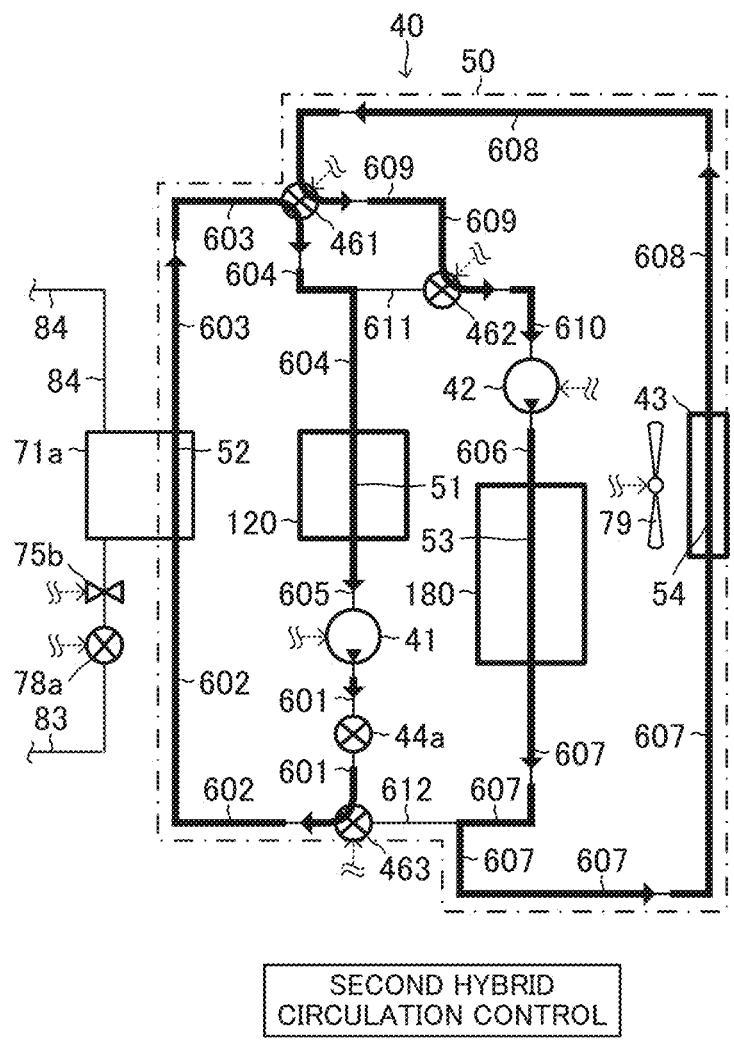
FIG. 42 is a view similar to FIG. 37, and which shows the flow of the cooling water.

In this case, the cooling water flows in the hybrid system water circulation passage 50 as shown in FIG. 42. In particular, the cooling water discharged from the device pump 42 flows into the device water passage 53 through the sixth hybrid system water passage 606. The cooling water flows through the device water passage 53 and then, flows into the hybrid system radiator water passage 54 through the seventh hybrid system water passage 607. The cooling water flows through the hybrid system radiator water passage 54 and then, is suctioned into the device pump 42 through the eighth hybrid system water passage 608, the internal water passage of the first hybrid system flow rate control valve 461, the ninth hybrid system water passage 609, the internal water passage of the second hybrid system flow rate control valve 462, and the tenth hybrid system passage 610.

On the other hand, the cooling water discharged from the battery pump 41 flows into the evaporator water passage 52 through the first hybrid system water passage 601, the internal water passage of the third hybrid system flow rate control valve 463, and the second hybrid system water passage 602. The cooling water flows through the evaporator water passage 52 and then, flows into the battery water passage 51 through the third hybrid system water passage 603, the internal water passage of the first hybrid system flow rate control valve 461, and the fourth hybrid system water passage 604. The cooling water flows through the battery water passage 51 and then, is suctioned into the battery pump 41 through the fifth hybrid system water passage 605.

The first to seventh engine circulation controls, the engine warming control, the engine circulation stop control, the first to third heat pump circulation controls, and the hybrid system circulation stop control executed by the fourth modified apparatus, are the same as the first to seventh engine circulation controls, the engine warming control, the engine circulation stop control, the first to third heat pump circulation controls, and the hybrid system circulation stop control executed by the embodiment apparatus, respectively.

Figure 43:
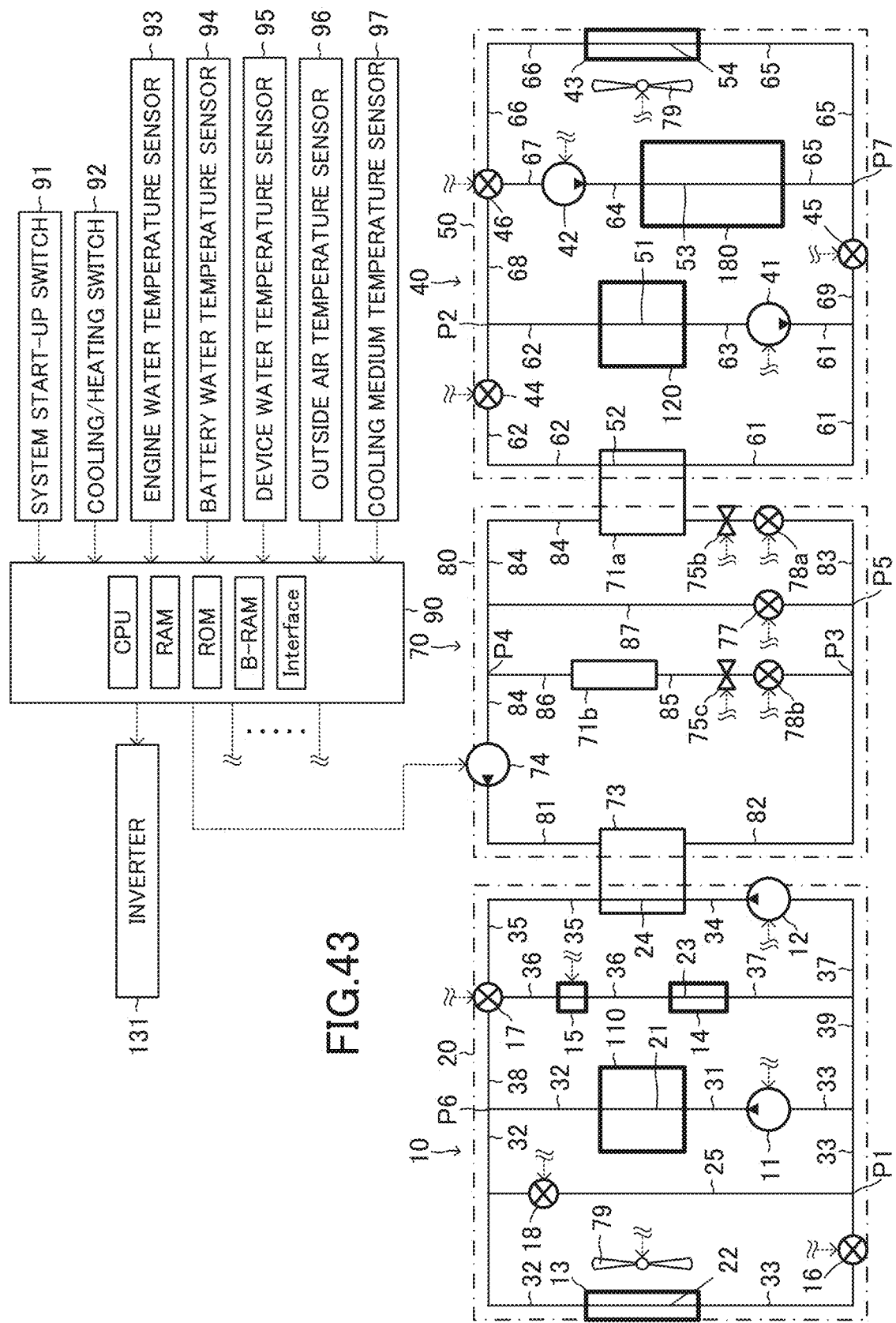
FIG. 43 is a view for showing a cooling apparatus of the vehicle driving system according to a fifth modified example of the embodiment.

If any of the third to sixth engine circulation controls is executed when the first hybrid system circulation control is executed, the invention may be applied to the cooling apparatus of the vehicle driving system not provided with the outside air heat exchanger 72 as shown in FIG. 43. When the invention is applied to the cooling apparatus shown in FIG. 43, the outside air heat exchanger 72 is not provided in the compartment of the vehicle 100. Thus, the larger engine radiator 13 and the larger hybrid system radiator 43 may be provided in the compartment. In this case, the cooling ability of the cooling apparatus may be large. It should be noted that the heat pump 70 shown in FIG. 43 does not include the first expansion valve 75a.

Further, the second cooling medium passage 82 of the cooling apparatus shown in FIG. 43 is fluidically connected directly to the third cooling medium passage 83.

What is claimed is:

1. A cooling apparatus of a vehicle driving system for driving a vehicle, comprising:
    an engine water circulation passage, in which cooling water flows as engine cooling water for cooling an internal combustion engine of the vehicle driving system;
    an engine radiator for cooling the engine cooling water by outside air;
    a hybrid system water circulation passage, in which the cooling water flows as hybrid system cooling water for cooling a hybrid system including at least one of a battery and a motor of the vehicle driving system;
    a hybrid system radiator for cooling the hybrid system cooling water by the outside air; and
    a heat pump for cooling the hybrid system by a cooling medium flowing in a cooling medium circulation passage of the heat pump, the heat pump including a condenser for exchanging heat between the cooling medium and the engine cooling water,
    wherein the cooling apparatus further comprises an electronic control unit configured to:
        flow the engine cooling water in the engine water circulation passage through the engine radiator to cool the internal combustion engine by the engine cooling water when an engine cooling condition is satisfied, the engine cooling condition being a condition that a process of cooling the internal combustion engine by the engine cooling water is requested,
        activate the heat pump to cool the hybrid system by the cooling medium when a heat pump activation condition is satisfied, the heat pump activation condition being a condition that a process of cooling the hybrid system by the cooling medium of the heat pump is requested, and
        activate the heat pump to cool the hybrid system by the cooling medium and flow the engine cooling water in the engine water circulation passage through the internal combustion engine and the condenser to cool the cooling medium by the engine cooling water at the condenser when an engine water circulation condition is satisfied, the engine water circulation condition being a condition that the heat pump activation condition is satisfied, and the engine cooling condition is not satisfied,
    wherein the engine water circulation passage and the cooling medium circulation passage are configured to exchange heat between the cooling medium and the engine cooling water only at the condenser,
    wherein the heat pump is configured to cool the hybrid system directly by the cooling medium, and
    wherein the electronic control unit is further configured to stop flowing the engine cooling water in the engine water circulation passage when a temperature of the engine cooling water flowing into the condenser is equal to or higher than a temperature of the cooling medium flowing into the condenser even while the engine water circulation condition is satisfied.

2. The cooling apparatus of the vehicle driving system as set forth in claim 1, wherein the engine water circulation condition includes a condition that the temperature of the cooling medium flowing into the condenser is higher than a predetermined cooling medium temperature.

3. The cooling apparatus of the vehicle driving system as set forth in claim 1, wherein the engine water circulation condition includes a condition that a temperature of the internal combustion engine is lower than an engine warmed temperature.

4. The cooling apparatus of the vehicle driving system as set forth in claim 1, wherein the heat pump activation condition includes a condition that a temperature of the hybrid system cooling water, which is cooled by the hybrid system radiator without the heat pump, is equal to or higher than a predetermined water temperature.

5. The cooling apparatus of the vehicle driving system as set forth in claim 1, wherein:
    the cooling medium circulation passage of the heat pump comprises a battery cooling medium passage provided in the battery to directly cool the battery by the cooling medium.

6. The cooling apparatus of the vehicle driving system as set forth in claim 1, wherein the heat pump includes an outside air heat exchanger for exchanging the heat between the cooling medium and the outside air.

7. A cooling apparatus of a vehicle driving system for driving a vehicle, comprising:
    an engine water circulation passage, in which cooling water flows as engine cooling water for cooling an internal combustion engine of the vehicle driving system;
    an engine radiator for cooling the engine cooling water by outside air;
    a hybrid system water circulation passage, in which the cooling water flows as hybrid system cooling water for cooling a hybrid system including at least one of a battery and a motor of the vehicle driving system;
    a hybrid system radiator for cooling the hybrid system cooling water by the outside air; and
    a heat pump for cooling the hybrid system by a cooling medium flowing in a cooling medium circulation passage of the heat pump, the heat pump including a condenser for exchanging heat between the cooling medium and the engine cooling water,
    wherein the cooling apparatus further comprises an electronic control unit configured to:
        flow the engine cooling water in the engine water circulation passage through the engine radiator to cool the internal combustion engine by the engine cooling water when an engine cooling condition is satisfied, the engine cooling condition being a condition that a process of cooling the internal combustion engine by the engine cooling water is requested,
        activate the heat pump to cool the hybrid system by the cooling medium when a heat pump activation condition is satisfied, the heat pump activation condition being a condition that a process of cooling the hybrid system by the cooling medium of the heat pump is requested, and
        activate the heat pump to cool the hybrid system by the cooling medium and flow the engine cooling water in the engine water circulation passage through the internal combustion engine and the condenser to cool the cooling medium by the engine cooling water at the condenser when an engine water circulation condition is satisfied, the engine water circulation condition being a condition that the heat pump activation condition is satisfied, and the engine cooling condition is not satisfied,
    wherein the engine water circulation passage and the cooling medium circulation passage are configured to exchange heat between the cooling medium and the engine cooling water only at the condenser, wherein the engine water circulation condition includes a condition relating to a temperature of the cooling medium flowing into the condenser, and wherein the electronic control unit is further configured to stop flowing the engine cooling water in the engine water circulation passage when a temperature of the engine cooling water flowing into the condenser is equal to or higher than the temperature of the cooling medium flowing into the condenser even while the engine water circulation condition is satisfied.

8. The cooling apparatus of the vehicle driving system as set forth in claim 7, wherein the heat pump further includes an evaporator for exchanging heat between the cooling medium and the hybrid system cooling water, and the cooling medium circulation passage and the hybrid system water circulation passage are configured to exchange heat between the cooling medium and the hybrid system cooling water only at the evaporator.

9. The cooling apparatus of the vehicle driving system as set forth in claim 3, wherein the electronic control unit is further configured to in response to the heat pump activation condition being not satisfied, perform heat pump circulation stop control to stop the cooling medium from flowing in the cooling medium circulation passage, and cause the hybrid system cooling water to flow in the hybrid system water circulation passage to cool the hybrid system by the hybrid system radiator, without the hybrid system being cooled by the heat pump.

10. The cooling apparatus of the vehicle driving system as set forth in claim 7, wherein the hybrid system water circulation passage is not in fluid connection with the condenser.

11. The cooling apparatus of the vehicle driving system as set forth in claim 10, wherein the heat pump further includes an evaporator for exchanging heat between the cooling medium and the hybrid system cooling water, and the engine water circulation passage is not in fluid connection with the evaporator.

12. The cooling apparatus of the vehicle driving system as set forth in claim 7, wherein the heat pump further includes an evaporator for exchanging heat between the cooling medium and the hybrid system cooling water, and the engine water circulation passage is not in fluid connection with the evaporator.

13. A cooling apparatus of a vehicle driving system for driving a vehicle, the cooling apparatus comprising:

an engine water circulation passage, in which engine cooling water flows for cooling an internal combustion engine of the vehicle driving system;

an engine radiator for cooling the engine cooling water by outside air;

a hybrid system water circulation passage, in which hybrid system cooling water flows for cooling a hybrid system including at least one of a battery and a motor of the vehicle driving system;

a hybrid system radiator for cooling the hybrid system cooling water by the outside air;

a heat pump for cooling the hybrid system by a cooling medium flowing in a cooling medium circulation passage of the heat pump, the heat pump including a condenser for exchanging heat between the cooling medium and the engine cooling water; and an electronic control unit configured to:

in response to an engine cooling condition being satisfied, the engine cooling condition being a condition that a process of cooling the internal combustion engine by the engine cooling water is requested, cause the engine cooling water to flow in the engine water circulation passage through the engine radiator to cool the internal combustion engine by the engine cooling water, in response to a heat pump activation condition being satisfied, the heat pump activation condition being a condition that a process of cooling the hybrid system by the cooling medium of the heat pump is requested, activate the heat pump to cool the hybrid system by the cooling medium in addition to cooling the hybrid system by the hybrid system radiator, in response to the heat pump activation condition being not satisfied, cause the hybrid system cooling water to flow in the hybrid system water circulation passage to cool the hybrid system by the hybrid system radiator, without the hybrid system being cooled by the heat pump, and in response to both (a) the engine cooling condition being not satisfied and (a) an engine water circulation condition being satisfied, the engine water circulation condition including (i) a condition that the heat pump activation condition is satisfied and (ii) a condition that a temperature of the cooling medium flowing into the condenser is higher than a predetermined cooling medium temperature, activate the heat pump to cool the hybrid system by the cooling medium in addition to cooling the hybrid system by the hybrid system radiator, and cause the engine cooling water to flow in the engine water circulation passage through the internal combustion engine and the condenser to cool the cooling medium by the engine cooling water at the condenser, wherein the engine water circulation passage and the cooling medium circulation passage are configured to exchange heat between the cooling medium and the engine cooling water only at the condenser, and wherein the electronic control unit is further configured to stop flowing the engine cooling water in the engine water circulation passage when a temperature of the engine cooling water flowing into the condenser is equal to or higher than the temperature of the cooling medium flowing into the condenser even while the engine water circulation condition is satisfied.

14. The cooling apparatus of the vehicle driving system as set forth in claim 13, wherein the heat pump further includes an evaporator for exchanging heat between the cooling medium and the hybrid system cooling water, and the cooling medium circulation passage and the hybrid system water circulation passage are configured to exchange heat between the cooling medium and the hybrid system cooling water only at the evaporator.

15. The cooling apparatus of the vehicle driving system as set forth in claim 13, wherein the electronic control unit is further configured to
in response to the heat pump activation condition being not satisfied,
perform heat pump circulation stop control to stop the cooling medium from flowing in the cooling medium circulation passage, and
cause the hybrid system cooling water to flow in the hybrid system water circulation passage to cool the hybrid system by the hybrid system radiator, without the hybrid system being cooled by the heat pump.

16. The cooling apparatus of the vehicle driving system as set forth in claim 13, wherein the hybrid system water circulation passage is not in fluid connection with the condenser.

17. The cooling apparatus of the vehicle driving system as set forth in claim 16, wherein
the heat pump further includes an evaporator for exchanging heat between the cooling medium and the hybrid system cooling water, and
the engine water circulation passage is not in fluid connection with the evaporator.

18. The cooling apparatus of the vehicle driving system as set forth in claim 13, wherein
the heat pump further includes an evaporator for exchanging heat between the cooling medium and the hybrid system cooling water, and
the engine water circulation passage is not in fluid connection with the evaporator.

19. The cooling apparatus of the vehicle driving system as set forth in claim 13, wherein the heat pump is configured to cool the hybrid system directly by the cooling medium.

* * * * *